United States Patent
Ashrafi

(10) Patent No.: US 10,891,555 B2
(45) Date of Patent: Jan. 12, 2021

(54) UNIVERSAL QUANTUM COMPUTER, COMMUNICATION, QKD SECURITY AND QUANTUM NETWORKS USING OAM QU-DITS WITH DIGITAL LIGHT PROCESSING

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 0 days.

(21) Appl. No.: 16/509,301

(22) Filed: Jul. 11, 2019

(65) Prior Publication Data
US 2020/0050959 A1 Feb. 13, 2020

Related U.S. Application Data

(60) Provisional application No. 62/715,451, filed on Aug. 7, 2018.

(51) Int. Cl.
*G06N 10/00* (2019.01)
*H04L 9/08* (2006.01)
*G06E 3/00* (2006.01)

(52) U.S. Cl.
CPC ............ *G06N 10/00* (2019.01); *H04L 9/085* (2013.01); *H04L 9/0852* (2013.01); *G06E 3/005* (2013.01)

(58) Field of Classification Search
CPC ....... G06N 10/00; H04L 9/085; H04L 9/0852; G06E 3/005

(Continued)

(56) References Cited

U.S. PATENT DOCUMENTS 5,061,049 A * 10/1991 Hornbeck .......... G02B 6/12004
                                                    348/203
9,077,577 B1 * 7/2015 Ashrafi ................ H04B 10/532
(Continued)

OTHER PUBLICATIONS

Qiang Zeng, Tao Li, Xinbing Song, and Xiangdong Zhang. Realization of optimized quantum controlledlogic gate based on the orbital angular momentum of light. Apr. 18, 2016 | vol. 24, No. 8 | DOI:10.1364/OE.24.008186 | Optics Express 8186. (Year: 2016).*

(Continued)

*Primary Examiner* — Collin X Beatty

(57) ABSTRACT

A quantum computing system includes an input port for receiving a data stream comprising a plurality of bits. Orbital angular momentum processing circuitry receives the data stream and applies at least one of a plurality of orbital angular momentum function modes to each of the plurality of bits of the data stream. Each of the plurality of orbital angular momentum function modes comprises separate orbital angular momentum states that are orthogonal to each other. DLP processing circuitry associated with the orbital angular momentum processing circuitry generates a hologram for applying the at least one of the plurality of orbital angular momentum function modes to each of the plurality of bits of the data stream. At least one quantum gate receives each of the of the plurality of bits of the data stream having at least one of the plurality of orbital angular momentum functions applied thereto via at least one gate input and generates a quantum circuit output via at least one gate output responsive thereto. An output port outputs the generated quantum circuit output.

23 Claims, 45 Drawing Sheets

(58) Field of Classification Search
USPC .................................................. 359/108, 109
See application file for complete search history.

(56) References Cited

U.S. PATENT DOCUMENTS

| | | | | |
|---|---|---|---|---|
| 9,413,470 | B1* | 8/2016 | Smith | H04B 10/70 |
| 10,073,417 | B2* | 9/2018 | Ashrafi | G03H 1/2645 |
| 10,574,447 | B2* | 2/2020 | Djordjevic | H04B 7/0413 |
| 10,574,448 | B2* | 2/2020 | Djordjevic | H04B 7/0413 |
| 2005/0254823 | A1* | 11/2005 | Beausoleil, Jr. | G06N 10/00 398/140 |
| 2005/0259914 | A1* | 11/2005 | Padgett | H01Q 21/26 385/16 |
| 2009/0028332 | A1* | 1/2009 | Parker | G02F 1/0136 380/256 |
| 2010/0013696 | A1* | 1/2010 | Schmitt | G01S 7/024 342/54 |
| 2012/0207470 | A1* | 8/2012 | Djordjevic | H04B 10/25 398/44 |
| 2013/0235744 | A1* | 9/2013 | Chen | H04L 47/82 370/252 |
| 2015/0055961 | A1* | 2/2015 | Meyers | B82Y 10/00 398/140 |
| 2016/0033406 | A1* | 2/2016 | Ashrafi | G01N 21/17 356/432 |
| 2016/0041411 | A1 | 2/2016 | Ashrafi et al. | |
| 2016/0222039 | A1 | 8/2016 | Sum et al. | |
| 2017/0026095 | A1* | 1/2017 | Ashrafi | H04B 7/10 |
| 2018/0167703 | A1* | 6/2018 | Willner | H04Q 11/00 |
| 2018/0234285 | A1* | 8/2018 | Djordjevic | H04L 9/0852 |
| 2018/0252557 | A1* | 9/2018 | Djordjevic | H04Q 11/0062 |
| 2019/0394030 | A1* | 12/2019 | Forbes | H04B 10/50 |

OTHER PUBLICATIONS

Xinyao Hu et Al. Dynamic shaping of orbital-angularmomentum beams for information encoding. vol. 26, No. 2 | Jan. 22, 2018 | Optics Express 1796. (Year: 2018).*

A. Nicolas et Al. A quantum memory for orbital angular momentum photonic qubits. arXiv:1308.0238v2 [quant-ph] Feb. 28, 2014. (Year: 2014).*

Krenn M, Malik M, Erhard M, Zeilinger A. 2017 Orbital angular momentum of photons and the entanglement of Laguerre-Gaussian modes. Phil. Trans. R. Soc. A 375: 20150442. http://dx.doi.org/10.1098/rsta.2015.0442 (Year: 2017).*

Li-Ping Deng, Haibo Wang, and Kaige Wang. Quantum CNOT gates with orbital angular momentum and polarization of single-photon quantum logic. vol. 24, No. 9/Sep. 2007/ J. Opt. Soc. Am. B. (Year: 2007).*

Ivan B. Djordjevic. Multidimensional QKD Based on Combined Orbital and Spin Angular Momenta of Photon. DOI: 10.1109/JPHOT.2013.2292301 1943-0655 2013 IEEE (Year: 2013).*

Ivan B. Djordjevic, Integrated Optics Modules Based Proposal for Quantum Information Processing, Teleportation, QKD, and Quantum Error Correction Employing Photon Angular Momentum, IEEE Photonics Journal, vol. 8, No. 1, DOI: 10.1109/JPHOT.2016.2522097 (Feb. 2016); 13 pages.

PCT: International Search Report and Written Opinion of PCT/US2020/014733 (related application), dated Apr. 20, 2020; 11 pgs.

Quinteiro et al. Theory of the optical absorption of light carrying orbital angular momentum by semiconductors. EPL (Europhysics Letters), 85(4), 47001, 2009.

Trif et al. Dynamics of a Majorana trijunction in a microwave cavity. Adv. Quantum Technol. 1900091, 1 (2019).

Trif et al. Photon assisted braiding of Majorana fermions in a cavity. Phys. Rev. Lett. 122, 236803, Oct. 2, 2018.

* cited by examiner

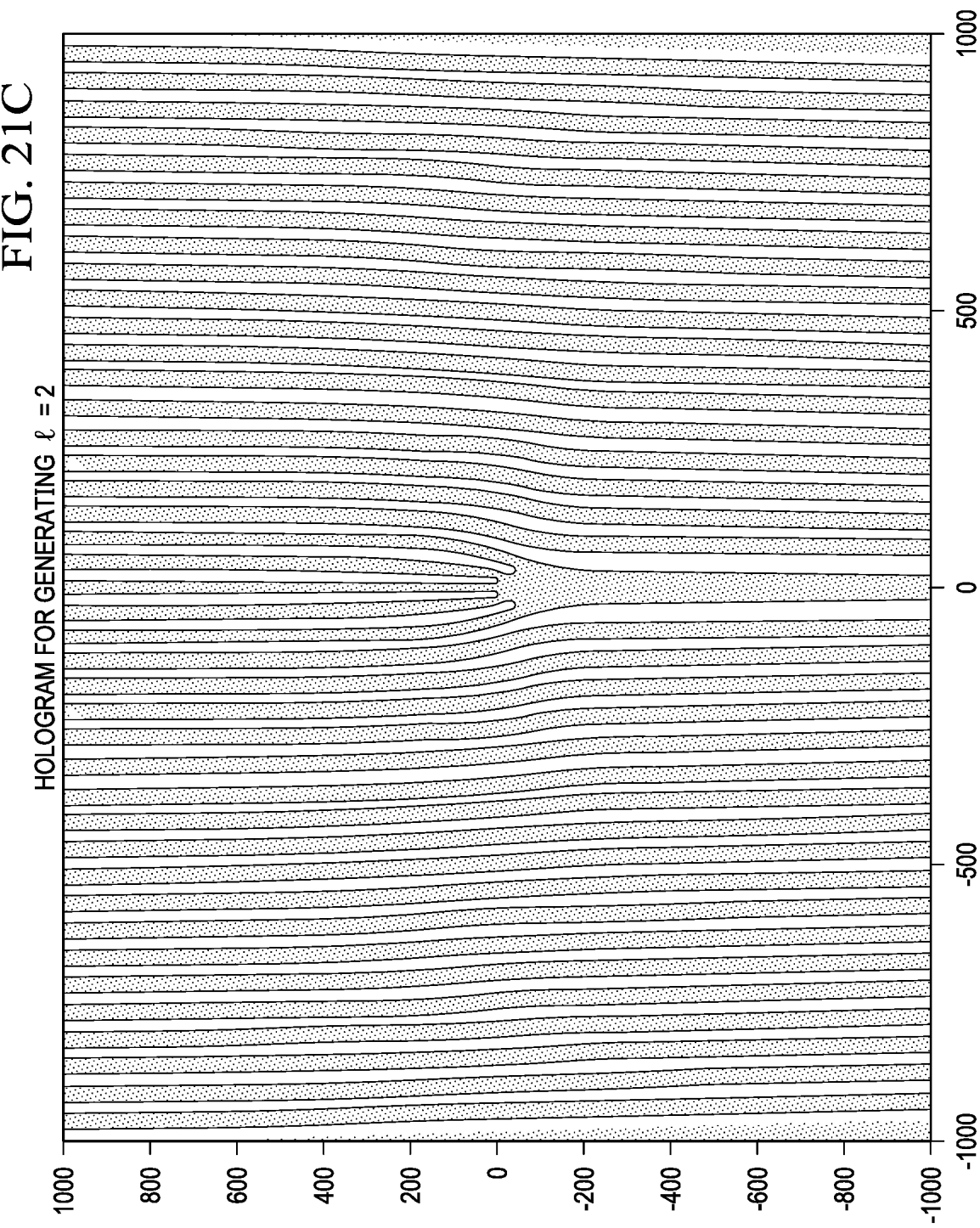

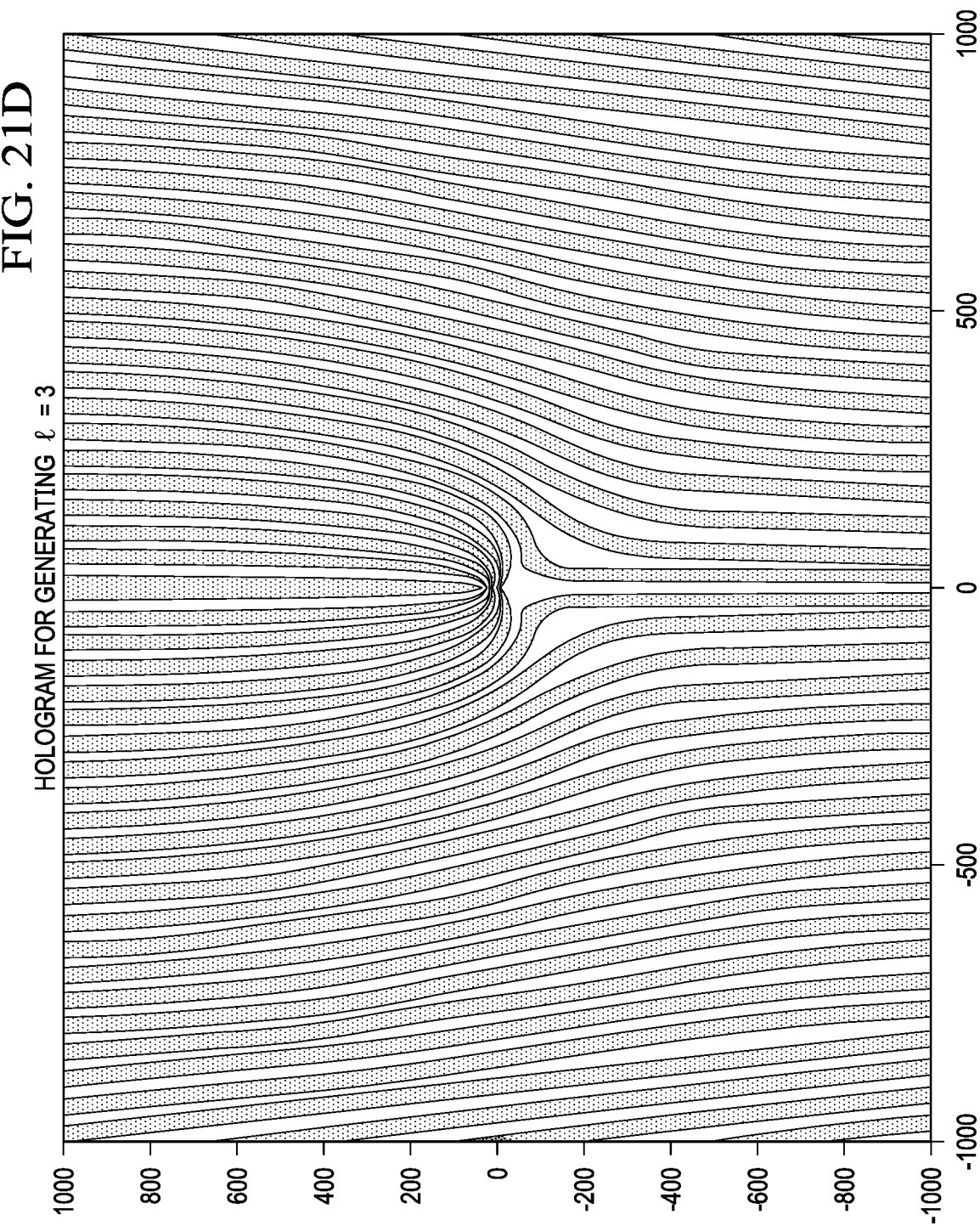

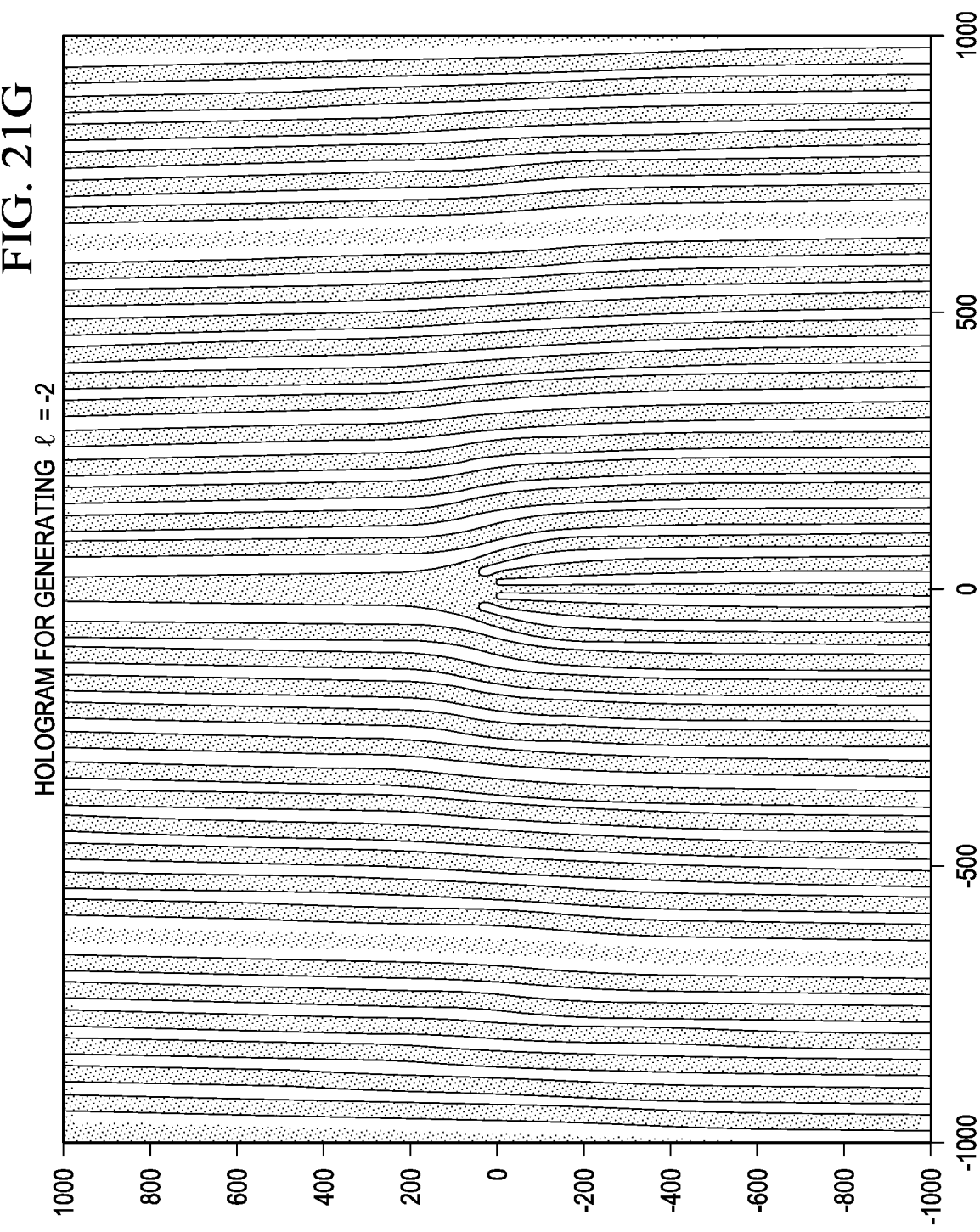

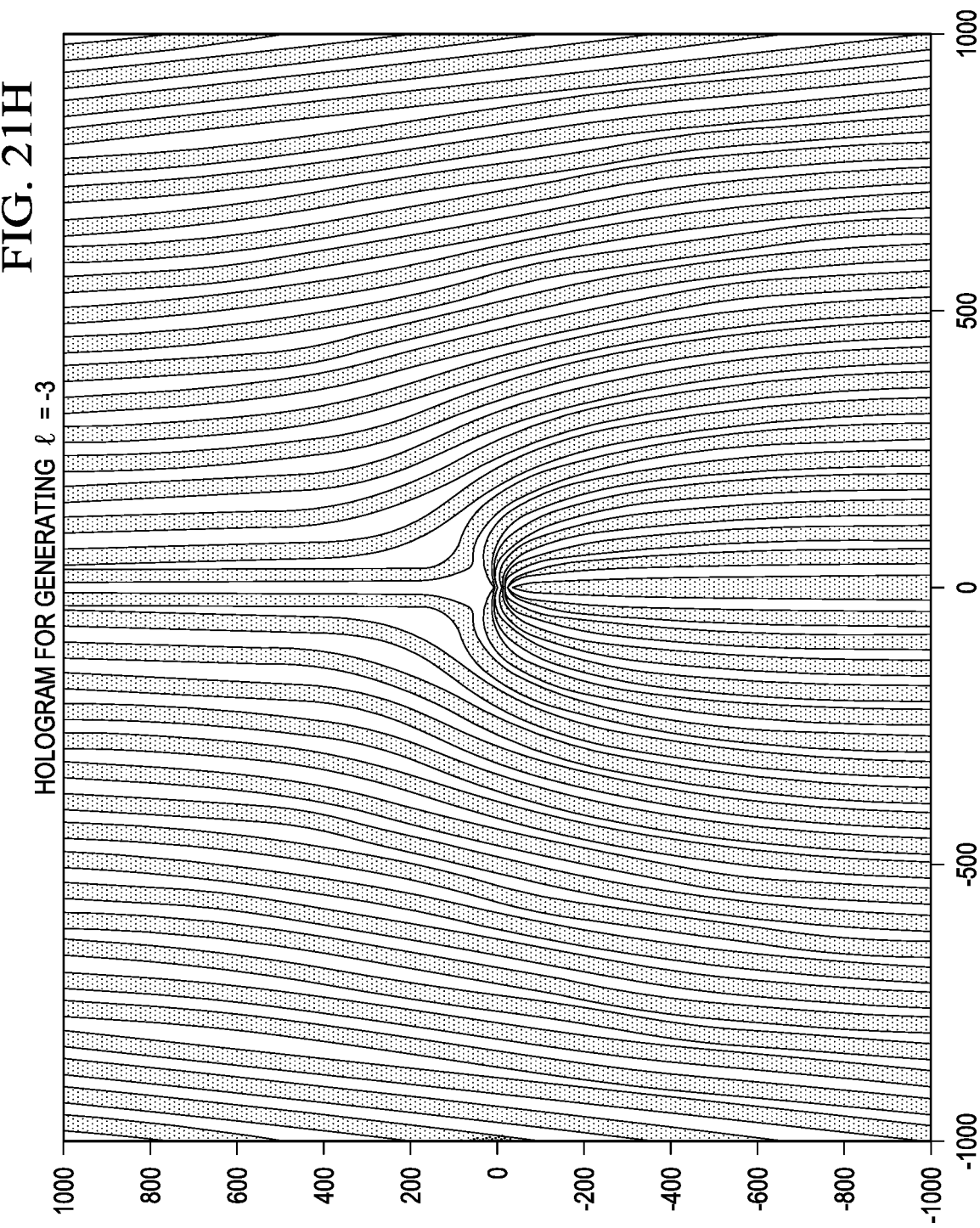

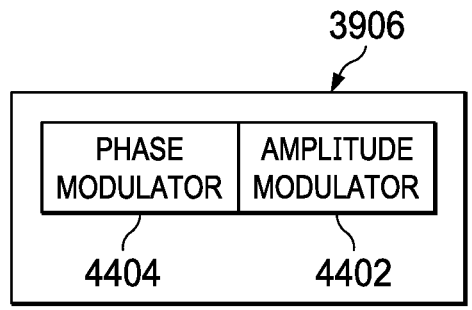
FIG. 44
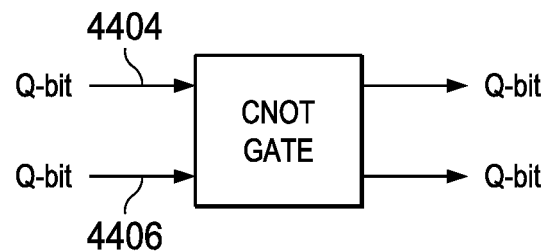
FIG. 45
| BEFORE | | AFTER | |
|---|---|---|---|
| CONTROL | TARGET | CONTROL | TARGET |
| $|0\rangle$ | $|0\rangle$ | $|0\rangle$ | $|0\rangle$ |
| $|0\rangle$ | $|1\rangle$ | $|0\rangle$ | $|1\rangle$ |
| $|0\rangle$ | $|0\rangle$ | $|1\rangle$ | $|1\rangle$ |
| $|0\rangle$ | $|1\rangle$ | $|1\rangle$ | $|0\rangle$ |
FIG. 46

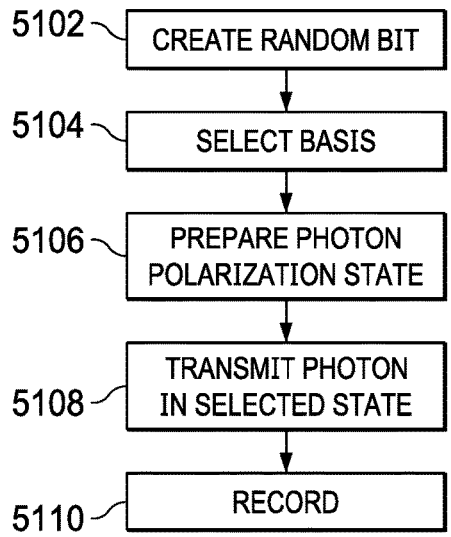
FIG. 51
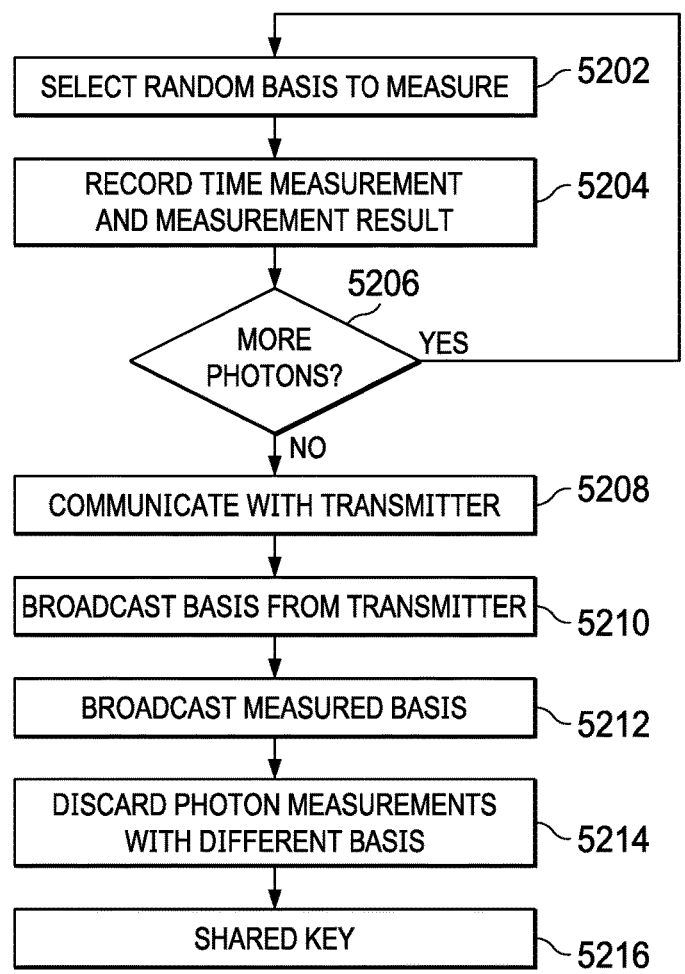
FIG. 52
| TRANSMITTER RANDOM BIT | 0 | 1 | 1 | 0 | 1 | 0 | 0 | 1 | |
|---|---|---|---|---|---|---|---|---|---|
| TRANSMITTER RANDOM SENDING BASIS | + | + | × | + | × | × | × | + | |
| PHOTON POLARIZATION TRANSMITTER SENDS | ↑ | → | ↘ | ↑ | ↘ | ↗ | ↗ | → | } 5302 |
| RECEIVER RANDOM MEASUREMENT BASIS | + | × | × | × | + | × | + | + | } 5304 |
| PHOTON POLARIZATION RECEIVER MEASURES | ↑ | ↗ | ↘ | ↗ | → | ↗ | → | → | } 5306 |
| PUBLIC DISCUSSION OF BASIS | | | | | | | | | } 5308 |
| SHARED SECRET KEY | 0 | 1 | | 0 | | | | 1 | } 5310 |
FIG. 53

UNIVERSAL QUANTUM COMPUTER, COMMUNICATION, QKD SECURITY AND QUANTUM NETWORKS USING OAM QU-DITS WITH DIGITAL LIGHT PROCESSING

CROSS-REFERENCE TO RELATED APPLICATIONS

This application claims benefit of U.S. Provisional Application No. 62/715,451, filed Aug. 7, 2018, entitled UNIVERSAL QUANTUM COMPUTER, COMMUNICATION AND QKD SECURITY USING OAM QU-DITS WITH DLP, the specification of which are incorporated by reference herein in its entirety.

TECHNICAL FIELD

The present invention relates to quantum computers, and more particularly, to quantum computers utilizing the orbital angular momentum qubits generated using digital light processing.

SUMMARY

The present invention, as disclosed and described herein, in one aspect thereof comprises a quantum computing system includes an input port for receiving a data stream comprising a plurality of bits. Orbital angular momentum processing circuitry receives the data stream and applies at least one of a plurality of orbital angular momentum function modes to each of the plurality of bits of the data stream. Each of the plurality of orbital angular momentum function modes comprises separate orbital angular momentum states that are orthogonal to each other. Digital light processing circuitry associated with the orbital angular momentum processing circuitry generates a hologram for applying the at least one of the plurality of orbital angular momentum function modes to each of the plurality of bits of the data stream. At least one quantum gate receives each of the of the plurality of bits of the data stream having at least one of the plurality of orbital angular momentum functions applied thereto via at least one gate input and generates a quantum circuit output via at least one gate output responsive thereto. An output port outputs the generated quantum circuit output.

BRIEF DESCRIPTION OF THE DRAWINGS

For a more complete understanding, reference is now made to the following description taken in conjunction with the accompanying Drawings in which:

FIGS. 21A-21H illustrate holograms that may be used for modulating a light beam;

FIG. 44 illustrates an E/O modulator;

FIG. 45 illustrates a generalized-CNOT gate;

FIG. 46 illustrates the operation of a CNOT gate on a quantum register consisting of two qubits;

FIG. 51 is a flow diagram illustrating the process for a transmitter transmitting a quantum key;

FIG. 52 illustrates the manner in which the receiver may receive and determine a shared quantum key;

FIG. 53 more particularly illustrates the manner in which a transmitter and receiver may determine a shared quantum key;

DETAILED DESCRIPTION

Figure 1A:
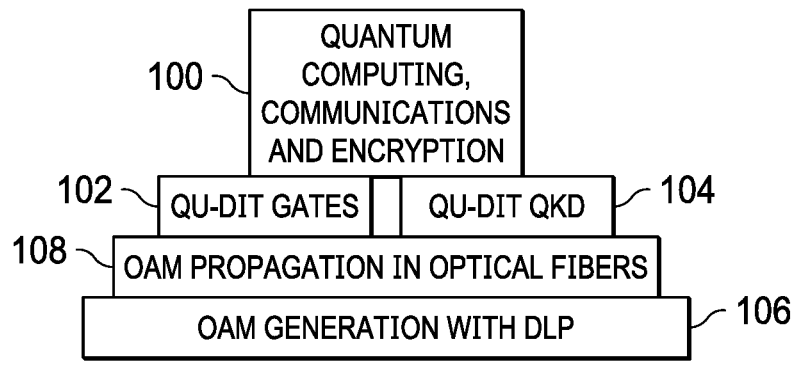
FIG. 1A illustrates an overall view of various components of a universal quantum computer system using OAM qudits with digital light processing.

Referring now to the drawings, wherein like reference numbers are used herein to designate like elements throughout, the various views and embodiments of universal quantum computer, communications and QKD security using OAM qubits with digital light processing illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring now to FIG. 1A, there is illustrated an overall view of the various components contributing to a universal quantum computer system using OAM qudits digital light processing. The present invention uses an approach for both quantum communication and quantum computing applications 100 to work simultaneously using OAM Qudits for implementing Qu-dit Gates 102 and Qu-dit Quantum Key Distribution (QKD) 104 with integrated photonics (i.e. digital light processing) 106. The OAM signals are generated using digital light processing 106 and allowed to utilize OAM propagation to propagate through optical fibers 108. The OAM propagated signals are utilized within qu-dit gates 102 and may make use of qudit QKD 104 in order to perform quantum computing, communications and encryption 100. A qudit comprises a quantum unit of information that may take any of d states, where d is a variable.

Figure 1B:
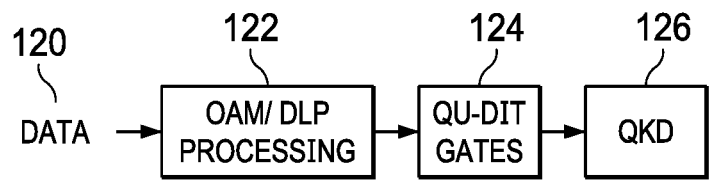
FIG. 1B illustrates a block diagram of a universal quantum computer system using OAM qudits with digital light processing.

Referring now to FIG. 1B, there is illustrated a block diagram of a universal quantum computer system using OAM qudits with digital light processing. An input data stream 120 is provided to OAM 122 to have OAM values applied to the data 120. The OAM processing enables photons to carry an arbitrary number of bits per photon. The OAM processed data bits are applied to the photons using digital light processing technologies using digital light processing 123 as described hereinbelow. The signals from the digital light processing 123 are provided to qudit gates 124. The qudit gates 124 may comprise generalized X-gates, generalized Z-gates and generalized CNOT-gates that are qudit versions of existing qubit gates. The qudit gates 124 may also comprise modules such as fault-tolerate quantum computing modules, QKD modules, etc. The modules may provide for quantum error correction (i.e. non-binary syndrome module); entanglement-assisted QKD (i.e. the generalized Bell-states, etc.). The basic qudit gate 124 would comprise a QFT (quantum Fourier transform). Thus, the F-gate on qudits has the same effect as the Hadamard gate on qubits |0> is mapped to 1/sqrt(2) {|0>+|1>}, |1> is mapped to 1/sqrt(2) {|0>−|1>}. The signals out foot from the cutie Gates 124 may then be used in for example a quantum key distribution (QKD) process 126. Existing QKD with high-speed communications and computing is very slow. By using the system described herein there may be a simultaneous increase insecurity and throughput while further increasing the capacity of computing and processing of the system.

Figure 2:
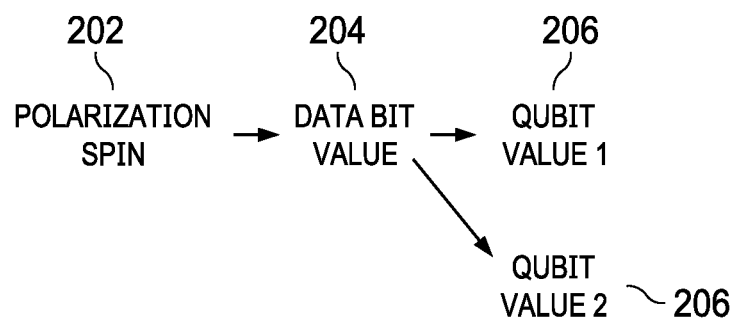
FIG. 2 illustrates the use of spin polarization for quantum gate inputs.
Figure 3:
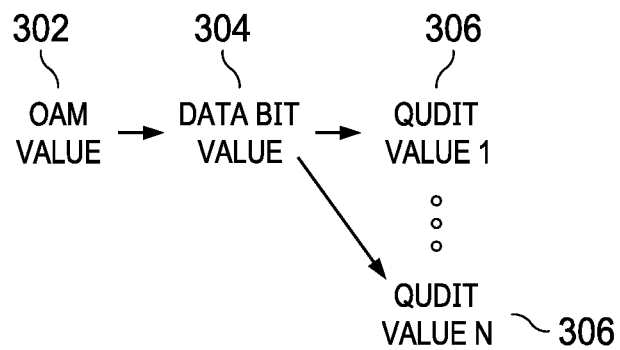
FIG. 3 illustrates the use of OAM for quantum gate inputs.

The photon angular momentum of photons can be used to carry both the spin angular momentum (SAM) and the orbital angular momentum (OAM) to transmit multiple data bits. SAM is associated with polarization, while OAM is associated with azimuthal phase dependence of the complex electric field. Given that OAM eigenstates are mutually orthogonal, a large number of bits per single photon can be transmitted. This is more particularly illustrated with respect to FIGS. 2 and 3. FIG. 2 illustrates how polarization spin 202 may be applied to data bit values 204 to generate qubit values 206. Since each data bit value 204 may only have a positive spin polarization or a negative spin polarization applied thereto only a pair of qubit states are available for each data value. However, as shown in FIG. 3, if an OAM value 302 is applied to each data bit value 304 a much larger number of qudit values 306 maybe obtain for each data bit value 304. The number of qudit values may range from 1 to N, where N is the largest number of different OAM states that are applied to the data values 304. The manner for applying the OAM values 302 to the data bit value 304 may use the DLP® processing 123 that will be more fully described herein below.

Referring now back to FIG. 1, the OAM processed signals may be transmitted using OAM propagation in optical fibers 108. The ability to generate/analyze states with different photon angular momentum applied thereto, by using holographic methods, allows the realization of quantum states in multidimensional Hilbert space. Because OAM states provide an infinite basis state, while SAM states are 2-D only, the OAM states can also be used to increase the security for quantum key distribution (QKD) applications 104 and improve computational power for quantum computing applications 100. The goal of the system is to build angular momentum based deterministic universal quantum qudit gates 102, namely, generalized-X, generalized-Z, and generalized-CNOT qudit gates, and different quantum modules of importance for various applications, including fault-tolerant quantum computing, teleportation, QKD, and quantum error correction. For example, the basic quantum modules for quantum teleportation applications include the generalized-Bell-state generation module and the QFT-module. The basic module for entanglement assisted QKD is either the generalized-Bell-state generation module or the Weyl-operator-module. The approach is to implement all these modules in integrated optics using multi-dimensional qudits on digital light processing.

In quantum computing a qubit or quantum bit is the basic unit of quantum information and comprises the quantum version of the classical binary bit physically realized with a two-state device. A qubit is a two-state quantum-mechanical system, one of the simplest quantum systems displaying the characteristics of quantum mechanics. Examples include: the spin of the electron in which the two levels can be taken as spin up and spin down; or the polarization of a single photon in which the two states can be taken to be the vertical polarization and the horizontal polarization. In a classical system, a bit would have to be in one state or the other. However, quantum mechanics allows the qubit to be in a coherent superposition of both states/levels at the same time, a property that is fundamental to quantum mechanics and thus quantum computing.

In quantum computing, the concept of ' qubit' has been introduced as the counterpart of the classical concept of 'bit' in conventional computers. The two qubit states labeled as |0> and |1> correspond to the classical bits 0 and 1 respectively. The arbitrary qubit state |φ> maintains a coherent superposition of states |0> and |1>:

$$|\varphi>=a|0>+b|1>$$

where a and b are complex numbers called probability amplitudes. That is, the qubit state |φ> collapses into either |0> state with probability $|a|^2$, or |1> state with probability $|b|^2$ with satisfying $|a|^2+|b|^2=1$.

The qubit state |φ> is described as $$|\varphi<=\cos\theta|0>+e^{i\psi}\sin\theta|1>$$

which is called Bloch-sphere representation. In order to give a minimum representation of the basic quantum logic gates, this is rewritten as a function with complex-valued representation, by corresponding the probability amplitudes a and b as the real part and imaginary part of the function respectively. The quantum state with complex-valued representation is described as $$f(\theta)=e^{j\theta}=\cos\theta+i\sin\theta,$$

In quantum computing and specifically the quantum circuit model of computation, a quantum logic gate (or simply quantum gate) is a basic quantum circuit operating on a small number of qubits. They are the building blocks of quantum circuits, like classical logic gates are for conventional digital circuits.

Quantum Gates

In quantum computing and specifically the quantum circuit model of computation, a quantum logic gate (or simply quantum gate) is a basic quantum circuit operating on a small number of qubits. They are the building blocks of quantum circuits, like classical logic gates are for conventional digital circuits.

Unlike many classical logic gates, quantum logic gates are reversible. However, it is possible to perform classical computing using only reversible gates. For example, the reversible Toffoli gate can implement all Boolean functions, often at the cost of having to use ancillary bits. The Toffoli gate has a direct quantum equivalent, showing that quantum circuits can perform all operations performed by classical circuits.

Quantum logic gates are represented by unitary matrices. The most common quantum gates operate on spaces of one or two qubits, just like the common classical logic gates operate on one or two bits. As matrices, quantum gates can be described by $2^n \times 2^n$ sized unitary matrices, where n is the number of qubits that the gates act on. The variables that the gates act upon, the quantum states, are vectors in $2^n$ complex dimensions, where n again is the number of qubits of the variable. The base vectors are the possible outcomes if measured, and a quantum state is a linear combination of these outcomes.

Figure 4:
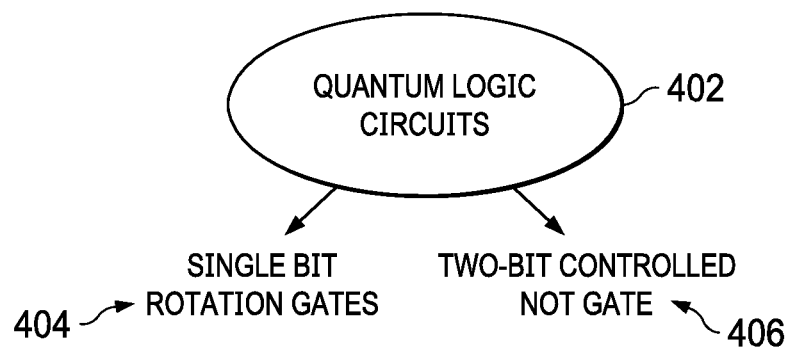
FIG. 4 illustrates various types of quantum logic circuits.
Figure 5:
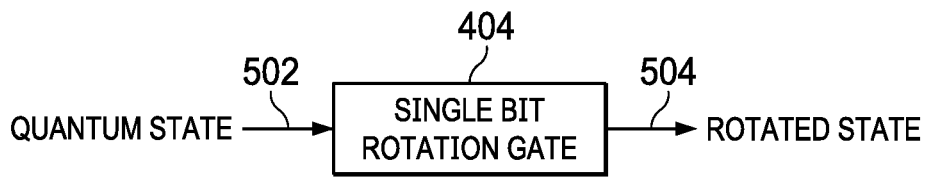
FIG. 5 illustrates a single bit rotation gate.

Referring now to FIG. 4, in quantum logic circuits, fundamental quantum gates 3802 are the single bit rotation gate 404 and two-bit controlled NOT gate 406. Any quantum logic circuit can be constructed by combinations of these two gates. As shown in FIG. 5, a single bit rotation gate 404 takes a quantum state as its input 502 and outputs a rotated state in the complex plane at its output 504. This gate can be described as $f(\theta_1+\theta_2)=f(\theta_1)\cdot f(\theta_2)$.

Figure 6:
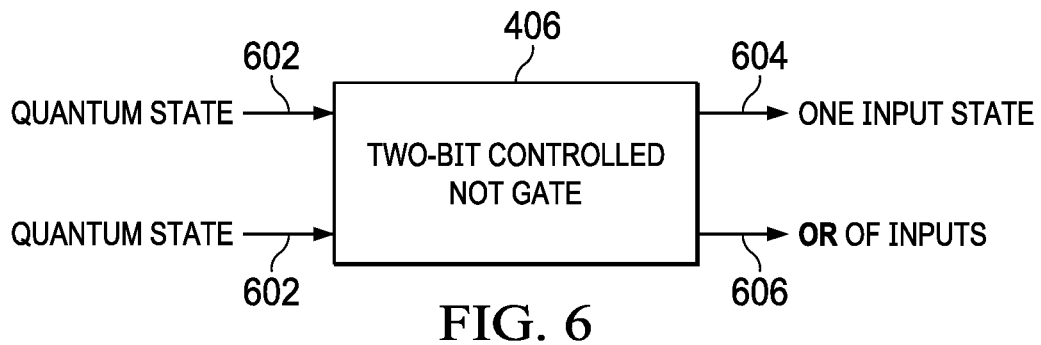
FIG. 6 illustrates a two bit controlled NOT gate.

A two-bit controlled NOT gate 602, as shown in FIG. 6, takes two quantum states as its inputs 602 and gives two outputs: one of the input states 604 and the exclusive OR-ed result of two inputs 606. It is necessary to represent the inversion and non-inversion of the quantum state in order to describe this operation, thus a controlled input parameter V is introduced:

$$f\left(\frac{\pi}{2}\gamma+(1-2\gamma)\cdot\theta\right)=\begin{cases}\cos\theta+i\sin\theta, & \gamma=0 \\ \sin\theta+i\cos\theta, & \gamma=1\end{cases}$$

The output state of the neuron k, denoted as $x_k$, is given as:

$$x_k=f(N_k)=\cos y_k+i\sin y_k=e^{iy_k}$$

A similar formulation for Qudits and a corresponding neural network approach may also be provided.

In recent years, scientists have developed quantum-neuro computing in which the algorithm of quantum computation is used to improve the efficiency of neural computing systems. The quantum state and the operator of quantum computation are both important to realize parallelisms and plasticity respectively in information processing systems. The complex valued representation of these quantum concepts allows neural computation system to advance in learning abilities and to enlarge its possibility of practical applications. The application of the above described application of nonlinear modeling and forecasting to AI may be implemented according to two specific proposals. One is to use a Qubit neural network model based on 2-dimensional Qubits and the second is to expand the Qubits to multi-dimensional Qudits and further investigate their characteristic features, such as the effects of quantum superposition and probabilistic interpretation in the way of applying quantum computing to a neural network.

Figure 7:
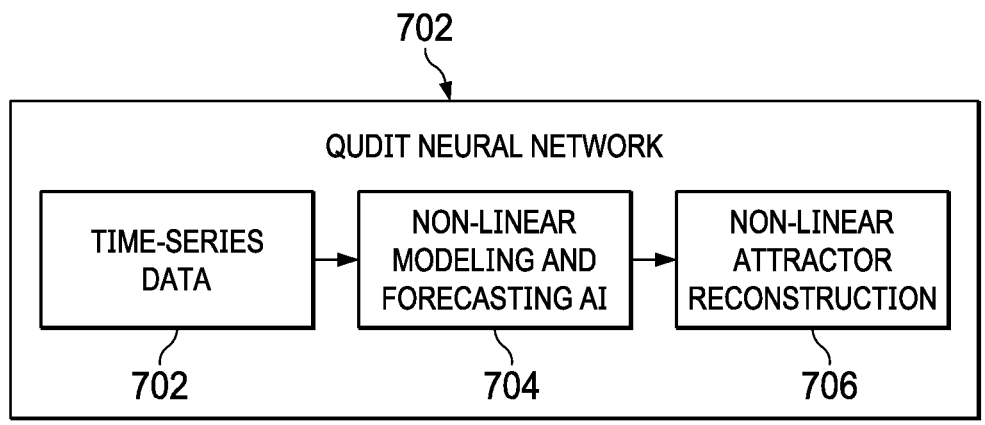
FIG. 7 illustrates a Qudit network.

One of the applications for quantum networks is to predict time-series from dynamical systems, especially from chaotic systems by their various applications. There have been several attempts to use real-valued neural networks for predictions, but there have been no attempts for prediction by complex-valued Qudit-based neural networks using nonlinear attractor reconstruction where learning iterations, learning success rates, and prediction errors may be examined. Thus, as shown generally in FIG. 7, a Qudit based network 702 may implement nonlinear modeling and forecasting to AI 704 that generates a nonlinear attractor reconstructions 706 from the time-series data 708.

This process implements developments in quantum-neuro computing in which the algorithm of quantum computation is used to improve the efficiency of a neural computing system and those can be used in conjunction with the use of attractors to predict future behavior. The attractor approach is totally classical and not quantum mechanical. For example when delaying embedding to reconstruct the attractor, it is one simple process of delay embedding that occurs multiple times in parallel and therefore quantum computation can be used to realize parallelisms in real time to perform the process of delay embedding. The first implementation is to use Qubit neural network model based on 2-dimensional Qubits to construct attractors and provide predictions of future behavior as described herein and a second is to expand the Qubits to multi-dimensional Qudits for the same purposes and further investigate their characteristic features, such as the effects of quantum superposition and probabilistic interpretation in the way of applying quantum computing to neural network.

OAM Generation

Application of Orbital Angular Momentum to photons that are provided as input to Quantum Gates enable greater amounts of data to each individual photon. The use of OAM enables an arbitrary number of bits to be carried per photon. Achieving higher data carrying capacity is perhaps one of the primary interest of the computing community. This is led to the investigation of using different physical properties of a light wave for communications and data transmission, including amplitude, phase, wavelength and polarization. Orthogonal modes in spatial positions are also under investigation and seemed to be useful as well. Generally these investigative efforts can be summarized in 2 categories: 1) encoding and decoding more bits on a single optical pulse; a typical example is the use of advanced modulation formats, which encode information on amplitude, phase and polarization states, and 2) multiplexing and demultiplexing technologies that allow parallel propagation of multiple independent data channels, each of which is addressed by different light property (e.g., wavelength, polarization and space, corresponding to wavelength-division multiplexing (WDM), polarization-division multiplexing (PDM) and space division multiplexing (SDM), respectively). One manner for achieving the higher data capacity is through using OAM communications and computing which is a process of applying orbital angular momentum to communications/ quantum computing signals to prevent interference between signals and to provide for an increased bandwidth as described in U.S. patent application Ser. No. 14/864,511, entitled APPLICATION OF ORBITAL ANGULAR MOMENTUM TO FIBER, FSO AND RF, which is incorporated herein by reference in its entirety.

The recognition that orbital angular momentum (OAM) has applications in communication and quantum computing has made it an interesting research topic. It is well-known that a photon can carry both spin angular momentum and orbital angular momentum. Contrary to spin angular momentum (e.g., circularly polarized light), which is identified by the electrical field direction, OAM is usually carried by a light beam with a helical phase front. Due to the helical phase structure, an OAM carrying beam usually has an annular intensity profile with a phase singularity at the beam center. Importantly, depending on discrete twisting speed of the helical phase, OAM beams can be quantified is different states, which are completely distinguishable while propagating coaxially. This property allows OAM beams to be potentially useful in either of the two aforementioned categories to help improve the performance of a free space or fiber communication or quantum computing system. Specifically, OAM states could be used as a different dimension to encode bits on a single pulse (or a single photon), or be used to create additional data carriers in an SDM system.

There are some potential benefits of using OAM for communications and quantum computing, some specially designed novel fibers allow less mode coupling and cross talk while propagating in fibers. In addition, OAM beams with different states share a ring-shaped beam profile, which indicate rotational insensitivity for receiving the beams. Since the distinction of OAM beams does not rely on the wavelength or polarization, OAM multiplexing could be used in addition to WDM and PDM techniques so that potentially improve the system performance may be provided.

Figure 8:
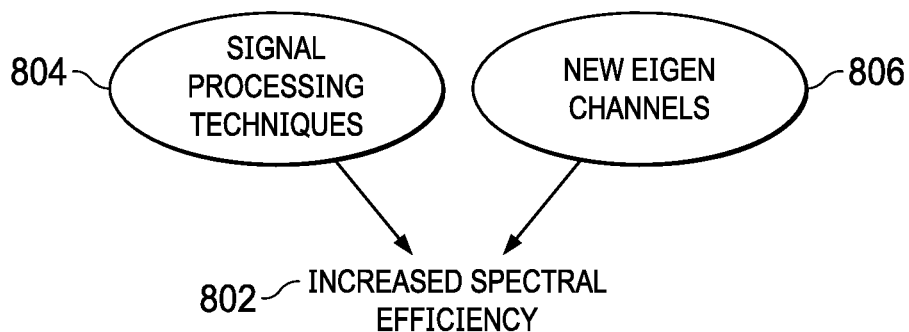
FIG. 8 illustrates various techniques for increasing spectral efficiency within a transmitted signal.

Referring now to the drawings, and more particularly to FIG. 8, wherein there is illustrated two manners for increasing spectral efficiency of a communications or quantum computing system. In general, there are basically two ways to increase spectral efficiency 802 of a communications or quantum computing system. The increase may be brought about by signal processing techniques 804 in the modulation scheme or using multiple access technique. Additionally, the spectral efficiency can be increase by creating new Eigen channels 806 within the electromagnetic propagation. These two techniques are completely independent of one another and innovations from one class can be added to innovations from the second class. Therefore, the combination of this technique introduced a further innovation.

Spectral efficiency 802 is the key driver of the business model of a communications or quantum computing system. The spectral efficiency is defined in units of bit/sec/hz and the higher the spectral efficiency, the better the business model. This is because spectral efficiency can translate to a greater number of users, higher throughput, higher quality or some of each within a communications or quantum computing system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 806, the innovations include diversity techniques including space and polarization diversity as well as multiple input/multiple output (MIMO) where uncorrelated radio paths create independent Eigen channels and propagation of electromagnetic waves.

Figure 9:
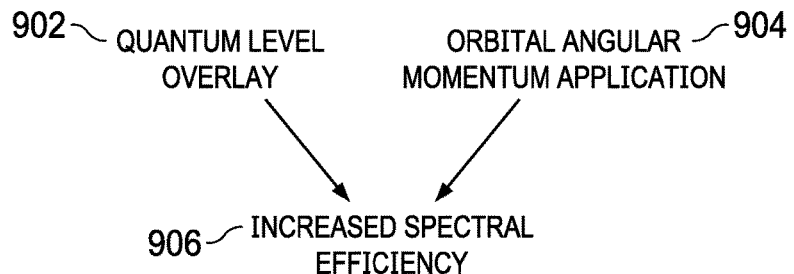
FIG. 9 illustrates a particular technique for increasing spectral efficiency within a transmitted signal.

Referring now to FIG. 9, the present system configuration introduces two techniques, one from the signal processing techniques 804 category and one from the creation of new eigen channels 806 category that are entirely independent from each other. Their combination provides a unique manner to disrupt the access part of an end to end communications or quantum computing system from twisted pair and cable to fiber optics, to free space optics, to RF used in cellular, backhaul and satellite, to RF satellite, to RF broadcast, to RF point-to point, to RF point-to-rn ultipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access. The first technique involves the use of a new signal processing technique using new orthogonal signals to upgrade QAM modulation using non-sinusoidal functions. This is referred to as quantum level overlay (QLO) 902. The second technique involves the application of new electromagnetic wavefronts using a property of electromagnetic waves or photon, called orbital angular momentum (QAM) 104. Application of each of the quantum level overlay techniques 902 and orbital angular momentum application 904 uniquely offers orders of magnitude higher spectral efficiency 906 within communication or quantum computing systems in their combination.

With respect to the quantum level overlay technique 909, new eigen functions are introduced that when overlapped (on top of one another within a symbol) significantly increases the spectral efficiency of the system. The quantum level overlay technique 902 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 904, this technique introduces twisted electromagnetic waves, or light beams, having helical wave fronts that carry orbital angular momentum (QAM). Different QAM carrying waves/beams can be mutually orthogonal to each other within the spatial domain, allowing the waves/beams to be efficiently multiplexed and demultiplexed within a link. OAM beams are interesting in communications or quantum computing due to their potential ability in special multiplexing multiple independent data carrying channels.

With respect to the combination of quantum level overlay techniques 902 and orbital angular momentum application 904, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications or quantum computing system from twisted pair and cable to fiber optics, to free space optics, to RF used in cellular, backhaul and satellite, to RF satellite, to RF broadcast, to RF point-to point, to RF point-to-multipoint, to RF point-to-point (backhaul), to RF point-to-point (fronthaul to provide higher throughput CPRI interface for cloudification and virtualization of RAN and cloudified HetNet), to Internet of Things (IOT), to Wi-Fi, to Bluetooth, to a personal device cable replacement, to an RF and FSO hybrid system, to Radar, to electromagnetic tags and to all types of wireless access.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

System providers are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 902 has an advantage that the independent channels are created within the symbols. This will have a tremendous cost and time benefit compared to other techniques. Also, the quantum layer overlay technique 902 is a physical layer technique, which means there are other techniques at higher layers of the protocol that can all ride on top of the QLO techniques 902 and thus increase the spectral efficiency even further. QLO technique 902 uses standard QAM modulation used in OFDM based multiple access technologies such as WIMAX or LTE. QLO technique 902 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 10:
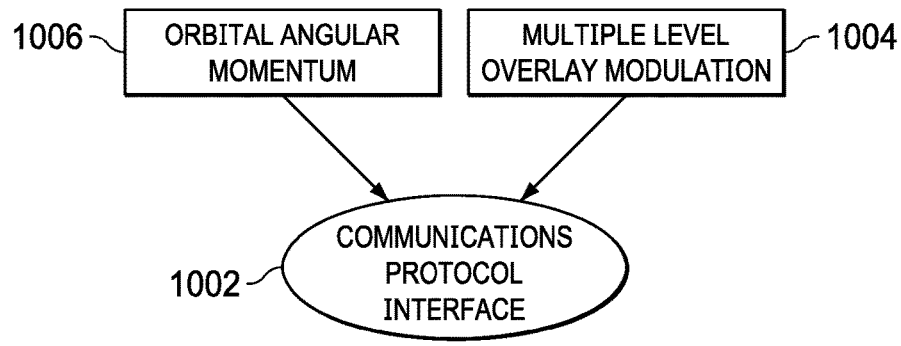
FIG. 10 illustrates a general overview of the manner for providing communication bandwidth between various communication protocol interfaces.

Referring now more particularly to FIG. 10, there is illustrated a general overview of the manner for providing improved communication and/or data transmission bandwidth within various interfaces 1002, using a combination of multiple level overlay modulation 1004 and the application of orbital angular momentum 1006 to increase the number of communications channels or amount of transmitted data.

The various interfaces 1002 may comprise a variety of links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 1004 with orbital angular momentum (OAM) technique 1006, a higher throughput over various types of links 1002 may be achieved. The use of multiple level overlay modulation alone without OAM increases the spectral efficiency of communication links 1002, whether wired, optical, or wireless. However, with OAM, the increase in spectral efficiency is even more significant.

Multiple overlay modulation techniques 1004 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 1004. Within the multiple level overlay modulation technique 1004, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals and/or data, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form:

$$\Delta t \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 1006 provides a twist to wave fronts of the electromagnetic fields carrying the data stream that may enable the transmission of multiple data streams on the same frequency, wavelength, or other signal-supporting mechanism. Similarly, other orthogonal signals may be applied to the different data streams to enable transmission of multiple data streams on the same frequency, wavelength or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 11:
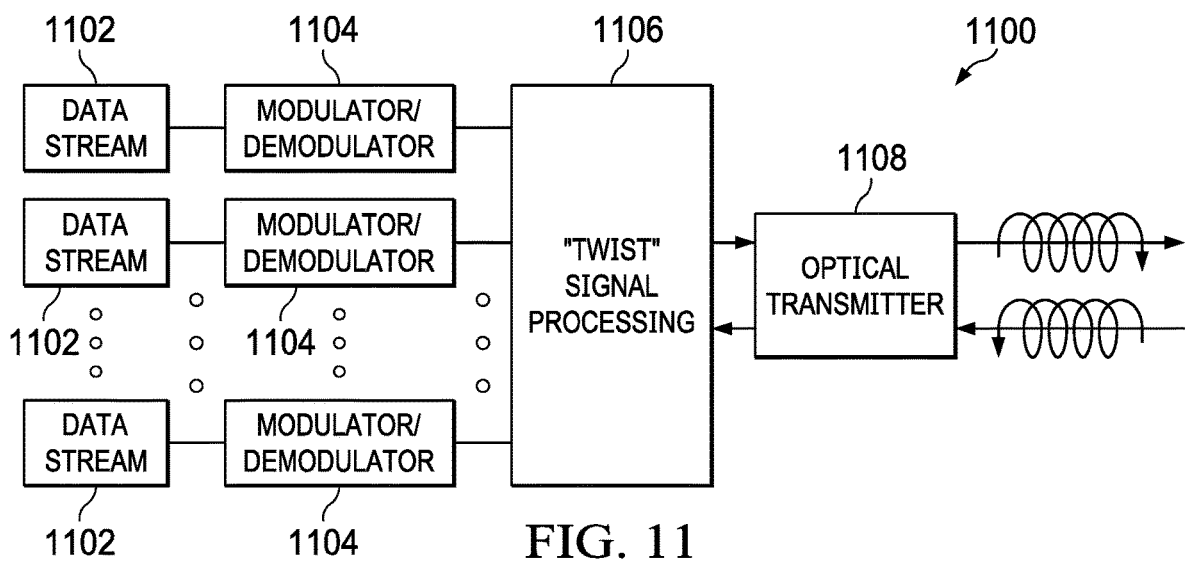
FIG. 11 is a functional block diagram of a system for generating orbital angular momentum within a communication system.

Referring now more particularly to FIG. 11, there is illustrated a functional block diagram of a system for generating the orbital angular momentum "twist" within a communication or quantum computing system, such as that illustrated with respect to FIG. 10, to provide a data stream that may be combined with multiple other data streams for transmission upon a same wavelength or frequency. Multiple data streams 1102 are provided to the transmission processing circuitry 1100. Each of the data streams 1102 comprises, for example, an end to end link connection carrying a voice call or a packet connection transmitting non-circuit switch packed data over a data connection. The multiple data streams 1102 are processed by modulator/demodulator circuitry 1104. The modulator/demodulator circuitry 1104 modulates the received data stream 1102 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 1106. The orbital angular momentum signal processing block 1106 applies in one embodiment an orbital angular momentum to a signal. In other embodiments, the processing block 1106 can apply any orthogonal function to a signal being transmitted. These orthogonal functions can be spatial Bessel functions, Laguerre-Gaussian functions, Hermite-Gaussian functions or any other orthogonal function. Each of the modulated data streams from the modulator/demodulator 1104 are provided a different orbital angular momentum by the orbital angular momentum electromagnetic block 1106 such that each of the modulated data streams have a unique and different orbital angular momentum associated therewith. Each of the modulated signals having an associated orbital angular momentum are provided to an optical transmitter 1108 that transmits each of the modulated data streams having a unique orbital angular momentum on a same wavelength. Each wavelength has a selected number of bandwidth slots B and may have its data transmission capability increase by a factor of the number of degrees of orbital angular momentum t that are provided from the OAM electromagnetic block 1106. The optical transmitter 1108 transmitting signals at a single wavelength could transmit B groups of information. The optical transmitter 1108 and OAM electromagnetic block 1106 may transmit l×B groups of information according to the configuration described herein.

In a receiving mode, the optical transmitter 1108 will have a wavelength including multiple signals transmitted therein having different orbital angular momentum signals embedded therein. The optical transmitter 1108 forwards these signals to the OAM signal processing block 1106, which separates each of the signals having different orbital angular momentum and provides the separated signals to the demodulator circuitry 1104. The demodulation process extracts the data streams 1102 from the modulated signals and provides it at the receiving end using the multiple layer overlay demodulation technique.

Figure 12:
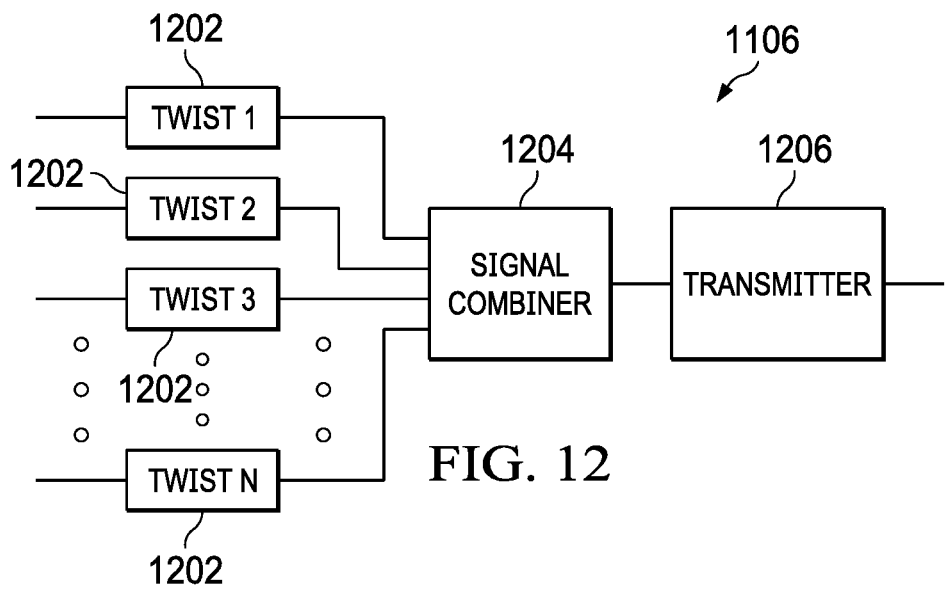
FIG. 12 is a functional block diagram of the orbital angular momentum signal processing block of FIG. 11.

Referring now to FIG. 12, there is provided a more detailed functional description of the OAM signal processing block 1106. Each of the input data streams are provided to OAM circuitry 1202. Each of the OAM circuitry 1202 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 1202 are unique to the data stream that is provided thereto. An infinite number of orbital angular momentums may be applied to different input data streams or photons using many different currents. Each of the separately generated data streams are provided to a signal combiner 1204, which combines/multiplexes the signals onto a wavelength for transmission from the transmitter 1206. The combiner 1204 performs a spatial mode division multiplexing to place all of the signals upon a same carrier signal in the space domain.

Figure 13:
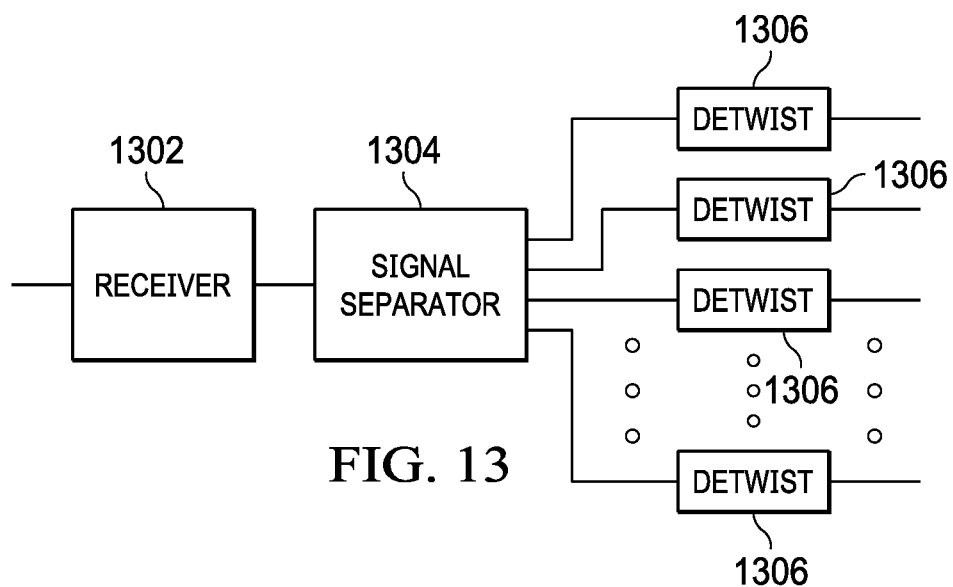
FIG. 13 is a functional block diagram illustrating the manner for removing orbital angular momentum from a received signal including a plurality of data streams.

Referring now to FIG. 13, there is illustrated the manner in which the OAM processing circuitry 1106 may separate a received signal into multiple data streams. The receiver 1302 receives the combined OAM signals on a single wavelength and provides this information to a signal separator 1304. The signal separator 1304 separates each of the signals having different orbital angular momentums from the received wavelength and provides the separated signals to OAM de-twisting circuitry 1306. The OAM de-twisting circuitry 1306 removes the associated OAM twist from each of the associated signals and provides the received modulated data stream for further processing. The signal separator 1304 separates each of the received signals that have had the orbital angular momentum removed therefrom into individual received signals. The individually received signals are provided to the receiver 1302 for demodulation using, for example, multiple level overlay demodulation as will be more fully described herein below.

Figure 14:
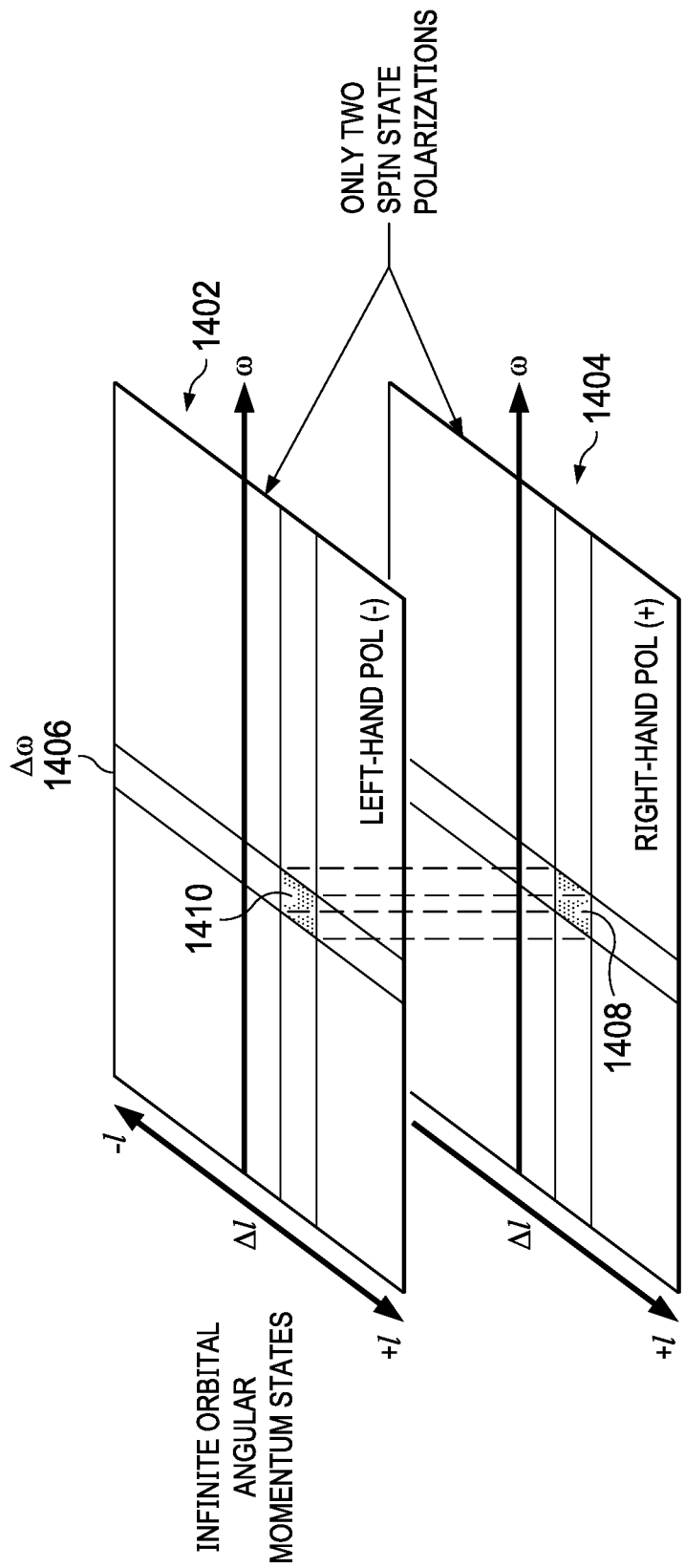
FIG. 14 illustrates a single wavelength having two quanti-spin polarizations providing an infinite number of signals having various orbital angular momentums associated therewith.

FIG. 14 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 1402 represents the potentially available signals for a left handed signal polarization, while the bottom grid 1404 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 1406 in both the left handed polarization plane 1402 and the right handed polarization plane 1404 can provide an infinite number of signals at different orbital angular momentum states Δl. Blocks 1408 and 1410 represent a particular signal having an orbital angular momentum Δl at a frequency Δω or wavelength in both the right handed polarization plane 1404 and left handed polarization plane 1410, respectively. By changing to a different orbital angular momentum within the same frequency Δω or wavelength 1406, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 14, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Figure 15A:
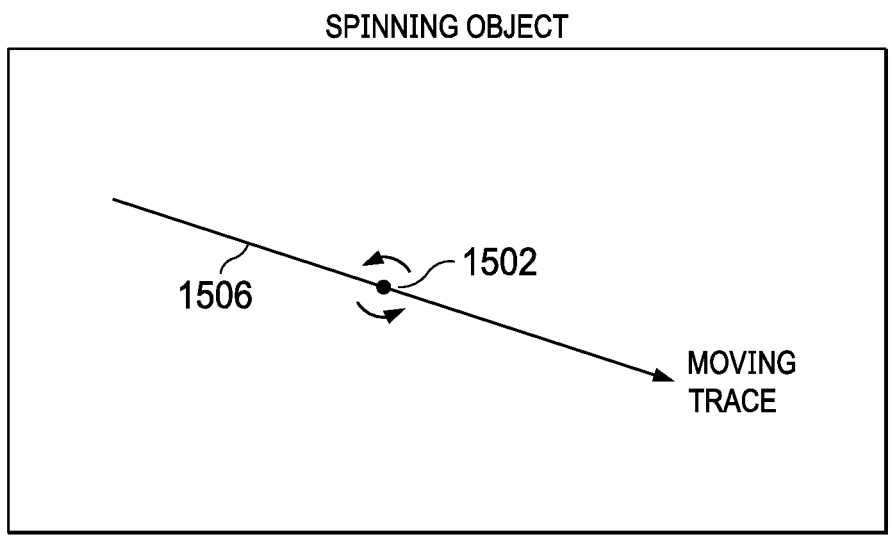
FIG. 15A illustrates an object with a spin angular momentum.
Figure 15B:
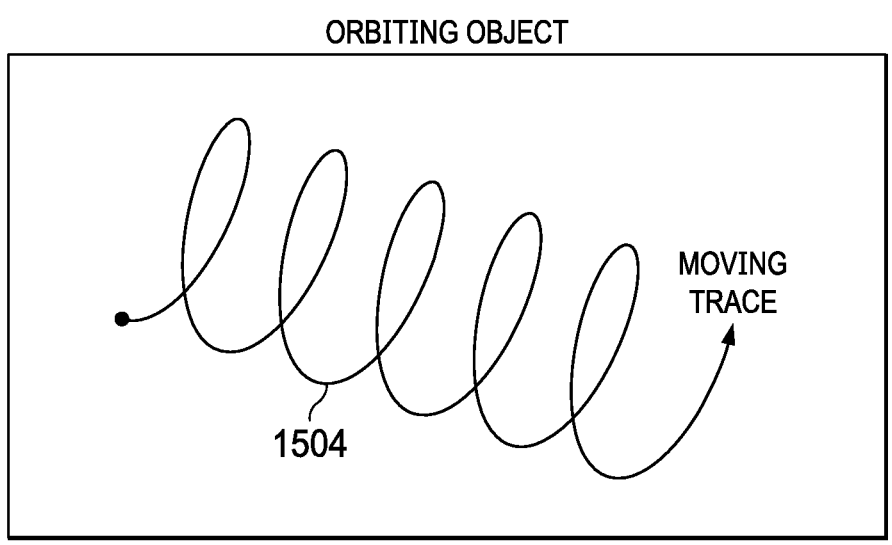
FIG. 15B illustrates an object with an orbital angular momentum.
Figure 15C:
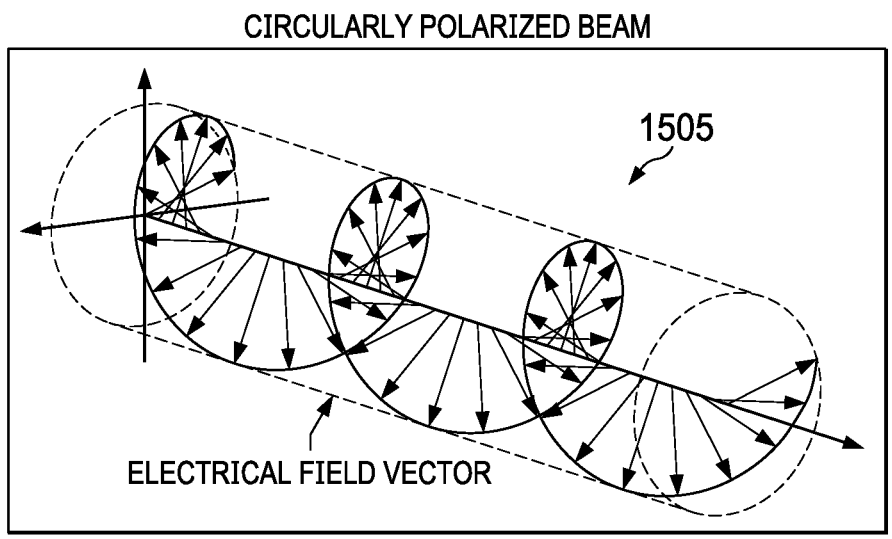
FIG. 15C illustrates a circularly polarized beam carrying spin angular momentum.
Figure 15D:
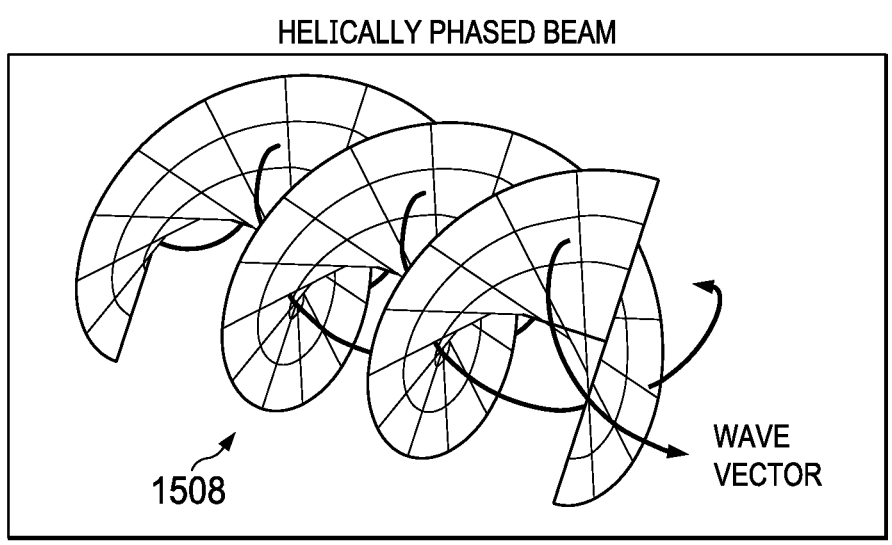
FIG. 15D illustrates the phase structure of a light beam carrying an orbital angular momentum.

It is well-known that the concept of linear momentum is usually associated with objects moving in a straight line. The object could also carry angular momentum if it has a rotational motion, such as spinning (i.e., spin angular momentum (SAM) 1502), or orbiting around an axis 1506 (i.e., OAM 1504), as shown in FIGS. 15A and 15B, respectively. A light beam may also have rotational motion as it propagates. In paraxial approximation, a light beam carries SAM 1502 if the electrical field rotates along the beam axis 1506 (i.e., circularly polarized light 1505), and carries OAM 1504 if the wave vector spirals around the beam axis 1506, leading to a helical phase front 1508, as shown in FIGS. 15C and 15D. In its analytical expression, this helical phase front 1508 is usually related to a phase term of exp(ilθ) in the transverse plane, where θ refers to the angular coordinate, and l is an integer indicating the number of intertwined helices (i.e., the number of 2π phase shifts along the circle around the beam axis). l could be a positive, negative integer or zero, corresponding to clockwise, counterclockwise phase helices or a Gaussian beam with no helix, respectively.

Two important concepts relating to OAM include: 1) OAM and polarization: As mentioned above, an OAM beam is manifested as a beam with a helical phase front and therefore a twisting wave vector, while polarization states can only be connected to SAM 1502. A light beam carries SAM 1502 of ±h/2π (h is Plank's constant) per photon if it is left or right circularly polarized, and carries no SAM 1502 if it is linearly polarized. Although the SAM 1502 and OAM 1504 of light can be coupled to each other under certain scenarios, they can be clearly distinguished for a paraxial light beam. Therefore, with the paraxial assumption, OAM 1504 and polarization can be considered as two independent properties of light. 2) OAM beam and Laguerre-Gaussian (LG) beam: In general, an OAM-carrying beam could refer to any helically phased light beam, irrespective of its radial distribution (although sometimes OAM could also be carried by a non-helically phased beam). An LG beam is a special subset among all OAM-carrying beams, due to that the analytical expression of LG beams are eigen-solutions of paraxial form of the wave equation in a cylindrical coordinates. For an LG beam, both azimuthal and radial wavefront distributions are well defined, and are indicated by two index numbers, l and p, of which i has the same meaning as that of a general OAM beam, and p refers to the radial nodes in the intensity distribution. Mathematical expressions of LG beams form an orthogonal and complete basis in the spatial domain. In contrast, a general OAM beam actually comprises a group of LG beams (each with the same l index but a different p index) due to the absence of radial definition. The term of "OAM beam" refers to all helically phased beams, and is used to distinguish from LG beams.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

-continued $$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where $\nabla$ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electrotonic states (the Aμ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Aμ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i^2 + \frac{\varepsilon_0}{2} \int d^3 x (|E|^2 + c^2 |B|^2)$$

Hamiltonian (total energy)

$$\frac{dU^{mech}}{dt} + \frac{dU^{em}}{dt} + \oint_{s'} d^2 x' \hat{n}' \cdot T = 0 \quad \text{conservation of energy}$$

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \quad \text{linear momentum}$$

$$\frac{dp^{mech}}{dt} + \frac{dp^{em}}{dt} + \oint_{s'} d^2 x' \hat{n}' \cdot S = 0$$

conservation of linear momentum

The conservation of system center of energy is represented by the equation:

$$R = \frac{1}{H} \sum_i (x_i - x_0) m_i \gamma_i c^2 + \frac{\varepsilon_0}{2H} \int d^3 x (x - x_0)(|E^2| + c^2 |B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2 x' \hat{n}' \cdot M = 0$$

conservation of angular momentum

For radiation beams in free space, the EM field angular momentum $J^{em}$ can be separated into two parts:

$$J^{em} = \varepsilon_0 \int_{V'} d^3 x' (E \times A) + \varepsilon_0 \int_{V'} d^3 x' E_i [(x' - x_0) \times \nabla] A_i$$

For each singular Fourier mode in real valued representation:

$$J^{em} = -i \frac{\varepsilon_0}{2\omega} \int_{V'} d^3 x' (E^* \times E) - i \frac{\varepsilon_0}{2\omega} \int_{V'} d^3 x' E_i [(x' - x_0) \times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em}=L^{em}+S^{em}$ are radiated all the way to the far field.

By using Poynting theorem, the optical vorticity of the signals may be determined according to the optical velocity equation:

$$\frac{\partial U}{\partial t} + \nabla \cdot S = 0, \text{ continuity equation}$$

where S is the Poynting vector $$S = \frac{1}{4}(E \times H^* + E^* \times H),$$

and U is the energy density $$U = \frac{1}{4}(\varepsilon |E|^2 + \mu_0 |H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left( \frac{E \times H^* + E^* \times H}{\varepsilon |E|^2 + \mu_0 |H|^2} \right)$$

Maxwell's Equations $$\text{Gauss' Laws} \quad \nabla \cdot D = \rho$$
$$\nabla \cdot B = 0$$
$$\text{Faraday's Law} \quad \nabla \times E = -\frac{\partial B}{\partial t}$$
$$\text{Ampere's Law} \quad \nabla \times H = J + \frac{\partial D}{\partial t}$$

$\nabla^2 E + k^2 E = 0$ (Full Wave Equation)

Wave Equations $$\frac{d^2 E}{dx^2} + \frac{d^2 E}{dy^2} + \frac{d^2 E}{dz^2} + k^2 E = 0 \quad \text{(Rectangular)}$$

$$\frac{1}{\rho}\frac{d}{d\rho}\left(\rho\frac{d}{d\rho}\right)E + \frac{1}{\rho^2}\frac{d^2}{d\varphi^2}E + \frac{d^2 E}{dz^2} + k^2 E = 0 \quad \text{(Cylindrical)}$$

Figure 16A:
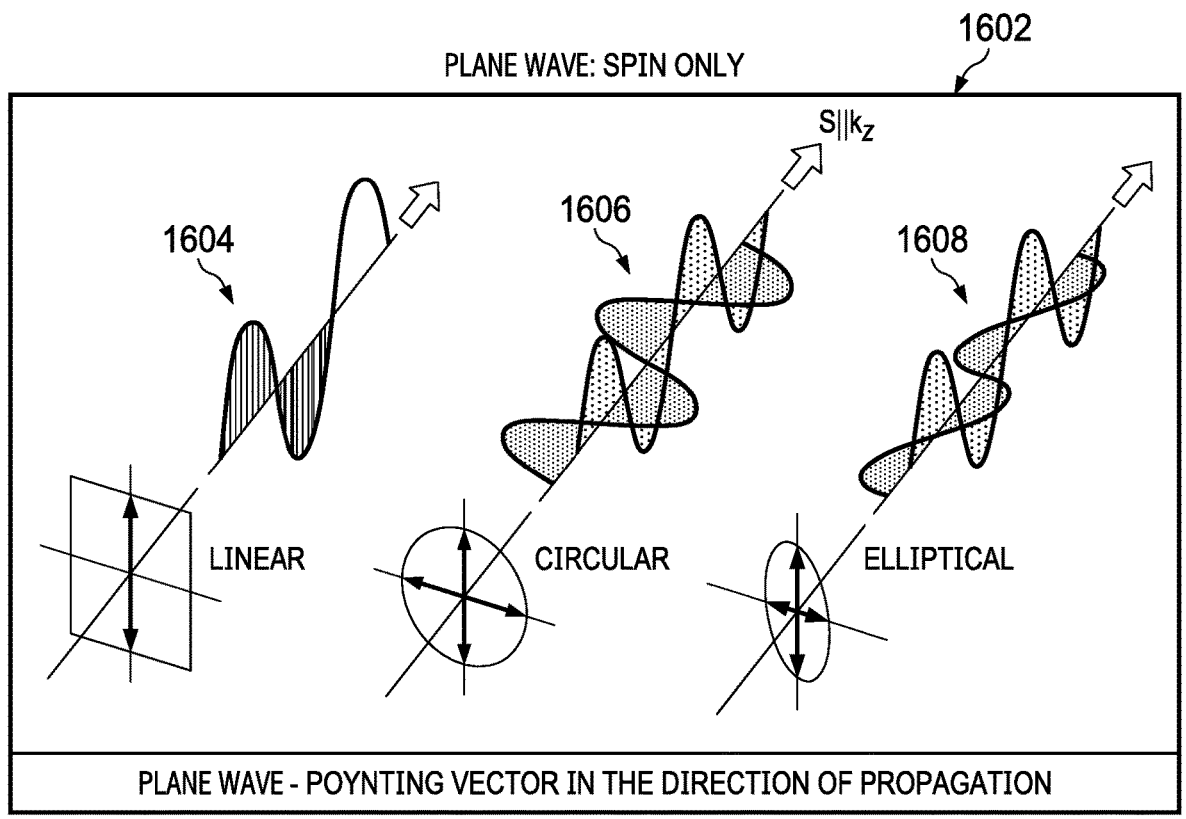
FIG. 16A illustrates a plane wave having only variations in the spin angular momentum.
Figure 16B:
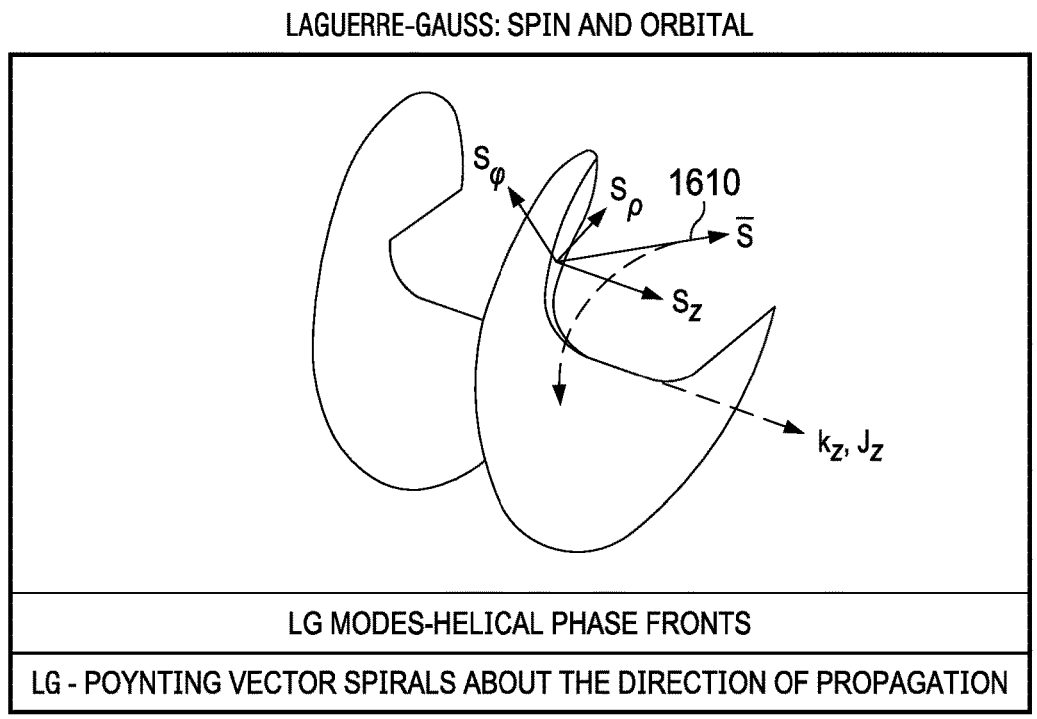
FIG. 16B illustrates a signal having both spin and orbital angular momentum applied thereto.

Referring now to FIGS. 16A and 16B, there is illustrated the manner in which a signal and its associated Poynting vector in a plane wave situation. In the plane wave situation illustrated generally at 1602, the transmitted signal may take one of three configurations. When the electric field vectors are in the same direction, a linear signal is provided, as illustrated generally at 1604. Within a circular polarization 1606, the electric field vectors rotate with the same magnitude. Within the elliptical polarization 1608, the electric field vectors rotate but have differing magnitudes. The Poynting vector remains in a constant direction for the signal configuration to FIG. 16A and always perpendicular to the electric and magnetic fields. Referring now to FIG. 16B, when a unique orbital angular momentum is applied to a signal as described here and above, the Poynting vector S 1610 will spiral about the direction of propagation of the signal. This spiral may be varied in order to enable signals to be transmitted on the same frequency as described herein.

Figure 17A:
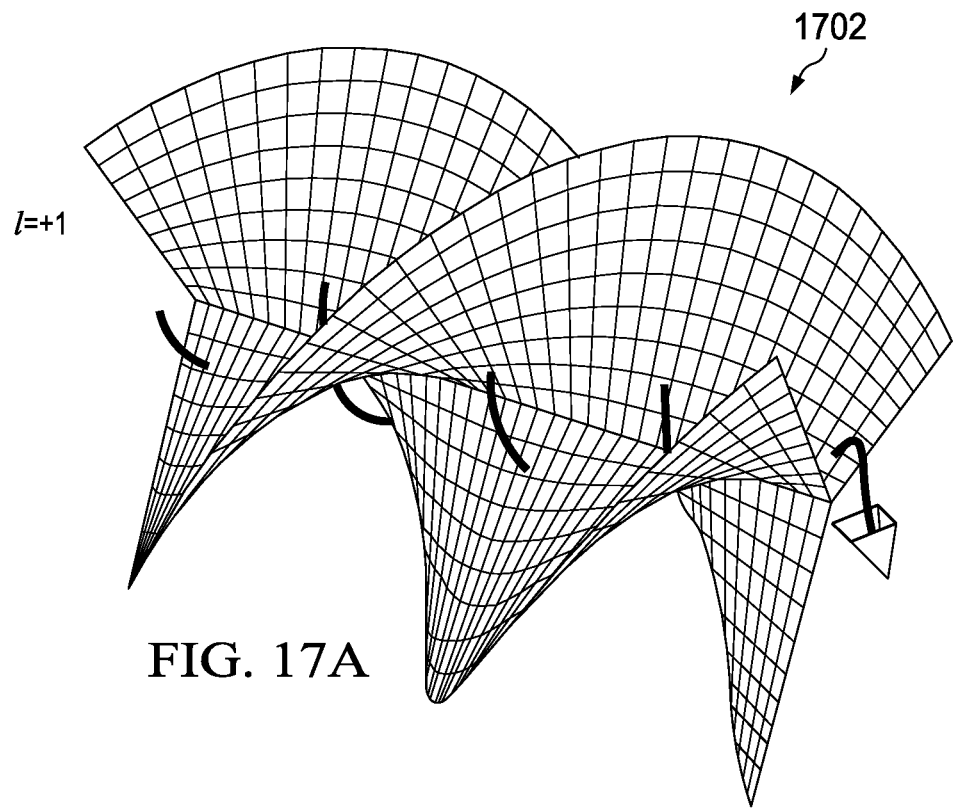
FIGS. 17A-17C illustrate various signals having different orbital angular momentum applied thereto.
Figure 17B:
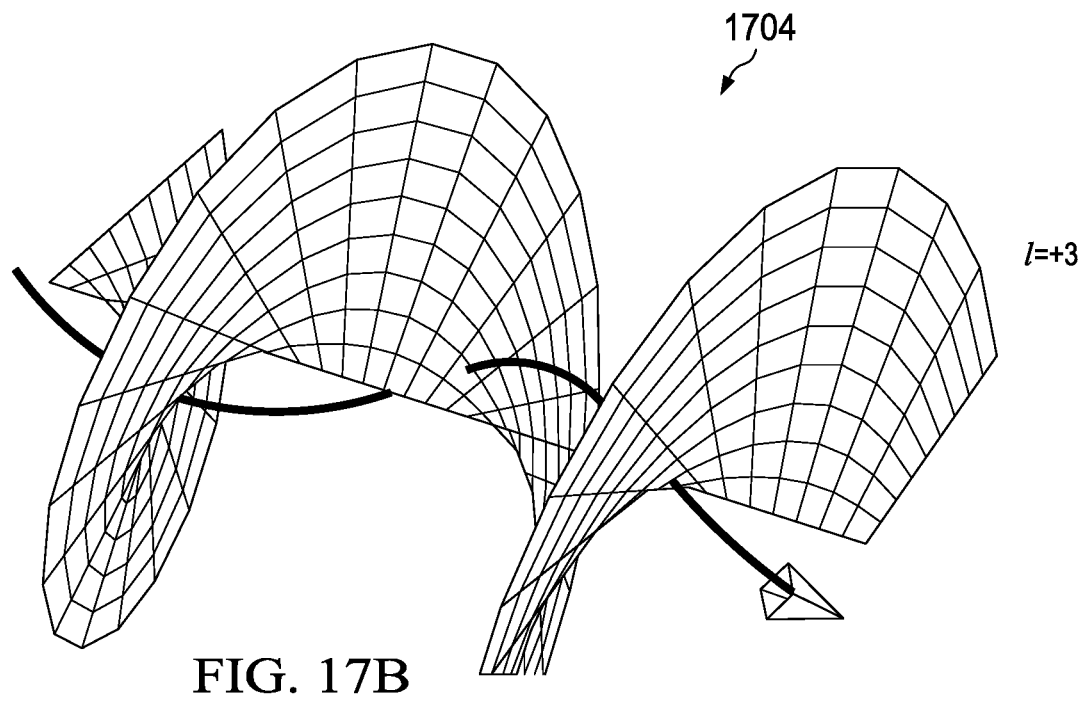
Figure 17C:
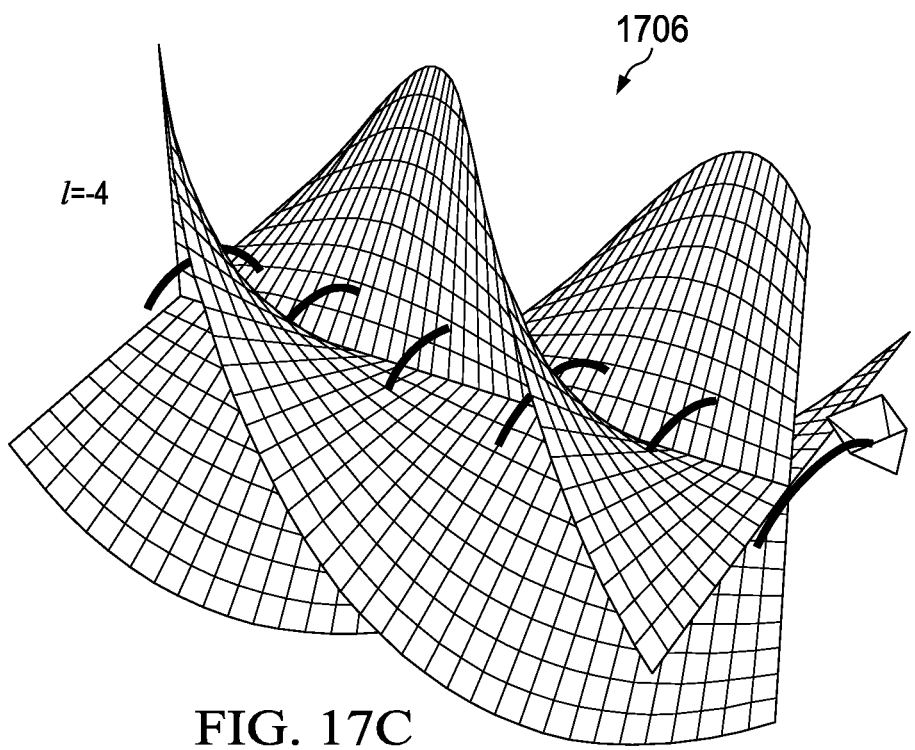

FIGS. 17A through 17C illustrate the differences in signals having different helicity (i.e., orbital angular momentums). Each of the spiraling Poynting vectors associated with the signals 1702, 1704, and 1706 provide a different shaped signal. Signal 1702 has an orbital angular momentum of +1, signal 1704 has an orbital angular momentum of +3, and signal 1706 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 17D:
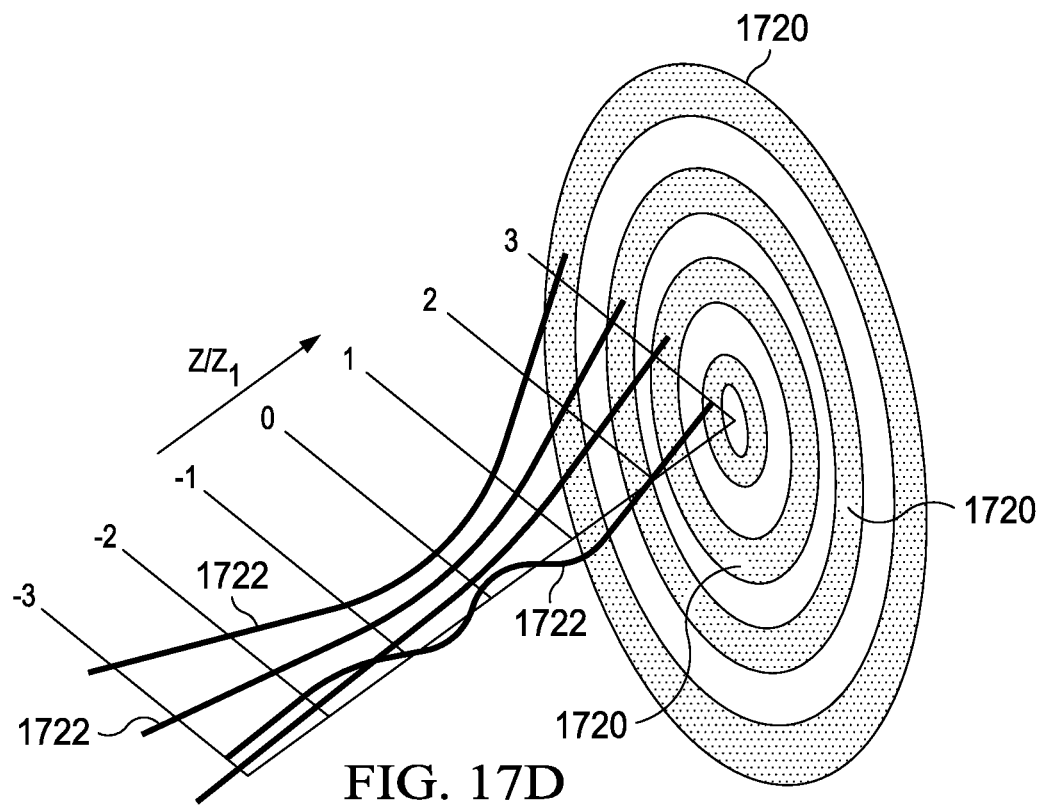
FIG. 17D illustrates a propagation of Poynting vectors for various Eigen modes.

FIG. 17D illustrates the propagation of Poynting vectors for various Eigen modes. Each of the rings 1720 represents a different Eigen mode or twist representing a different orbital angular momentum within the same frequency. Each of these rings 1720 represents a different orthogonal channel. Each of the Eigen modes has a Poynting vector 1722 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "l" or the amount of twist or OAM applied to the signal. Also, use of the orthogonal functions discussed herein above may also be multiplexed together onto a same signal in order to transmit multiple streams of information. The helicity index may be positive or negative. In wireless communications, different topological charges/orthogonal functions can be created and muxed together and de-muxed to separate the topological charges charges/orthogonal functions. The signals having different orthogonal function are spatially combined together on a same signal but do not interfere with each other since they are orthogonal to each other.

Figure 17E:
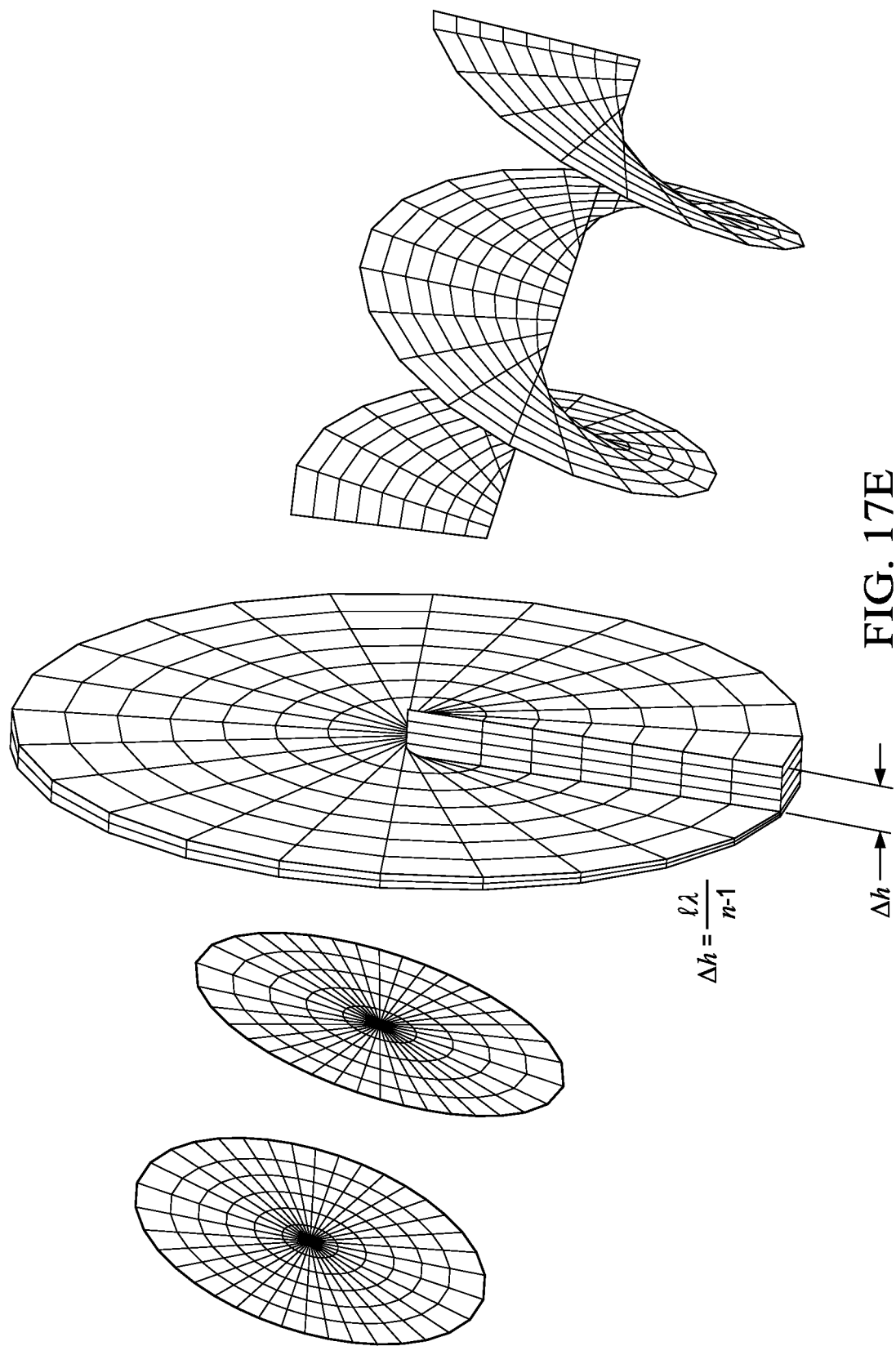
FIG. 17E illustrates a spiral phase plate.

The topological charges t s can be created using Spiral Phase Plates (SPPs) as shown in FIG. 17E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave (l=0) to a twisted RF wave of a specific helicity (i.e. l=+1).

Cross talk and multipath interference can be corrected using RF Multiple-Input-Multiple-Output (MIMO). Most of the channel impairments can be detected using a control or pilot channel and be corrected using algorithmic techniques (closed loop control system).

While the application of orbital angular momentum to various signals allow the signals to be orthogonal to each other and used on a same signal carrying medium, other orthogonal function/signals can be applied to data streams to create the orthogonal signals on the same signal media carrier.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta (Δf), a given signal transmitted through it in minimum time Δt will have an envelope described by certain time-bandwidth minimizing signals. The time-bandwidth products for these signals take the form:

$$\Delta t \Delta f = \tfrac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms. These types of orthogonal signals that reduce the time bandwidth product and thereby increase the spectral efficiency of the channel.

Hermite-Gaussian polynomials are one example of a classical orthogonal polynomial sequence, which are the Eigenstates of a quantum harmonic oscillator. Signals based on Hermite-Gaussian polynomials possess the minimal time-bandwidth product property described above, and may be used for embodiments of systems. However, it should be understood that other signals may also be used, for example orthogonal polynomials such as Jacobi polynomials, Gegenbauer polynomials, Legendre polynomials, Chebyshev polynomials, and Laguerre-Gaussian polynomials. Q-functions are another class of functions that can be employed as a basis for MLO signals.

In addition to the time bandwidth minimization described above, the plurality of data streams can be processed to provide minimization of the Space-Momentum products in spatial modulation. In this case:

$$\Delta x \Delta p = \frac{1}{2}$$

Processing of the data streams in this manner create wavefronts that are spatial. The processing creates wavefronts that are also orthogonal to each other like the OAM twisted functions but these comprise different types of orthogonal functions that are in the spatial domain rather than the temporal domain.

The above described scheme is applicable to twisted pair, coaxial cable, fiber optic, RF satellite, RF broadcast, RF point-to point, RF point-fo-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WEVLAX, WCDMA (with or without), multimedia broadcast multicast service (MBMS)/multiple input multiple output (MIMO), HSPA evolution, and LTE.

Hermite Gaussian Beams

Hermite Gaussian beams may also be used for transmitting orthogonal data streams. In the scalar field approximation (e.g. neglecting the vector character of the electromagnetic field), any electric field amplitude distribution can be represented as a superposition of plane waves, i.e. by:

$$E \propto \int\int \frac{dk_x dk_y}{(2\pi)^2} A(k_x, k_y) e^{ik_x x + ik_y y + ik_z z \sqrt{k^2 - k_x^2 - k_y^2}}$$

This representation is also called angular spectrum of plane waves or plane-wave expansion of the electromagnetic field. Here $A(k_x, k_y)$ is the amplitude of the plane wave. This representation is chosen in such a way that the net energy flux connected with the electromagnetic field is towards the propagation axis z. Every plane wave is connected with an energy flow that has direction k. Actual lasers generate a spatially coherent electromagnetic field which has a finite transversal extension and propagates with moderate spreading. That means that the wave amplitude changes only slowly along the propagation axis (z-axis) compared to the wavelength and finite width of the beam. Thus, the paraxial approximation can be applied, assuming that the amplitude function $A(k_x, k_y)$ falls off sufficiently fast with increasing values of $(k_x, k_y)$.

Two principal characteristics of the total energy flux can be considered: the divergence (spread of the plane wave amplitudes in wave vector space), defined as:

$$\text{Divergence} \propto \int\int \frac{dk_x dk_y}{(2\pi)^2} (K_x^2 + K_y^2) |A(k_x, k_y)|^2$$

and the transversal spatial extension (spread of the field intensity perpendicular to the z-direction) defined as:

$$\text{Transversal Extention} \propto \int_{-\infty}^{\infty} dx \int_{-\infty}^{\infty} dy (x^2 + y^2) |E|^2 = \int\int \frac{dk_x dk_y}{(2\pi)^2} \left[ \left|\frac{\partial A}{\partial x}\right|^2 + \left|\frac{\partial A}{\partial y}\right|^2 \right]$$

Let's now look for the fundamental mode of the beam as the electromagnetic field having simultaneously minimal divergence and minimal transversal extension, i.e. as the field that minimizes the product of divergence and extension. By symmetry reasons, this leads to looking for an amplitude function minimizing the product:

$$\left[ \int_{-\infty}^{\infty} \frac{dk_x}{(2\pi)} k_x^2 |A|^2 \right] \left[ \int_{-\infty}^{\infty} \frac{dk_x}{(2\pi)} \left|\frac{\partial A}{\partial k_x}\right|^2 \right] = \frac{\|A\|^4}{(8\pi^2)^2}$$

Thus, seeking the field with minimal divergence and minimal transversal extension can lead directly to the fundamental Gaussian beam. This means that the Gaussian beam is the mode with minimum uncertainty, i.e. the product of its sizes in real space and wave-vector space is the theoretical minimum as given by the Heisenberg's uncertainty principle of Quantum Mechanics. Consequently, the Gaussian mode has less dispersion than any other optical field of the same size, and its diffraction sets a lower threshold for the diffraction of real optical beams.

Hermite-Gaussian beams are a family of structurally stable laser modes which have rectangular symmetry along the propagation axis. In order to derive such modes, the simplest approach is to include an additional modulation of the form:

$$E_{m,n}^H = \int_{-\infty}^{\infty} \frac{dk_x dk_y}{(2\pi)^2} (ik_x)^m (ik_y)^n e^S$$

$$S(k_x, k_y, x, y, z) = ik_x x + ik_y y + ik_z z - \frac{W_0}{4}\left(1 + i\frac{Z}{Z_R}\right)[k_x^2 + k_y^2]$$

The new field modes occur to be differential derivatives of the fundamental Gaussian mode $E_0$.

$$E_{m,n}^H = \frac{\partial^{m+n}}{\partial x^m \partial y^n} E_0$$

Looking at the explicit form E0 shows that the differentiations in the last equation lead to expressions of the form:

$$\frac{\partial^P}{\partial x^p} e^{(-\alpha x^2)}$$

with some constant p and α. Using now the definition of Hermits' polynomials, $$H_p(x) = (-1)^p e^{(x^2)} \frac{d^P}{dx^P} e^{(-\alpha x^2)}$$

Then the field amplitude becomes $$E_{m,n}^H(x, y, z) = \sum_m \sum_n C_{mn} E_0 \frac{w_0}{w(z)} H_m\left(\sqrt{2}\, \frac{x}{w(z)}\right)$$

$$H_n\left(\sqrt{2}\, \frac{y}{w(z)}\right) e^{-\frac{(x^2+y^2)}{w(z)^2}} e^{-j(m+n+1)\tan^{-1} z/z_R} e^{-\frac{(x^2+y^2)}{2R(z)}}$$

Where
$$\rho^2 = x^2 + y^2$$

$$\xi = \frac{z}{z_R}$$

and Rayleigh length $z_R$ $$z_R = \frac{\pi w_0^2}{\lambda}$$

And beam diameter $$w(\xi) = w_0 \sqrt{(1+\xi^2)}$$

In cylindrical coordinates, the field takes the form:

$$E_{L,p}^L(\rho, \varphi, z) = \sum_l \sum_{np} C_{lp} E_0 \frac{w_0}{w(z)} \left(\sqrt{2}\, \frac{\rho}{w(z)}\right)^l$$

$$L_p^l\left(\sqrt{2}\, \frac{\rho}{w(z)}\right) e^{\frac{-\rho^2}{w(z)^2}} e^{-j(2p+l+1)\tan^{-1} z/z_R} e^{jl\varphi} e^{\frac{-jk\rho^2}{2R(z)}}$$

Where $L_p^l$ is Laguerre functions.

Mode division multiplexing (MDM) of multiple orthogonal beams increases the system capacity and spectral efficiency in optical communication systems. For free space systems, multiple beams each on a different orthogonal mode can be transmitted through a single transmitter and receiver aperture pair. Moreover, the modal orthogonality of different beans enables the efficient multiplexing at the transmitter and demultiplexing at the receiver.

Different optical modal basis sets exist that exhibit orthogonality. For example, orbital angular momentum (OAM) beams that are either Laguerre Gaussian (LG or Laguerre Gaussian light modes may be used for multiplexing of multiple orthogonal beams in free space optical and RF transmission systems. However, there exist other modal groups that also may be used for multiplexing that do not contain OAM. Hermite Gaussian (HG) modes are one such modal group. The intensity of an $HG_{m,n}$ beam is shown according to the equation:

$$I(x, y, z) = C_{m,n} H_m^2$$

$$\left(\frac{\sqrt{2}\, x}{w(z)}\right) H_n^2\left(\frac{\sqrt{2}\, y}{w(z)}\right) \times \exp\left(-\frac{2x^2}{w(z)^2} - \frac{2y^2}{w(z)^2}\right), \; w(z) = w_0\sqrt{1 + [\lambda z/\pi w_0^2]}$$

in which $H_m(*)$ and $H_n(*)$ are the Hermite polynomials of the mth and nth order. The value $w_0$ is the beam waist at distance Z=0. The spatial orthogonality of HG modes with the same beam waist $w_0$ relies on the orthogonality of Hermite polynomial in x or y directions.

Figure 18:
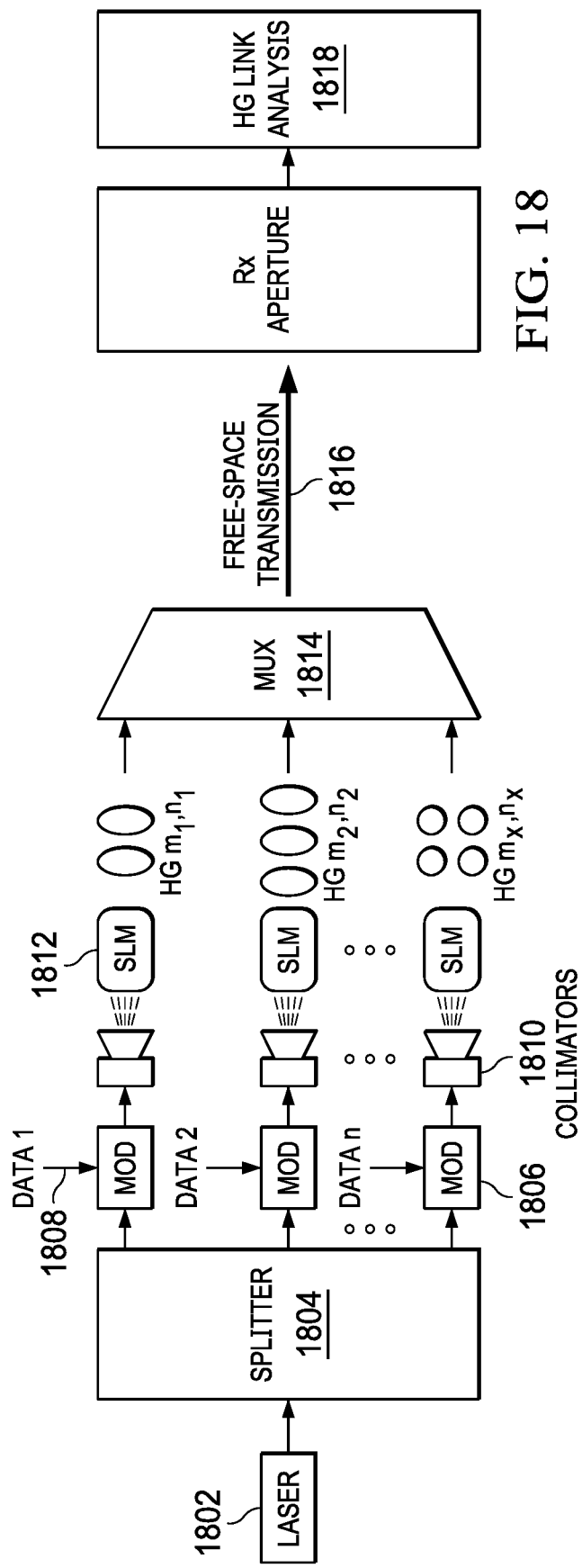
FIG. 18 illustrates a system for using the orthogonality of an HG modal group for free space spatial multiplexing.

Referring now to FIG. 18, there is illustrated a system for using the orthogonality of an HG modal group for free space spatial multiplexing in free space. A laser 1802 is provided to a beam splitter 1804. The beam splitter 1804 splits the beam into multiple beams that are each provided to a modulator 1806 for modulation with a data stream 1808. The modulated beam is provided to collimators 1810 that provides a collimated light beam to spatial light modulators 1812. Spatial light modulators (SLM's) 1812 may be used for transforming input plane waves into HG modes of different orders, each mode carrying an independent data channel. These HG modes are spatially multiplexed using a multiplexer 1814 and coaxially transmitted over a free space link 1816. At the receiver 1818 there are several factors that may affect the demultiplexing of these HG modes, such as receiver aperture size, receiver lateral displacement and receiver angular error. These factors affect the performance of the data channel such as signal-to-noise ratio and crosstalk.

With respect to the characteristics of a diverged $HG_{m,0}$ beam (m=0-6), the wavelength is assumed to be 1550 nm and the transmitted power for each mode is 0 dBm. Higher order HG modes have been shown to have larger beam sizes. For smaller aperture sizes less power is received for higher order HG modes due to divergence.

Since the orthogonality of HG modes relies on the optical field distribution in the x and y directions, a finite receiver aperture may truncate the beam. The truncation will destroy the orthogonality and cost crosstalk of the HG channels. When an aperture is smaller, there is higher crosstalk to the other modes. When a finite receiver is used, if an HG mode with an even (odd) order is transmitted, it only causes cross talk to other HG modes with even (odd) numbers. This is explained by the fact that the orthogonality of the odd and even HG modal groups remains when the beam is systematically truncated.

Moreover, misalignment of the receiver may cause crosstalk. In one example, lateral displacement can be caused when the receiver is not aligned with the beam axis. In another example, angular error may be caused when the receiver is on axis but there is an angle between the receiver orientation and the beam propagation axis. As the lateral displacement increases, less power is received from the transmitted power mode and more power is leaked to the other modes. There is less crosstalk for the modes with larger mode index spacing from the transmitted mode.

Mode Conversion Approaches

Figure 19:
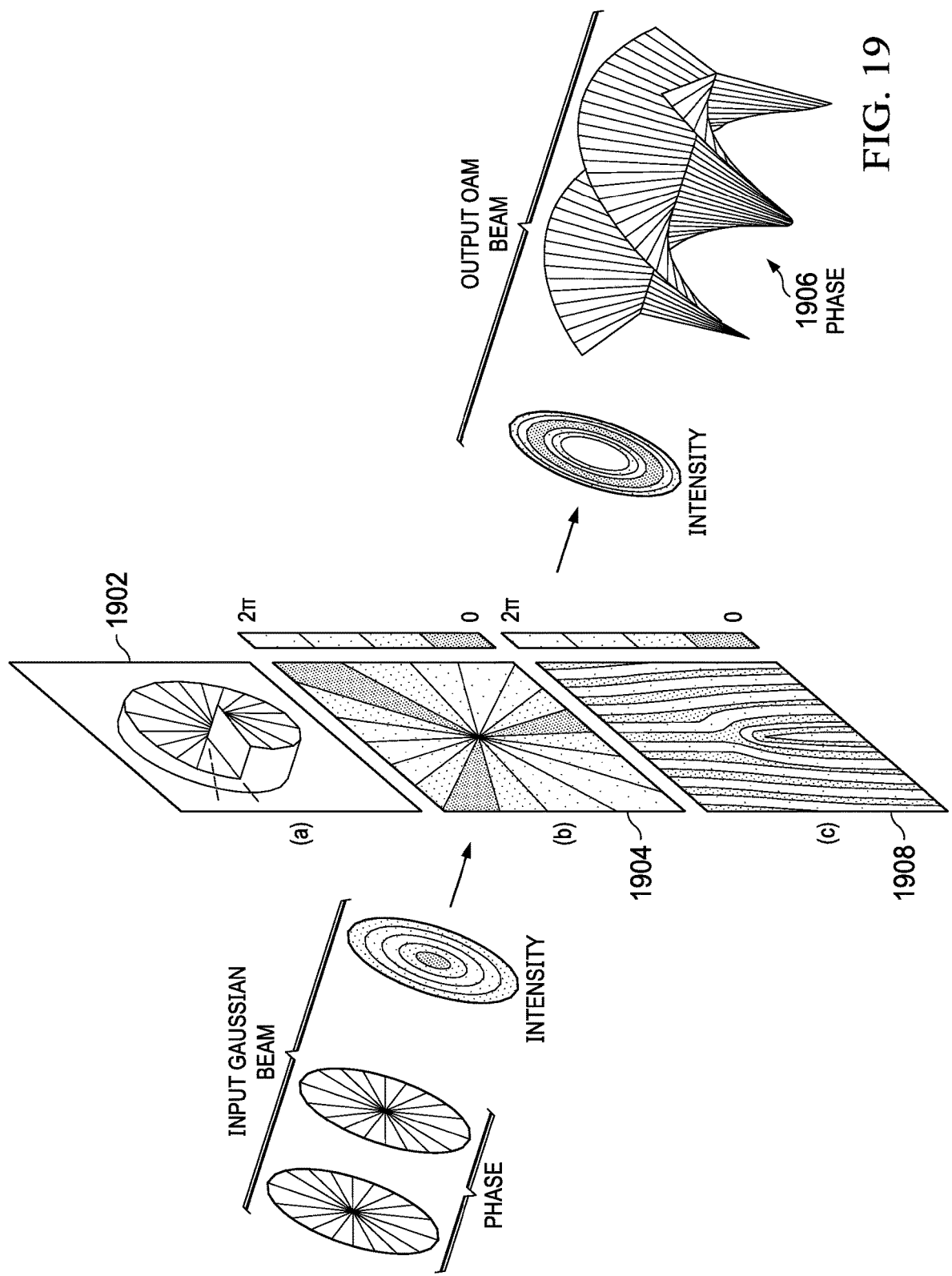
FIG. 19 illustrates various manners for converting a Gaussian beam into an OAM beam.

Referring now to FIG. 19, among all external-cavity methods, perhaps the most straightforward one is to pass a Gaussian beam through a coaxially placed spiral phase plate (SPP) 1902. An SPP 1902 is an optical element with a helical surface, as shown in FIG. 17E. To produce an OAM beam with a state of C, the thickness profile of the plate should be machined as $l\lambda\theta/2\pi(n-1)$, where n is the refractive index of the medium. A limitation of using an SPP 1902 is that each OAM state requires a different specific plate. As alternative, reconfigurable diffractive optical elements, e.g., a pixelated spatial light modulator (SLM) 1904, or a digital micro-mirror device can be programmed to function as any refractive element of choice at a given wavelength. As mentioned above, a helical phase profile exp(ilθ) converts a linearly polarized Gaussian laser beam into an OAM mode, whose wave front resembles an E-fold corkscrew 1906, as shown at 1904. Importantly, the generated OAM beam can be easily changed by simply updating the hologram loaded on the SLM 1904. To spatially separate the phase-modulated beam from the zeroth-order non-phase-modulated reflection from the SLM, a linear phase ramp is added to helical phase code (i.e., a "fork"-like phase pattern 19 08 to produce a spatially distinct first-order diffracted OAM beam, carrying the desired charge. It should also be noted that the aforementioned methods produce OAM beams with only an azimuthal index control. To generate a pure LG_(l,p) mode, one must jointly control both the phase and the intensity of the wavefront. This could be achieved using a phase-only SLM with a more complex phase hologram.

OAM Generation with Digital Light Processing

Figure 20:
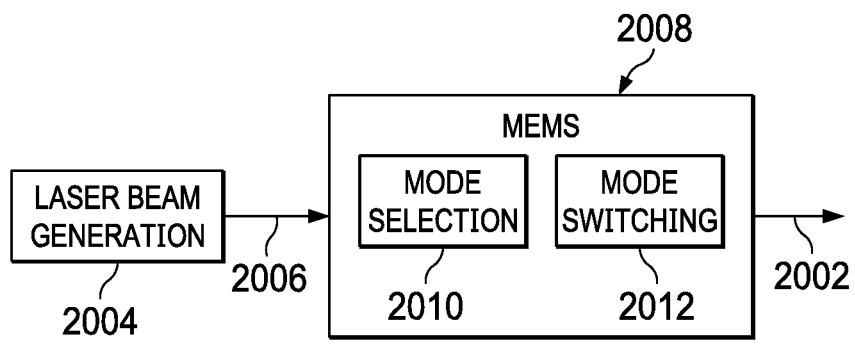
FIG. 20 illustrates a manner for generating a light beam including orthogonal functions.

The OAM signals used within quantum computers as described above may be generated using Digital Light Processors. Digital light processing comprises digital light processors that are display devices based on optical micro-electro-mechanical technology that uses a digital micromirror device using for example technologies disclosed in U.S. patent application Ser. No. 14/864,511, entitled SYSTEM AND METHOD FOR APPLYING ORTHOGONAL LIMITATIONS TO LIGHT BEAMS USING MICROELECTRO-MECHANICAL SYSTEMS, which is incorporated herein by reference in its entirety. Referring now to FIG. 20, there is illustrated a further manner for generating a light beam 2002 including orthogonal functions such as OAM, Hermite Gaussian, Laguerre Gaussian, etc., therein to encode information in the beam. The laser beam generator 2004 generates a beam 2006 including plane waves that is provided to a MicroElectroMechanical system (MEMs) device 2008. Examples of MEMs devices 2008 include digital light processing projectors or digital micro-mirror devices (DMDs) that enable the generation of light beams having various characteristics. A MEMs device 2008 can generate Hermite Gaussian (HG) modes, Laguerre Gaussian (LG) modes and vortex OAM modes that are programmed responsive to inputs to the MEMs device 2008. The MEMs device 2008 has mode selection logic 2010 that enable selection of the Laguerre Gaussian, Hermite Gaussian and vortex OAM modes (or other orthogonal function modes) for processing of the incoming light beam 2006. The MEMs device 2008 further enables switching between the different modes at a very high rate of a few thousand times per second which is not achievable using spatial light modulator (SLMs). Switching between the modes is controlled via mode switching logic 2012. This fast switching enables these forms of OAM, HG or LG mode generation for communications as well as quantum key distribution (QKD) and quantum computers for quantum information processing. The orthogonal characteristics of Laguerre-Gaussian (LG) with OAM and Hermite-Gaussian (HG) beams combined with high-speed switching of MEMs make the device useful in achieving higher data capacity. This is possible using holograms that are programmed into the memory of a digital light processor that program micro-mirrors to selected positions and can twist a light beam with programmed information using the mirrors.

This enables the on-demand realization of binary gratings (holograms) that can be switched between at very high speed using an external digital signal. Using, for example, digital light processing technologies, a switch between different modes (different binary gratings) may be achieved at a very high rate of speed of a few thousand times per second which is not achievable using spatial light modulators (SLMs). This allows for the dynamic control of helicities provided to a beam of light for a new modulation and/or multiple access technique to encode information.

Digital light processors allow for high resolution and accuracy from micrometers to millimeters thus enabling a variety of frequencies from infrared to ultraviolet to be utilized. The use of digital light processors for MDM (mode division multiplexing) minimizes color, distance, movement and environmental sensitivity and is thus ideal for building integrated optics. The majority of SLM's are limited by a frame refresh rate of about 60 Hz which makes the high speed, wide range of operational spectral bandwidth of digital micro-mirror devices (DMD's) useful in a variety of applications. DMD designs inherently minimize temperature sensitivity for reliable 3-D wave construction.

The vast majority of commercially available SLM devices are limited to frame rate of about 60 Hz which considerably limits the speed of operation of any system based on this technology. A DMD is an amplitude only spatial light modulator. The high speed, wide range of operational spectral bandwidth and high power threshold of a DMDs makes the device a useful tool for variety of applications. Variations of DMD's are commercially available for a fraction of the cost of a phase only SLM. Intensity shaping of spatial modes can be achieved by switching the micro mirrors on and off rapidly. However, the modes created during this process may not be temporally stable and have the desired intensity profile only when averaged by a slow detector.

Phase and amplitude information may be encoded by modulating the position and width of a binary amplitude grating implemented within a hologram such as those illustrated in FIGS. 21A-21H. By implementing such holograms to control a DMD, HG modes, LG modes, OAM vortex modes or any angular (ANG) mode may be created by properly programming the DMD with a hologram. Additionally, the switching between the generated modes may be performed at a very high speed.

This approach may be realized by considering a one-dimensional binary amplitude grating. The transmission function for this grating can be written as:

$$\tau(x) = \sum_{n=-\infty}^{\infty} \prod \left[ \frac{x - (n+k)x_0}{wx_0} \right]$$

where $$\prod(v) = Rect(v) = \begin{Bmatrix} 1 & \text{if } |v| \le 1 \\ 0 & \text{else} \end{Bmatrix}$$

This function can be pictured as a pulse train with a period of $x_0$. The parameters of "k" and "w" are unitless quantities that set the position and the width of each pulse and are equal to constant values for a uniform grating. It is possible to locally change the value of these parameters to achieve phase and amplitude modulations of the optical field. The transmittance function x(x) is a periodic function and can be expanded as a Fourier series.

In a case where k(x) and w(x) are functions of x and the binary grating is illuminated by a monochromatic plane wave. The first order diffracted light can be written as:

$$\tau_1(x) = \frac{1}{\pi}\sin[\pi w(x)]e^{i2\pi k(x)}$$

Thus, w(x) is related to the amplitude of the diffracted light while k(x) sets its phase. Therefore, the phase and the amplitude of the diffracted light can be controlled by setting the parameters k(x) and w(x). In communication theory, these methods are sometimes referred to as pulse position modulation (PPM) and pulse width modulation (PWM). The equation above is a good approximation for slowly varying k(x) and w(x) functions.

The above analysis treats a one-dimensional case. A two dimensional grating can be generated by thresholding a rapidly varying modulated carrier as:

$$\tau(x, y) = \frac{1}{2} + \frac{1}{2}\text{sgn}\{\cos[2\pi x/x_0 + \pi k(x, y)] - \cos[\pi w(x, y)]\}$$

Here, sgn(x, y) is the sign function. This may be checked in the limit where w(x,y) and k(x,y). One can find the corresponding w(x,y) and k(x,y) functions for a general complex scalar field:

scaler field=$A(x,y)e^{i\varphi(x,y)}$

According to the Relations $$w(x, y) = \frac{1}{\pi}\sin^{-1}[A(x, y)]$$

$$k(x, y) = \frac{1}{\pi}\varphi(x, y)$$

One could design 2-D binary amplitude holograms to generate LG modes. The gratings holograms designed for vortex modes would have a fairly uniform width across the aperture whereas for the case of LG modes, the gratings gradually disappear when the amplitude gets negligibly small.

Figure 22A:
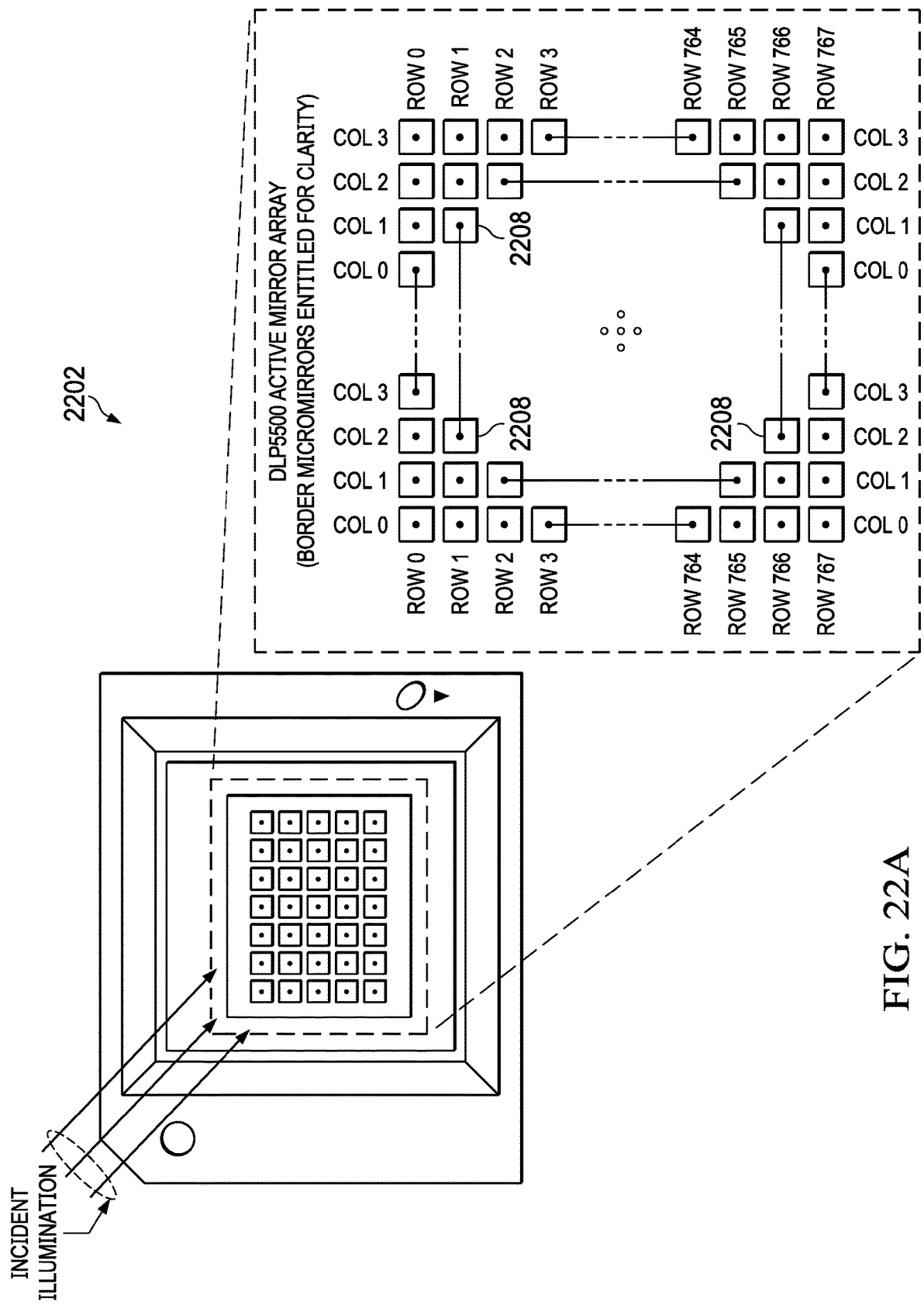
FIG. 22A is a block diagram of a digital micro-mirror device.

A digital micro-mirror device (DMD) is an amplitude only spatial light modulator. The device consist of an array of micro mirrors that can be controlled in a binary fashion by setting the deflection angle of an individual mirror to either +12° or −12°. Referring now to FIG. 22A, there is illustrated a general block diagram of a DMD 2202. The DMD 2202 includes a plurality of micro-mirrors 2208 arranged in an X by Y array. The array may comprise a 1024×768 array of aluminum micro-mirrors such as that implemented in the digital light processor 5500 DMD Array. However, it will be appreciated that other array sizes and DMD devices may be used. Each micro-mirror 2208 includes a combination of opto-mechanical and electro-mechanical elements. Each micro-mirror 2208 comprises a pixel of the DMD 2202. The micro-mirror 2208 is an electromechanical element having two stable micro-mirror states of +12° and −12°. The micro-mirrors have a 10.8 micrometer pitch and are designed for light having a wavelength of 420 nm-700 nm. The state of the micro-mirror 2208 is determined by the geometry and electrostatics of the pixel during operation. The two positions of the micro-mirror 2208 determine the direction that the light beam striking the mirror is deflected. In particular, the DMD 2202 is a spatial light modulator. By convention, the positive (+) state is tilted toward the illumination and is referred to as the "on" state. Similarly, the negative (−) state is tilted away from the illumination and is referred to as the "off" state.

Figure 22B:
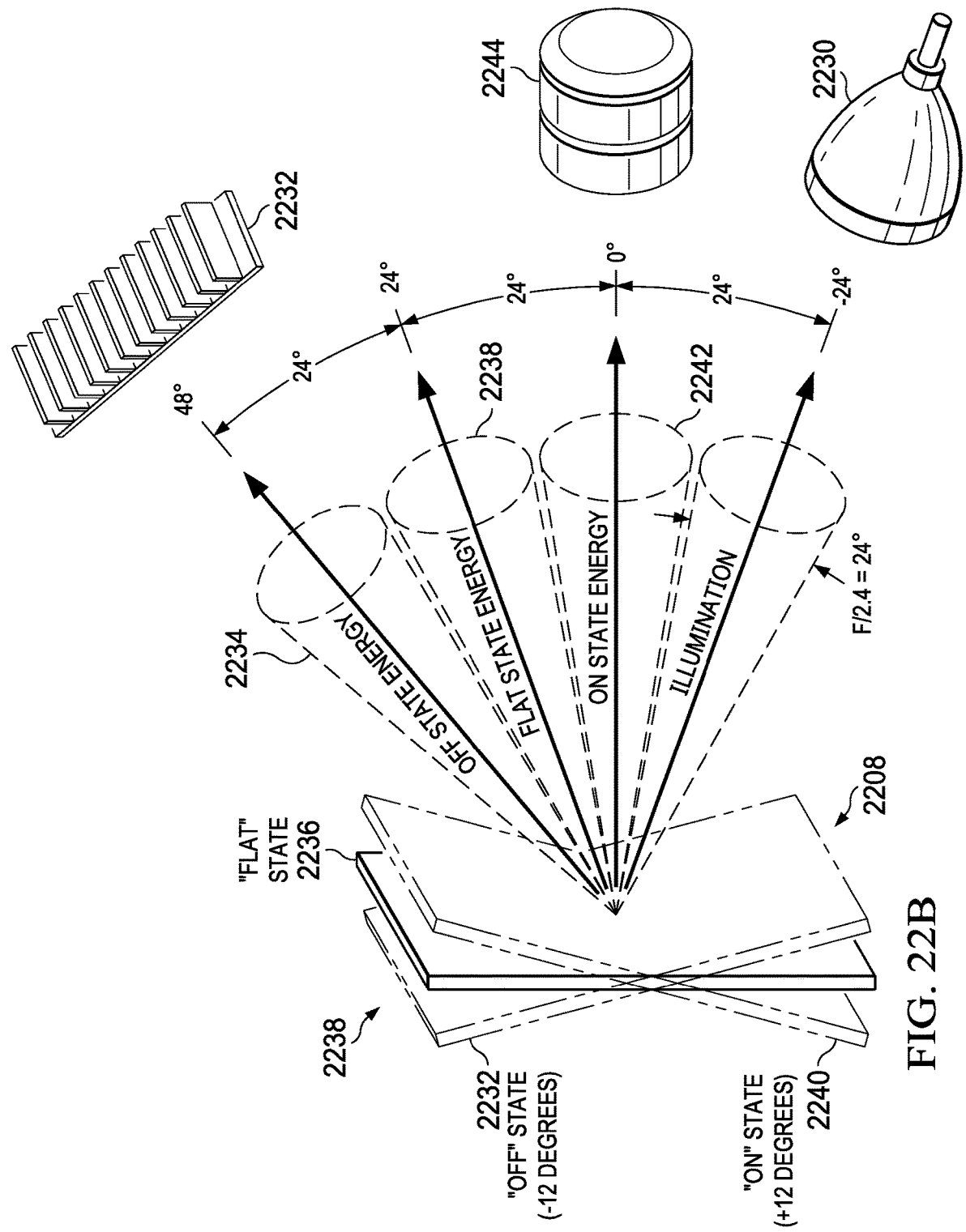
FIG. 22B illustrates the manner in which a micro-mirror interacts with a light source.

FIG. 22B illustrates the manner in which a micro-mirror 2208 will interact with a light source 2230 such as a laser. The light source 2230 shines a beam along angle of −24° that strikes the micro-mirror 2208. When the mirror is in the "off" state 2232 at an angle of −12°, the off state energy 2234 is reflected at an angle of 48°. When the mirror 2208 is positioned at the flat state 2236 of 0°, the flat state energy 2238 is reflected in an angle of 24°. Finally, when the mirror is at +12° in the "on" state 2240, the on state energy 2242 is reflected at 0° through the projection lens 2234 of a DMD.

Figure 23:
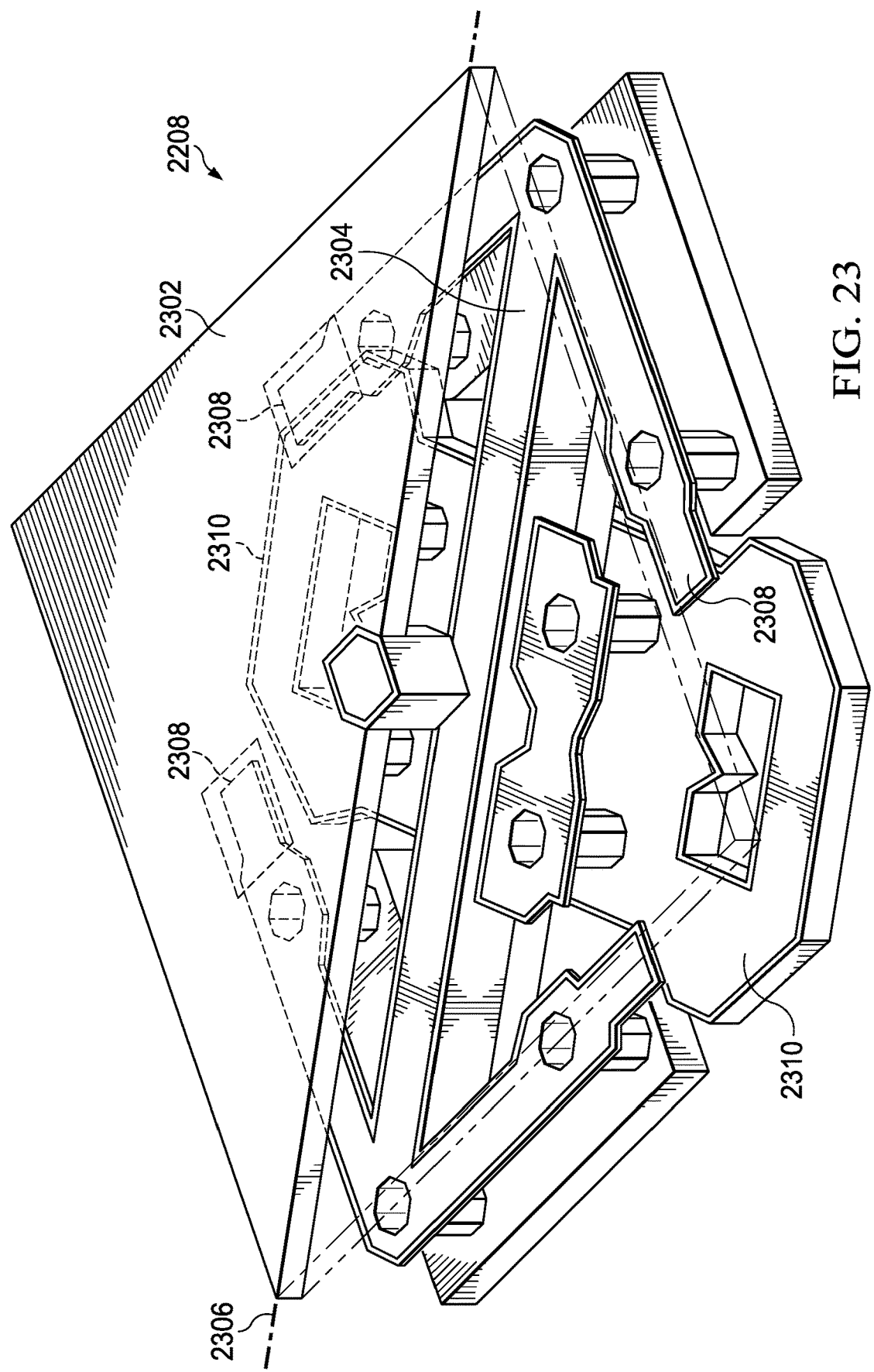
FIG. 23 illustrates the mechanical structure of the micro-mirror.

Referring now to FIG. 23, there is illustrated a view of the mechanical structure of a micro-mirror 2208. The micro-mirror 2208 includes the mirror 2302 attached to a torsional hinge 2304 along a diagonal axis 2306 of the mirror. The underside of the micro-mirror 2302 makes electrical contact with the remainder of the circuitry via spring tips 2308. A pair of electrodes 2310 is used for holding the micro-mirror 2302 in one of the two operational positions (+12° and −12°).

Figure 24:
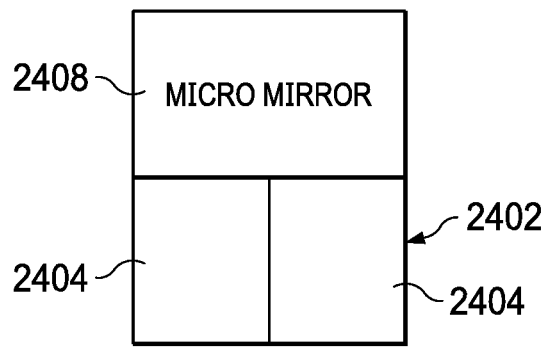
FIG. 24 is a block diagram of the functional components of a micro-mirror.

Referring now also to FIG. 24, there is illustrated a block diagram of the functional components of the micro-mirror 2208. Below each micro-mirror 2208 is a memory cell 2402 consisting of dual CMOS memory elements 2404. The states of the two memory elements 2404 are not independent, but are always complementary. If one CMOS memory element 2404 is at a logical "1" level, the other CMOS element is at a logical "0" and vice versa. The state of the memory cell 2402 of the micro-mirror 2208 plays a part in the mechanical position of the mirror 2208. However, loading information within the memory cell 2402 does not automatically change the mechanical state of the micro-mirror 2208.

Although the state of the dual CMOS memory elements 2404 plays a part in determining the state of the micro-mirror 2208, the state of the memory elements 2304 is not the sole determining factor. Once the micro-mirror 2208 has landed, changing the state of the memory cells 2402 will not cause the micro-mirror 2208 to flip to the other state. Thus, the memory state and the micro-mirror state are not directly linked together. In order for the state of the CMOS memory elements 2404 to be transferred to the mechanical position of the micro-mirror 2208, the micro-mirror 3108 must receive a "Mirror Clocking Pulse" signal. The mirror clocking pulse signal momentarily releases the micro-mirror 3108 and causes the mirror to reposition based on the state of the CMOS memory elements 2304. Thus, information relating to mirror positions may be preloaded into the memory element 2404, and the mechanical position of the mirror 2302 for each mirror within a MEMs device 2202 simultaneously change responsive to the mirror clocking pulse signal. One manner in which the information within the memory cells 2402 may be programmed is through the use of holograms, such as those described herein that are used to defined the position of each of the micro-mirrors 2208 with and a MEMs device 2202.

Figure 25:
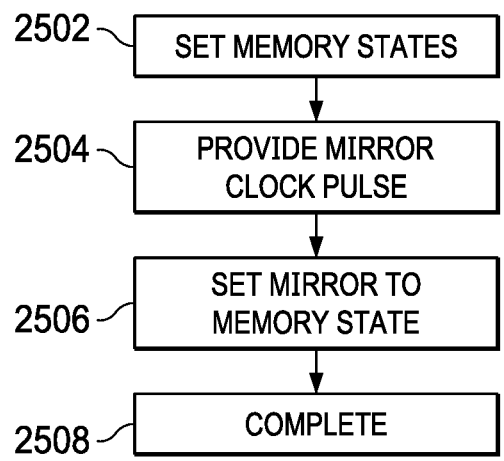
FIG. 25 illustrates a flow chart of the process for changing the position of a micro-mirror.
Figure 21A:
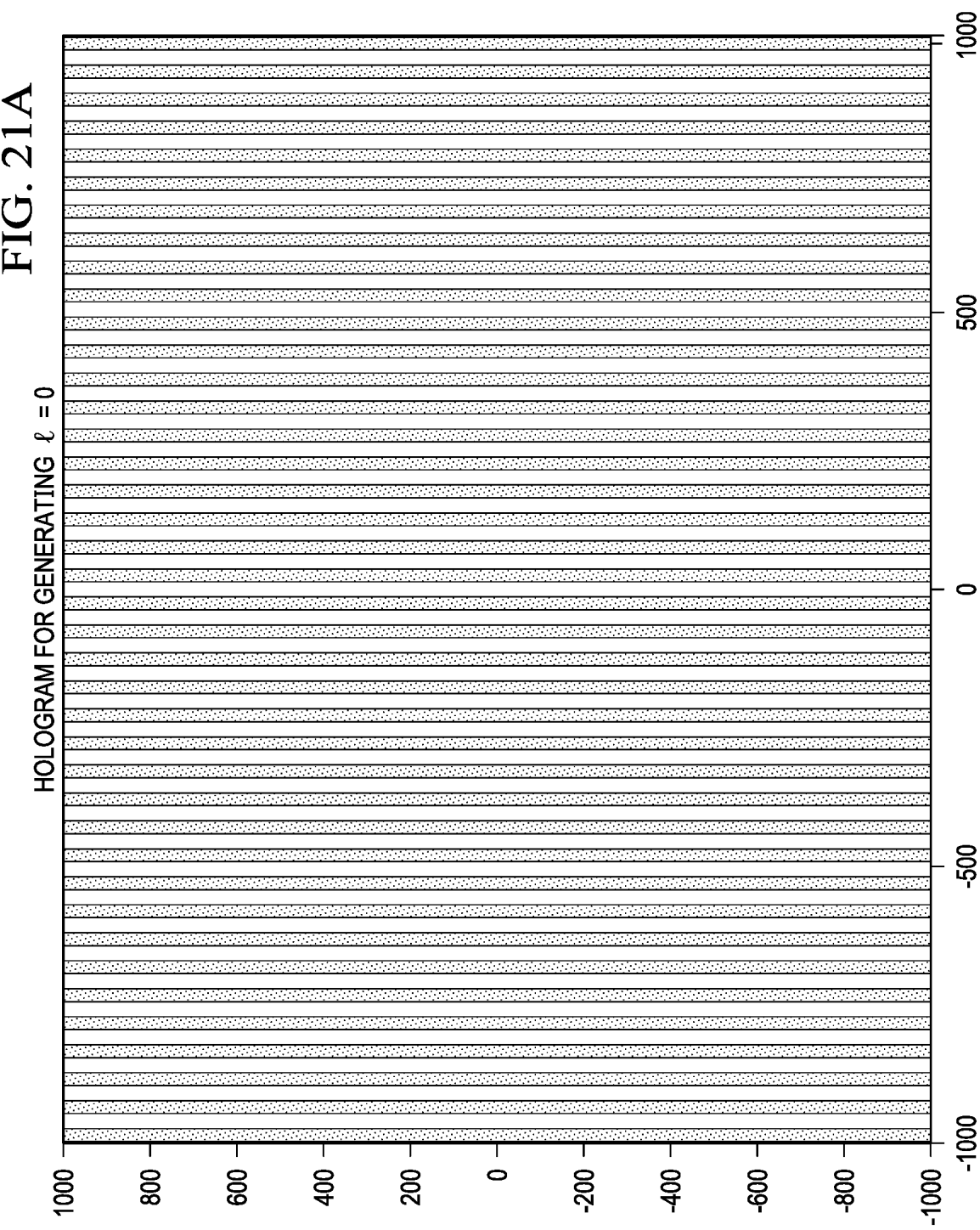
Figure 21B:
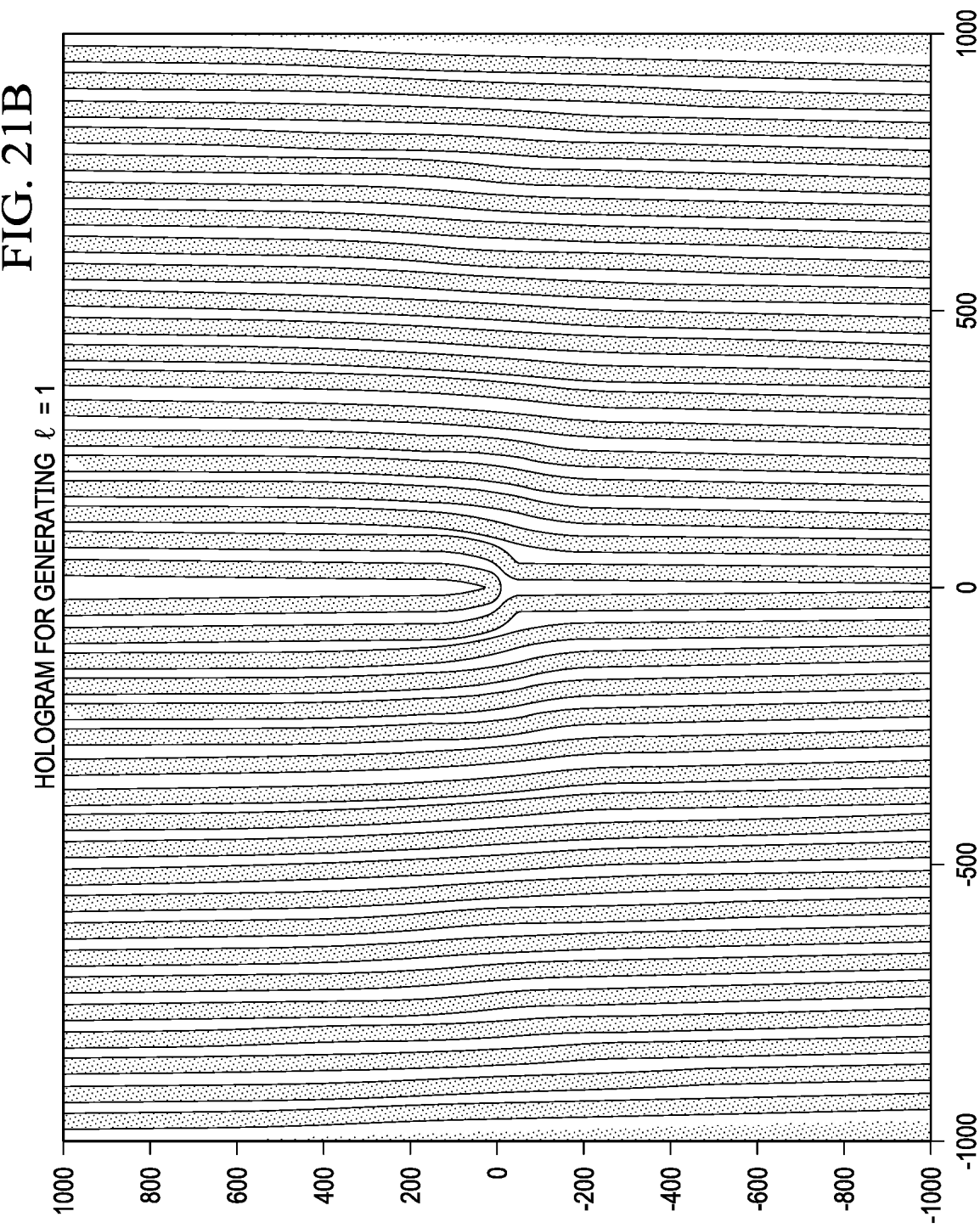
Figure 21E:
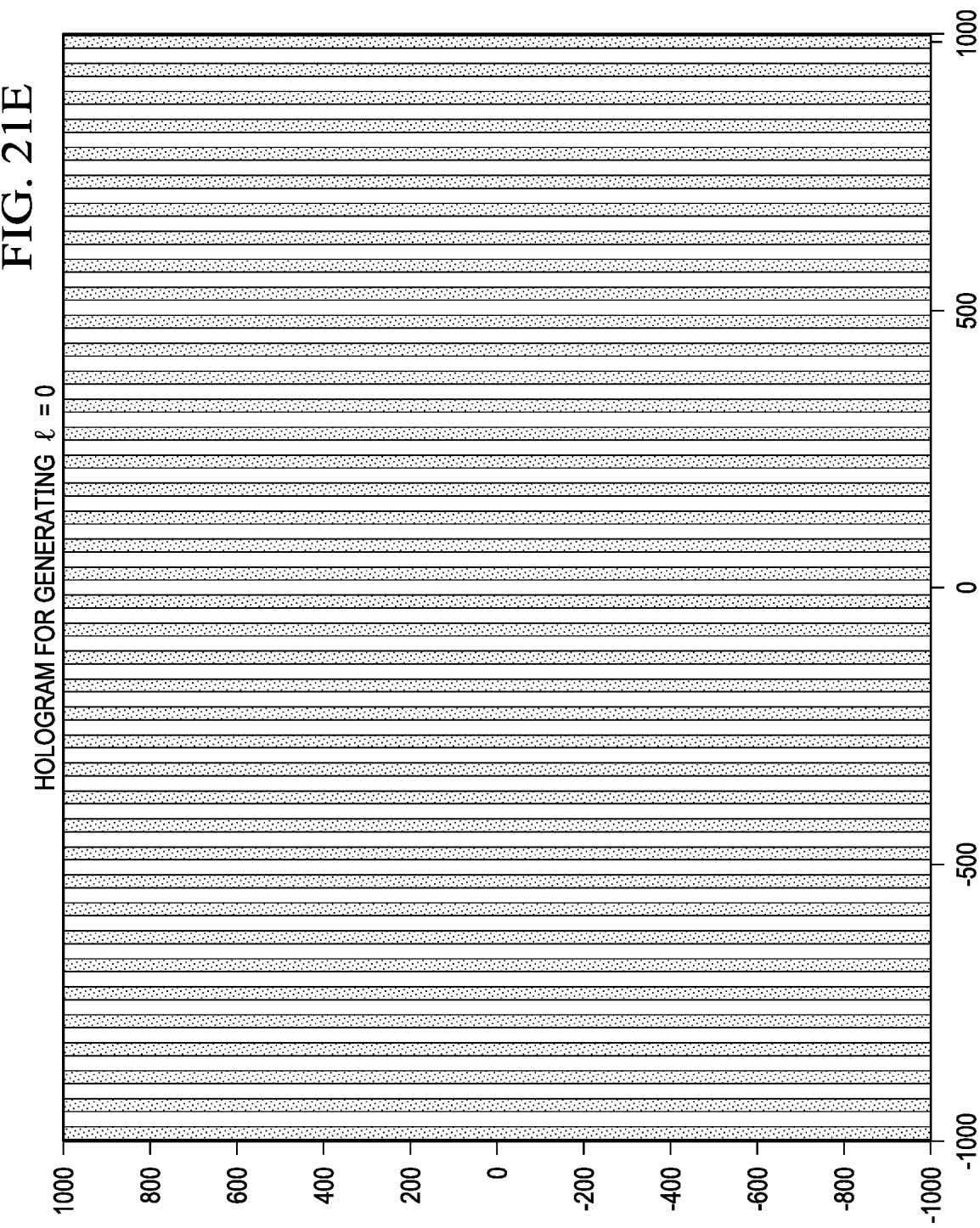
Figure 21F:
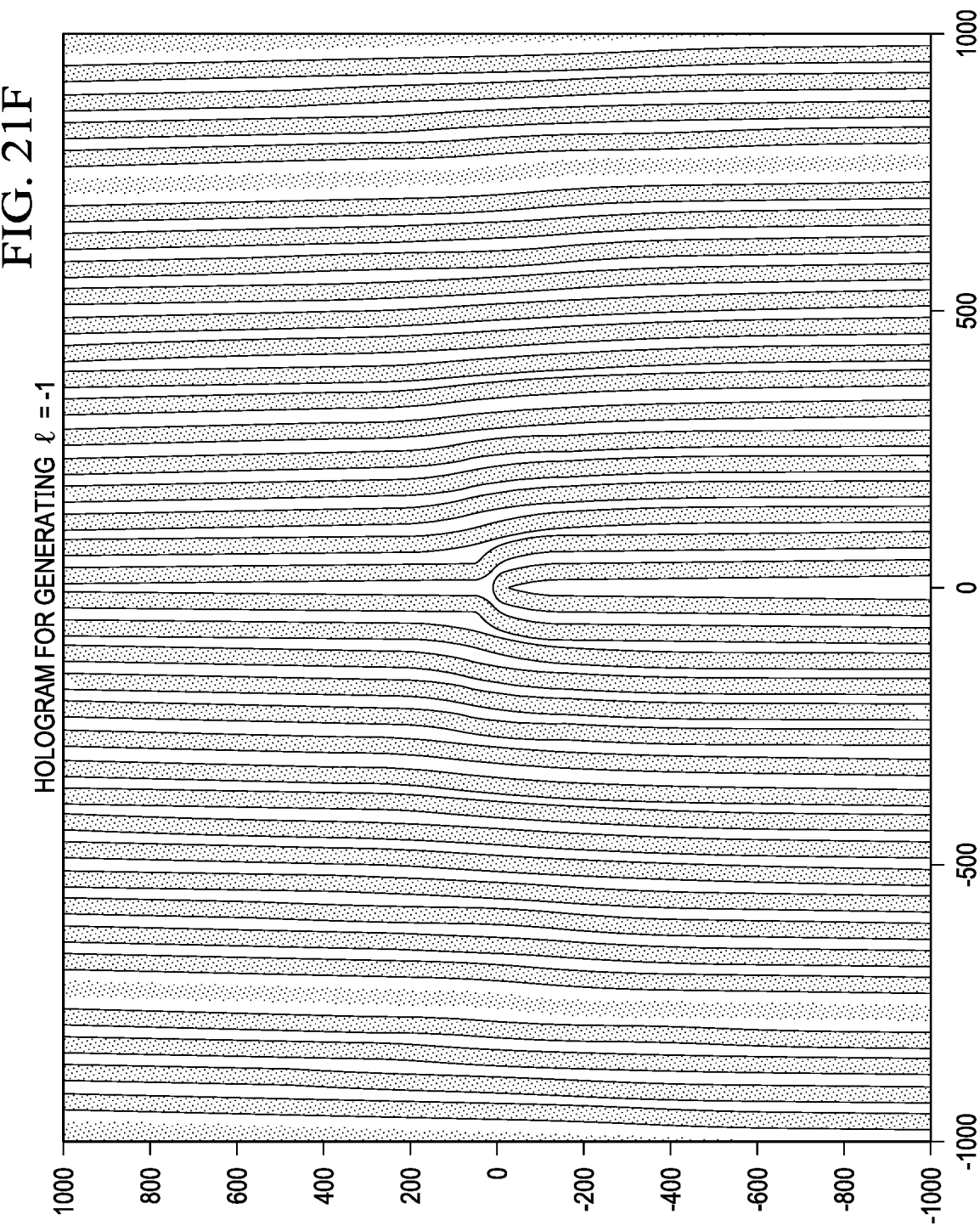

When a DMD 2202 is "powered up" or "powered down," there are prescribed operations that are necessary to ensure the proper orientation of the micro-mirrors 2208. These operations position the micro-mirrors 2208 during power up and release them during power down. The process for changing the position of a micro-mirror 2208 is more particularly illustrated in the flowchart of FIG. 25. Initially, at step 2502, the memory states within the memory cells 2402 are set. Once the memory states have been set within the memory cells 2402, the mirror clock pulse signal may be applied at step 2504. The micro-mirror 3108 will have an established specification of the time before and after a mirror clocking pulse that data may be loaded into the memory cell 2402. Application of the mirror clocking pulse signal will then set the mirrors to their new state established by the memory at step 2506. The process is completed at step 2508, and the mirror 2302 position is fixed and new data may be loaded into the memory cell 2402.

Figure 26:
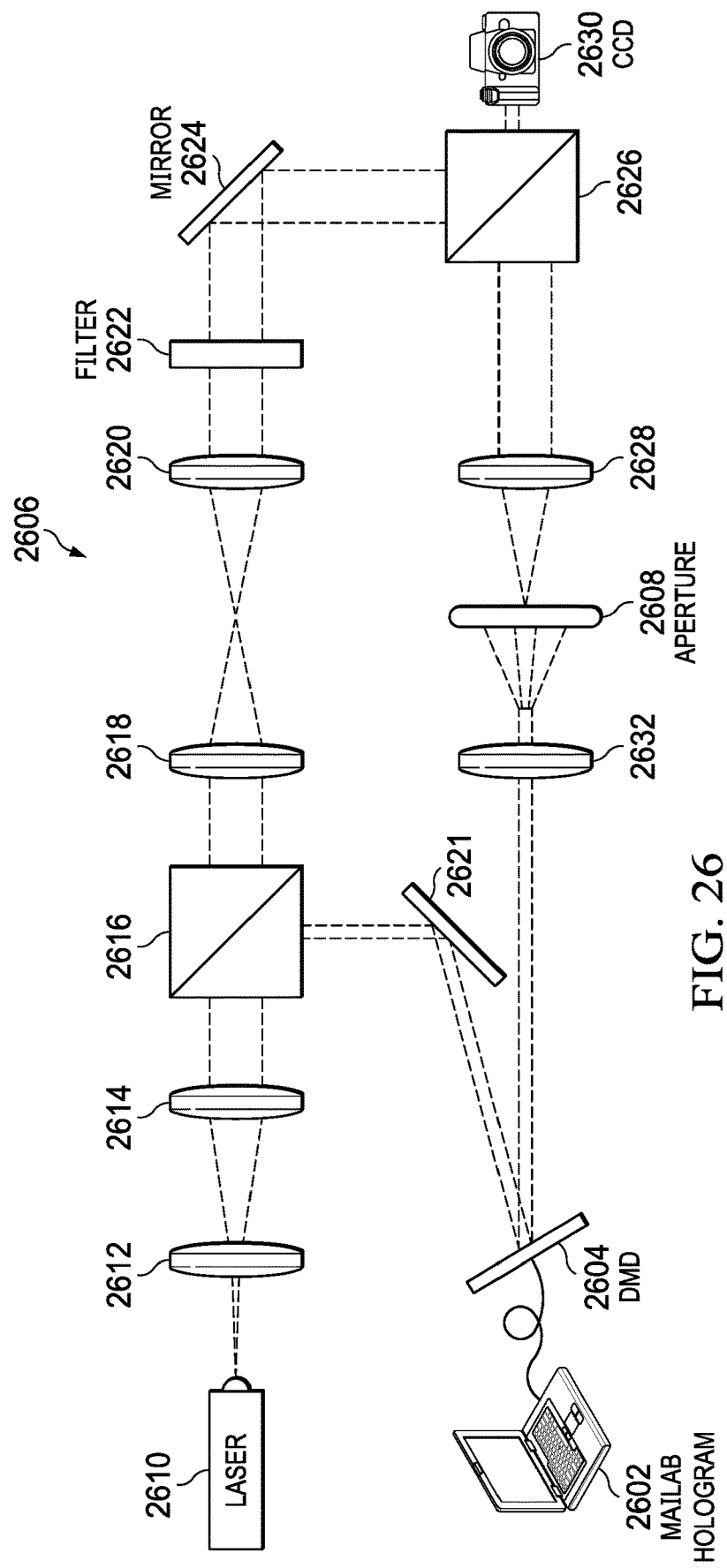
FIG. 26 illustrates an intensity in phase interferometer for measuring the intensity and phase of a generated beam.

Referring now to FIG. 26, there is illustrated an intensity and phase interferometer for measuring the intensity and phase of the generated beam. One can generate spatial modes by loading computer-generated Matlab holograms 2602 such as those described herein above and illustrated in FIGS. 31A-31H onto a DMD memory. The holograms 2602 for generating modes can be created by modulating a grating function with 20 micro-mirrors per each period. The holograms 2602 are provided to a DMD 2604. An imaging system 2606 along with an aperture 2608 separates the first order diffracted light into separate modes. The imaging system includes a laser 2610 that provides a light through a pair of lenses 2612, 2614. The lens 2612 expands the light beam to the lens 2614 which collimates the beam. A beam splitter 2616 splits the beam toward a lens 2618 and mirror 2621. Lens 2618 focuses the beam through lens 2620 which collimates the beam through a filter 2622. The filtered beam is reflected by mirror 2624 through a second beam splitter 2626. The beam splitter 2626 splits the beam toward a lens 2628 and a charge coupled device camera 2630. The charge coupled device (CCD) camera 2630 measures the intensity profile of the generated beam. The plane wave beam provided to lens 2628 is focused on to the aperture 2608 to interfere with the twisted beam from the DMD. Also focused on the aperture 2608 is the twisted beam from the DMD 2604. The beam from the DMD 2604 is provided through a lens 2632 that also focuses on the aperture 2608. The phase of the mode being generated is determined from the number of spirals in the pattern and is caused by interfering the twisted beam with a plane wave beam. Also, whether the phase is positive or negative may be determined by whether the spirals are clockwise (positive) or counter-clockwise (negative). A Mach-Zehnder interferometer may be used to verify the phase pattern of the created beams. The collimated plane wave provided from lens 2628 is interfered with the modes generated by the beam from the DMD 2604 through lens 2632. This generates the interferograms (spiral patterns) at the aperture 2608. The modes generated from the DMD may then be multiplexed together using memory-based static forks on the digital light processor.

Therefore, there is a possibility of using binary holograms to coherently control both phase and amplitude of a light beam. A low number of pixels per each period of the binary grating results in quantization errors in encoding phase and intensity. The total number of grating periods with in the incident beam on the DMD 2604 sets an upper limit on the spatial bandwidth of the generated modes. Consequently a large number of micro-mirrors is preferable for generating high-quality modes. This can be achieved by using newer generations of DMDs. Another set of modes that are needed for OAM-based quantum key distribution is the set of angular (ANG) modes.

Figure 27A:
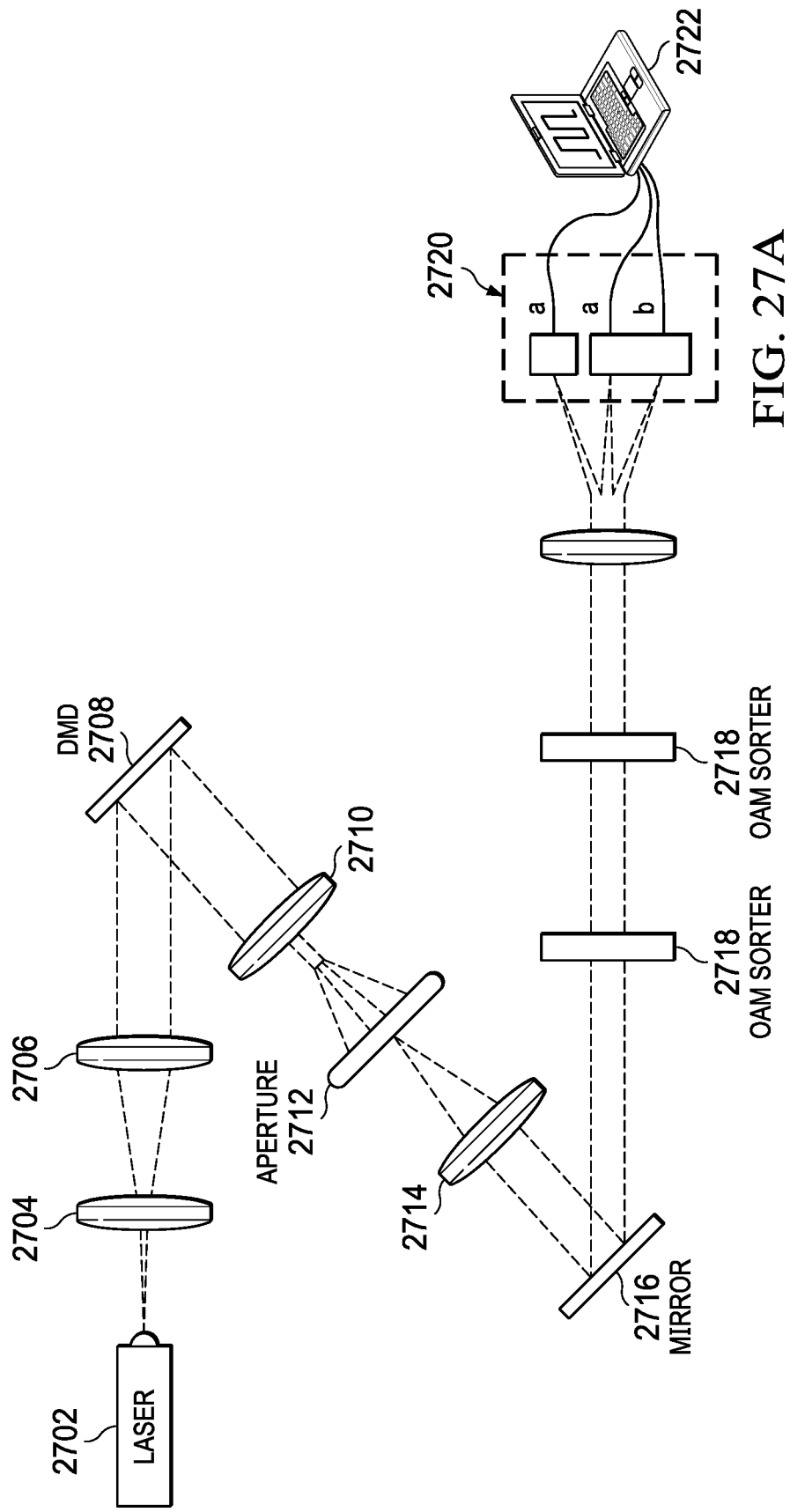
FIG. 27A illustrates the manner in which switching between different OAM modes may be achieved in real time.

Referring now to FIG. 27A, there is illustrated the manner in which switching between different OAM modes may be achieved in real time. The laser 2702 generates a collimated beam through lenses 2704 and 2706 to a DMD 2708. The DMD 2708 provides a beam that is focused by lens 2710 onto aperture 2712. The output from the aperture 2712 is provided to a lens 2714 that collimates the beam onto a mirror 2716. The collimated beam is provided to an OAM sorter 2718 that separates the signal into various OAM modes 2720 as detected by a computer 2722.

Figure 27B:
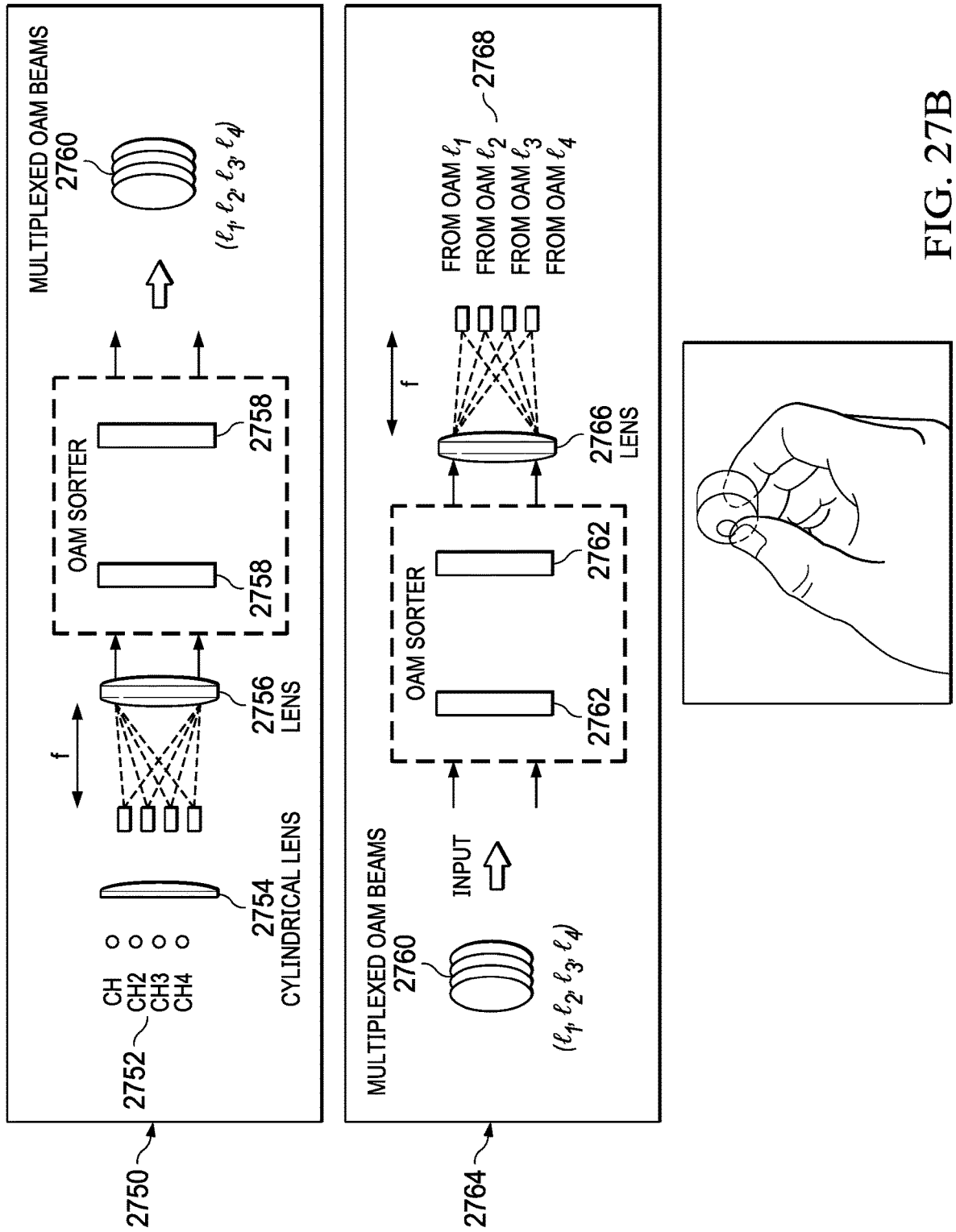
FIG. 27B illustrates the manner in which a transmitter processes multiple data channels that are passed through a cylindrical lens to a focusing lens.

Referring now to FIG. 27B, there is more generally illustrated the manner in which a transmitter 2750 processes multiple data channels 2752 that are passed through a cylindrical lens 2754 to a focusing lens 2756. The lens 2756 focuses the beam on a OAM sorter 2758. The collimated beam is passed through an OAM sorter 2758 for multiplexing the OAM beams together as multiplexed OAM beams 2764 transmission to a receiver 2764. The multiplexed OAM beams 2760 are passed through a second OAM sorter 2762 at the receiver 2764 to demultiplex the beams into separate OAM channels. The received OAM channels 2768 are passed through a lens 2766 to focus the separate OAM beam channels 2768.

Using DMDs for generating OAM modes provides the ability to switch between different modes at very high speeds. This involves a much smaller number of optical elements as compared to the conventional techniques were OAM modes are generated using a series of separated forked holograms and are multiplexed using beam splitters. Therefore, one can achieve dynamic switching among vortex OAM modes with different quantum numbers. The computer-generated holograms for these modes must be loaded onto the memory of the DMD 2708, and the switching is achieved by using a clock signal. One can use a mode sorter to map the input modes to a series of separated spots. The intensity may then be measured corresponding to each mode using a high-bandwidth PIN detector at positions corresponding to each mode. The DMD devices are available for a fraction of the cost of phase only spatial light modulators.

The DMD efficiency observed in a specific application depends on application-specific design variables such as illumination wavelength, illumination angle, projection aperture size, overfill of the DMD micro-mirror array and so on. Overall optical efficiency of each DMD can generally be estimated as a product of window transmission, a diffraction efficiency, micro-mirror surface reflectivity and array fill factor. The first three factors depend on the wavelength of the illumination source.

Digital light processing technology uses two types of materials for DMD mirrors. The mirror material for all DMD's except Type-A is Corning Eagle XG, whereas type A DMDs use Corning 7056. Both mirror types have an anti-reflectivity (AR), thin-film coating on both the top and the bottom of the window glass material. AR coatings reduce reflections and increase transmission efficiency. The DMD mirrors are designed for three transmission regions. These ranges include the ultraviolet light region from 300 nm to 400 nm, the visible light region from 400 nm to 700 nm and the near infrared light region (NCR) from 700 nm to 2500 nm. The coating used depends on the application. UV windows have special AR coatings designed to be more transmissive for ultraviolet wavelengths, visible coatings for visible DMDs and NIR coatings for NIR DMDs.

The measured data provided in the following sections reflects a typical single pass transmittance through both top and bottom AR coated mirror surfaces with random polarization. The angle of incidence (AOI) of 0° is measured perpendicular to the window surface unless mentioned otherwise. With an increase in the number of window passes, the efficiency would decline.

Figure 28:
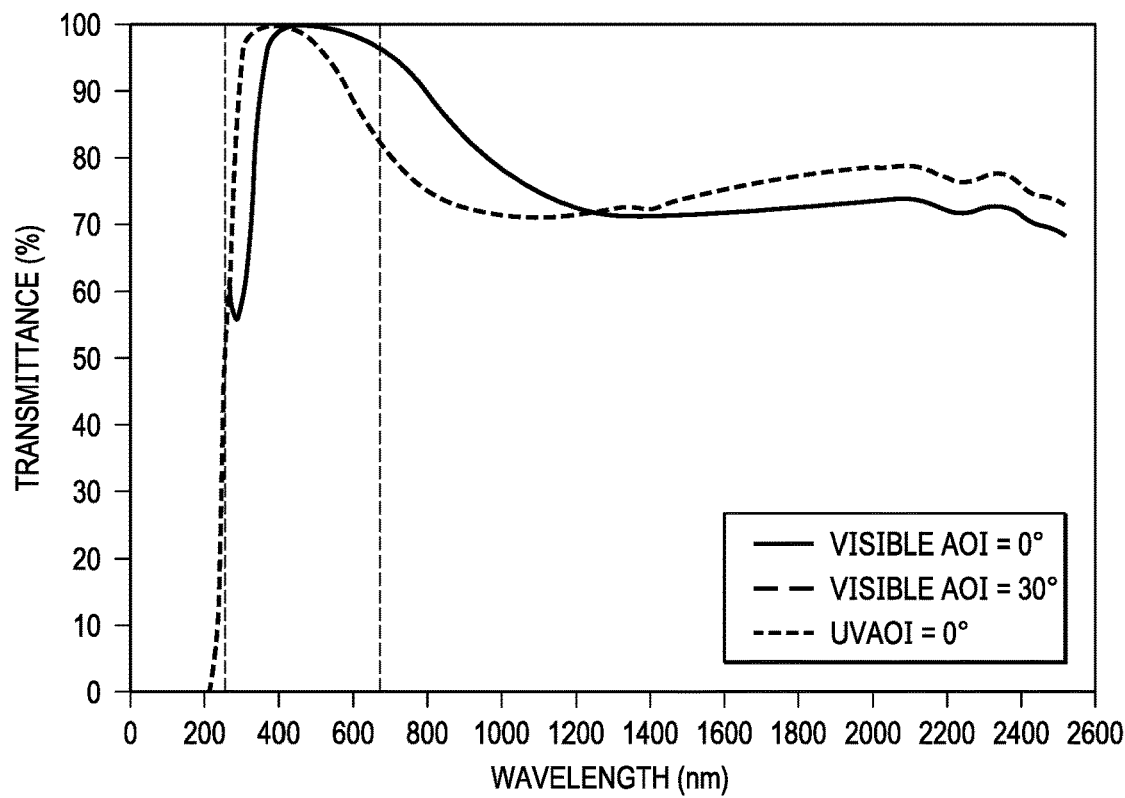
FIG. 28 illustrates the window transmission curves for Corning 7056.
Figure 29:
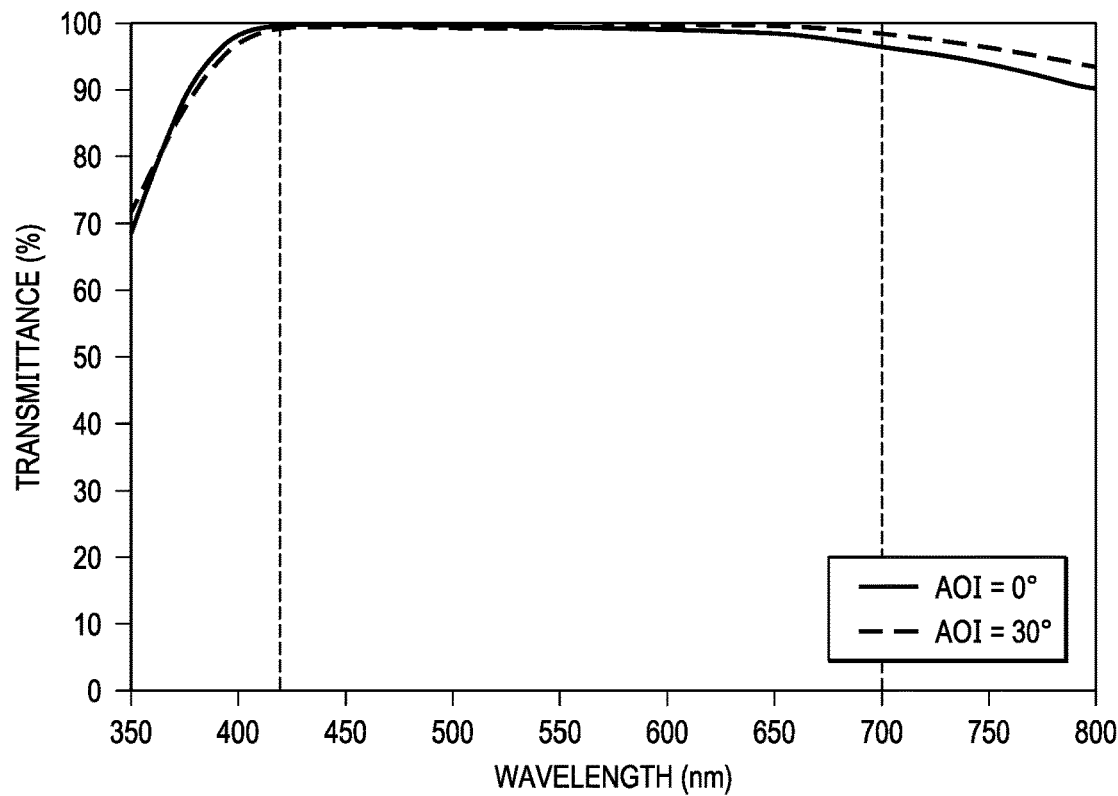
FIGS. 29-33 are zoomed in views of visible and UV AR coated window transmittance for Corning 7056.
Figure 30:
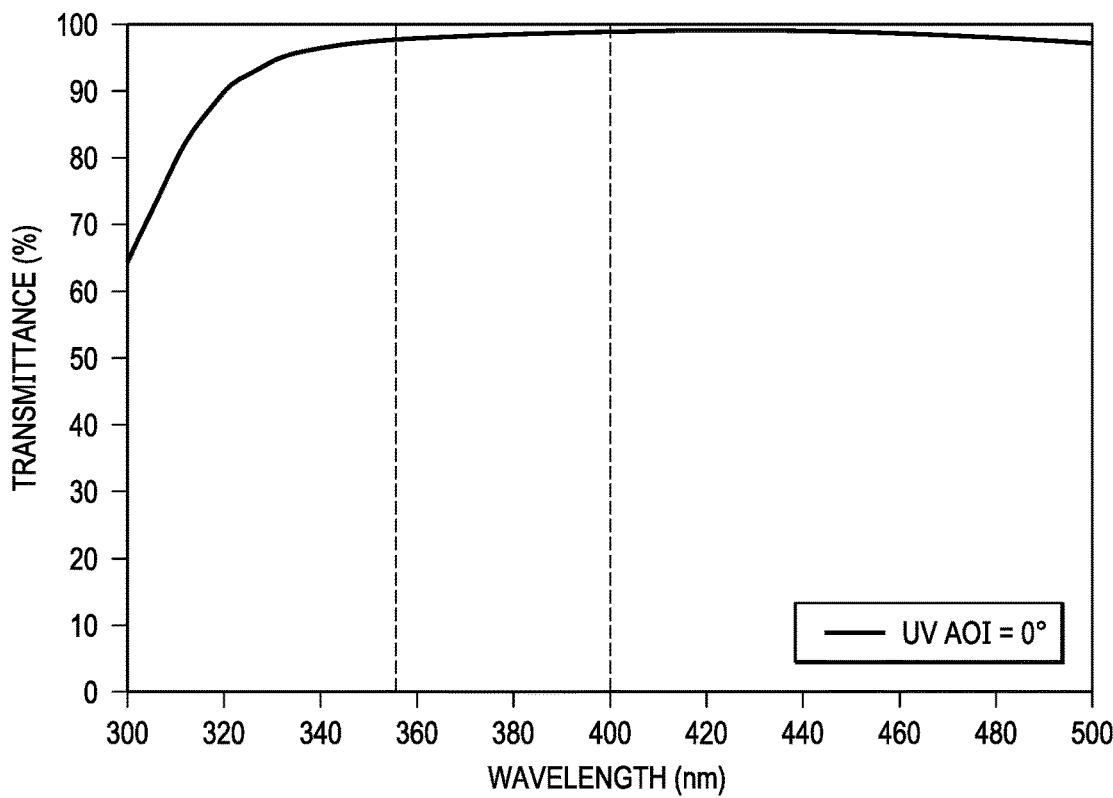
Figure 31:
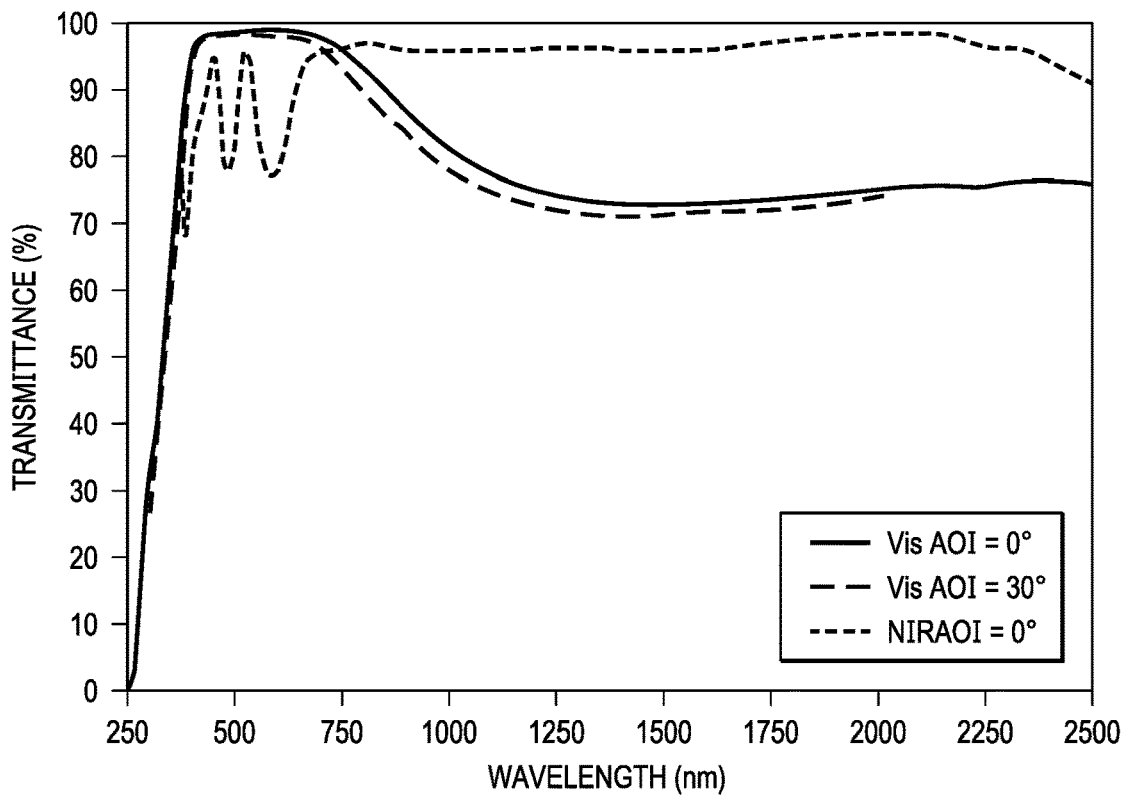
Figure 32:
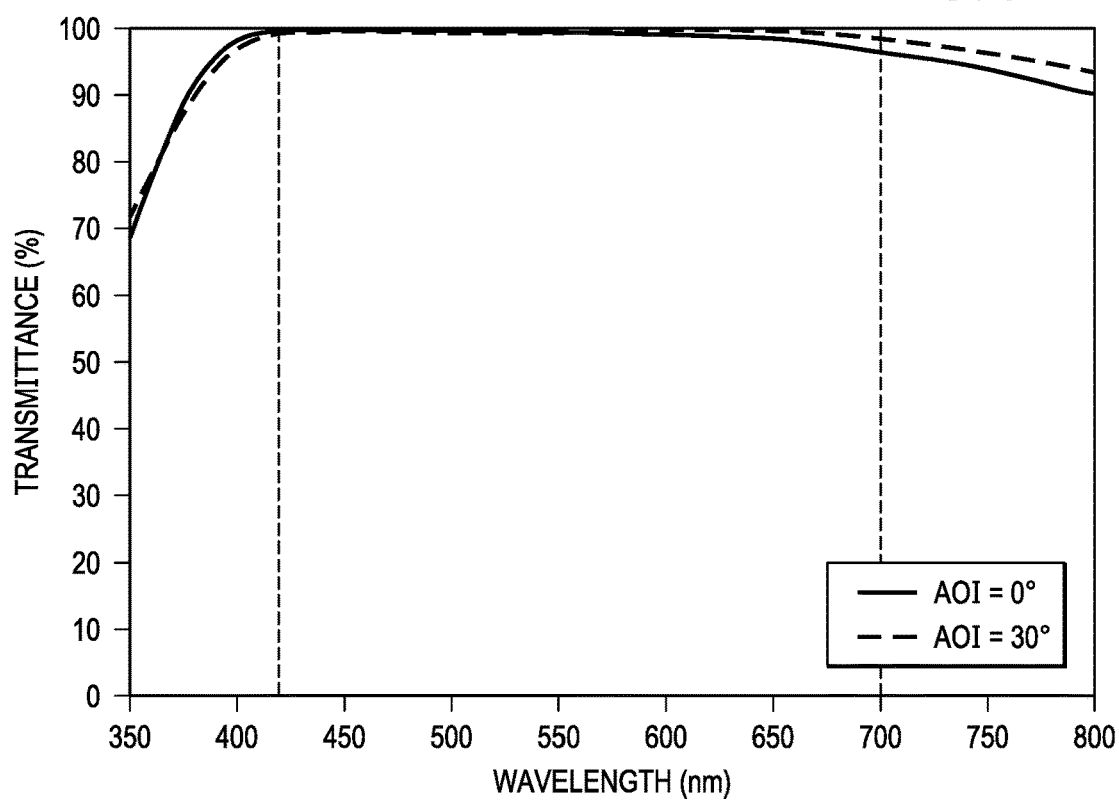
Figure 33:
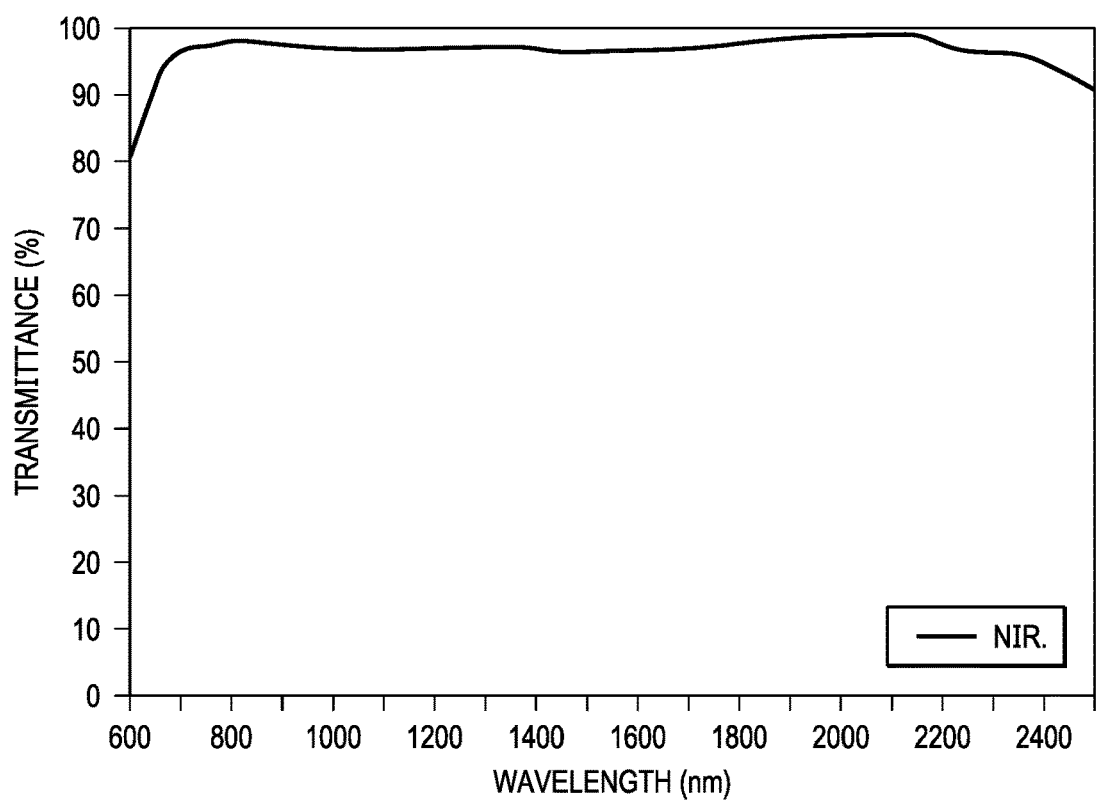

FIG. 28 represents the window transmission curves for Corning 7056. The window transmission response curve in this figure applies to Taipei MDM's in their specified illumination wavelength regions. FIG. 28 shows the UV window transmittance measured perpendicular to the window surface and visible window transmittance at a lie of 0° and 30°. FIGS. 29-33 are zoomed in views of the typical visible and UV AR coated window transmittance in their maximum transmission regions. The visible Corning Eagle XG window transmission data shown in FIG. 32 applies to the digital light processor 5500, digital light processor 1700, digital light processor 3000 and digital light processor 3000 DMD's. The typical transmittance observed in these DMD's is broadband visible region is approximately 97%. The NIR Corning Eagle XG window transmission data of FIG. 33 applies to the digital light processor 3000 NIR DMD. The typical transmittance observed in the NIR DMD's in the broadband NIR region is approximately 96% for most of the region with a dip toward 90% as it nears 2500 nm.

Figure 34:
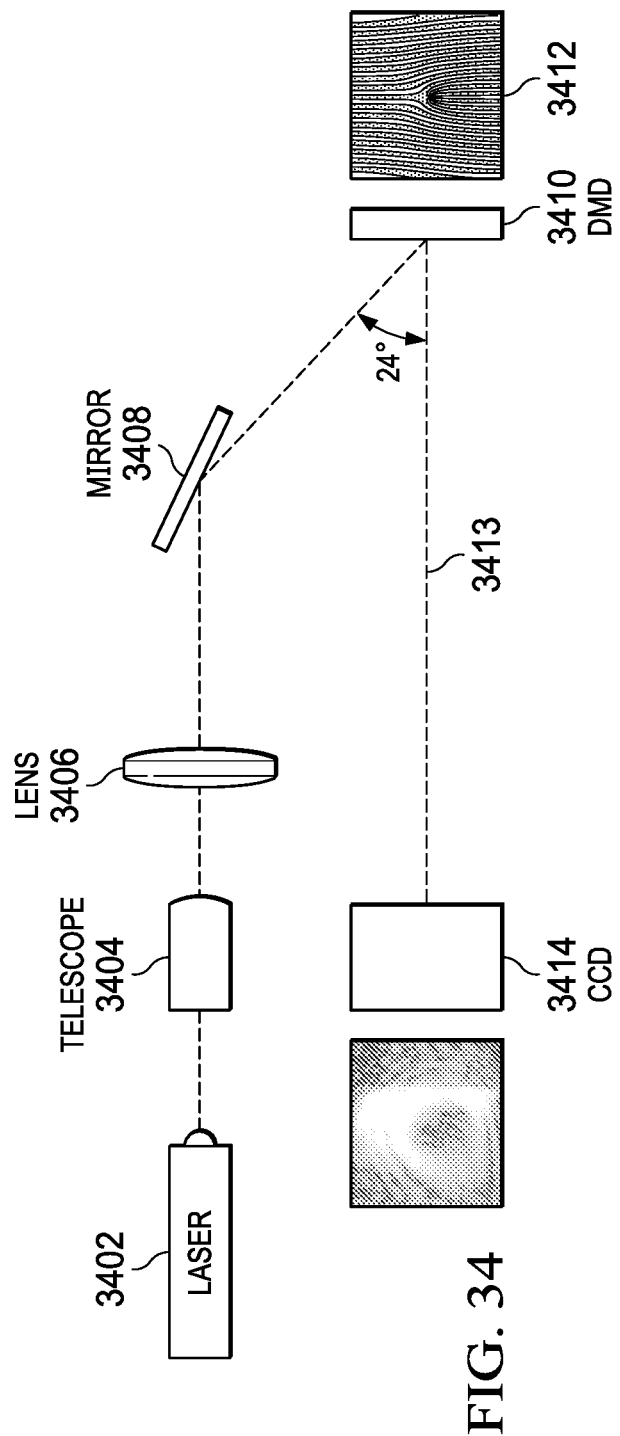
FIG. 34 illustrates circuitry for the generation of an OAM twisted beam using a hologram within a micro-electromechanical device.

Referring now to FIG. 34, there is illustrated a configuration of generation circuitry for the generation of an OAM twisted beam using a hologram within a micro-electrical mechanical device. A laser 3402 generates a beam having a wavelength of approximately 543 nm. This beam is focused through a telescope 3404 and lens 3406 onto a mirror/system of mirrors 3408. The beam is reflected from the mirrors 3408 into a DMD 3410. The DMD 3410 has programmed in to its memory a one or more forked holograms 3412 that generate a desired OAM twisted beam 3413 having any desired information encoded into the OAM modes of the beam that is detected by a CCD 3414. The holograms 3412 are loaded into the memory of the DMD 3410 and displayed as a static image. In the case of 1024×768 DMD array, the images must comprise 1024 by 768 images. The control software of the DMD 3410 converts the holograms into .bmp files. The holograms may be displayed singly or as multiple holograms displayed together in order to multiplex particular OAM modes onto a single beam. The manner of generating the hologram 3412 within the DMD 3410 may be implemented in a number of fashions that provide qualitative differences between the generated OAM beam 3413. Phase and amplitude information may be encoded into a beam by modulating the position and width of a binary amplitude grating used as a hologram. By realizing such holograms on a DMD the creation of HG modes, LG modes, OAM vortex mode or any angular mode may be realized. Furthermore, by performing switching of the generated modes at a very high speed, information may be encoded within the helicity's that are dynamically changing to provide a new type of helicity modulation. Spatial modes may be generated by loading computer-generated holograms onto a DMD. These holograms can be created by modulating a grating function with 20 micro mirrors per each period.

Rather than just generating an OAM beam 3413 having only a single OAM value included therein, multiple OAM values may be multiplexed into the OAM beam in a variety of manners as described herein below. The use of multiple OAM values allows for the incorporation of different information into the light beam. Programmable structured light provided by the digital light processor allows for the projection of custom and adaptable patterns. These patterns may be programmed into the memory of the digital light processor and used for imparting different information through the light beam. Furthermore, if these patterns are clocked dynamically a modulation scheme may be created where the information is encoded in the helicities of the structured beams.

Figure 35:
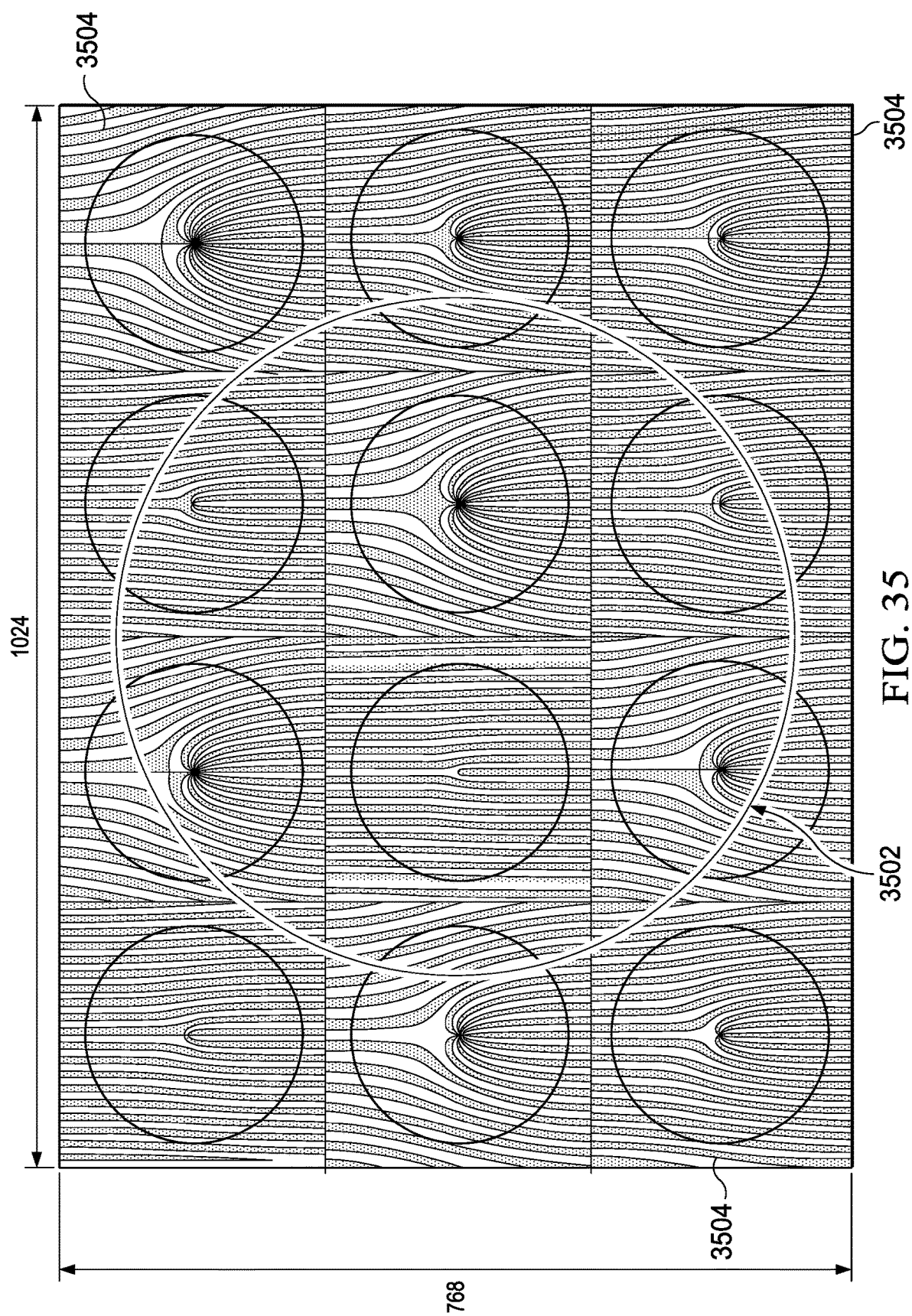
FIG. 35 illustrates the use of multiple single holograms for multiplexing.

Referring now to FIG. 35, rather than just having the laser beam 3502 shine on a single hologram multiple holograms 3504 may be generated by the DMD 3410. FIG. 35 illustrates an implementation wherein a 4×3 array of holograms 3504 are generated by the DMD 3410. The holograms 3504 are square and each edge of a hologram lines up with an edge of an adjacent hologram to create the 4×3 array. The OAM values provided by each of the holograms 3504 are multiplexed together by shining the beam 3502 onto the array of holograms 3504. Several configurations of the holograms 3504 may be used in order to provide differing qualities of the OAM beam 3413 and associated modes generated by passing a light beam through the array of holograms 3504.

Figure 36:
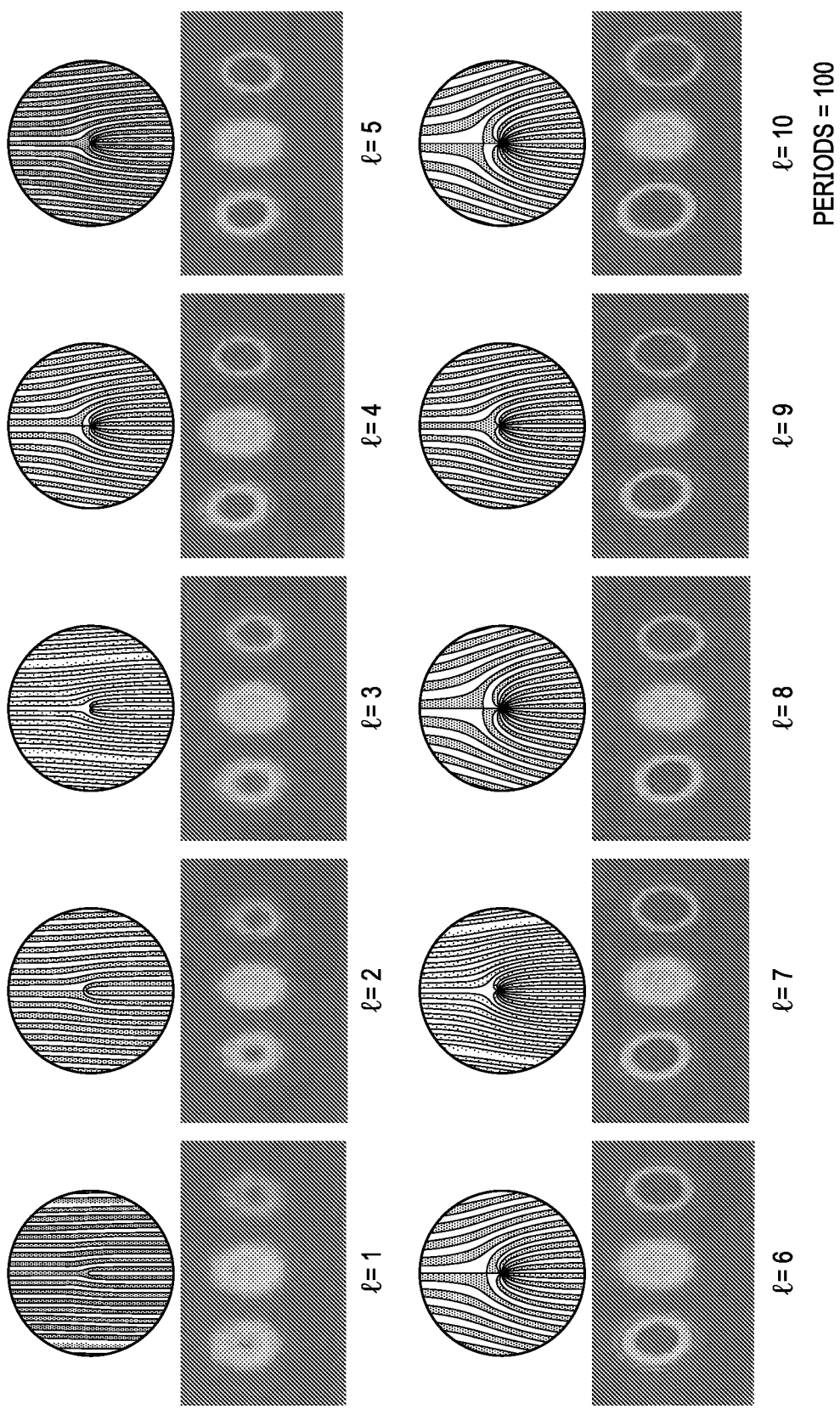
FIG. 36 illustrates various reduced binary for holograms for applying OAM levels.

FIG. 36 illustrates various reduced binary fork holograms that may be used for applying different OAM levels to a light. FIG. 36 illustrates holograms for applying OAM light from t=1 to l=10 a period of 100.

Figure 37A:
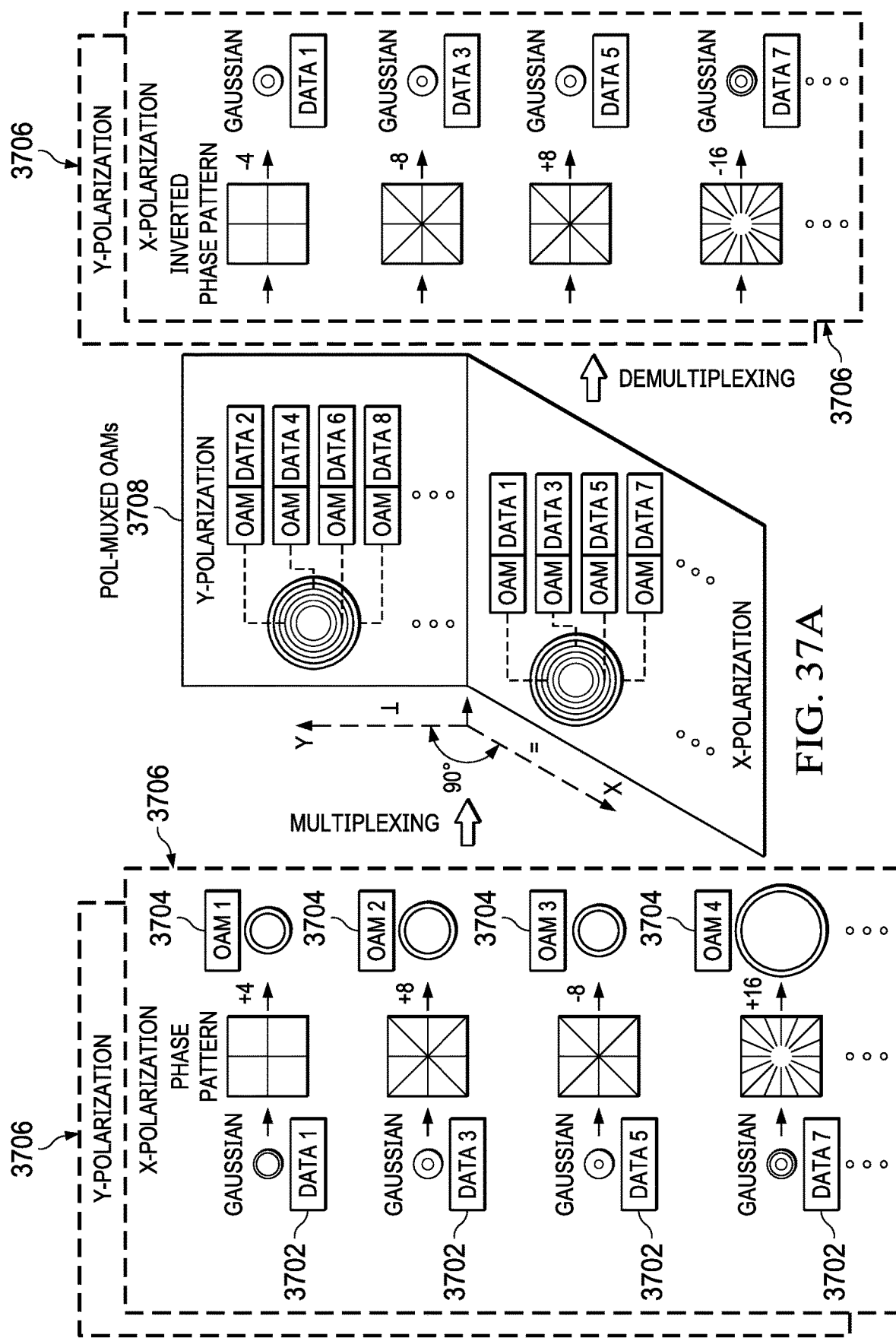
FIG. 37A illustrates the combined use of OAM and polarization processing.

Referring now to FIG. 37, there is illustrated the manner in which a combined use of OAM processing and polarization processing may be used to increase the data with any particular combination of signals using a digital light processing system. A variety of data (Data1, Data3, Data5, Data7) 3702 have differing OAM levels (OAM1, OAM2, OAM3, OAM4) 3704 and differing X and Y polarizations 3706. This enables multiplexing of the signals together into a polarization multiplexed OAM signal 3708. The polarization multiplexed OAM signal 3708 made the demultiplexed by removing the X and Y polarizations 3706 and OAM to re-create the data signals 3702.

Spin angular momentum (SAM) is associated with polarization and given by $\sigma\hbar = \pm\hbar$ (for circular polarization). While orbital angular momentum (OAM) is associated with azimuthal phase of the complex electric field. Each photon with the azimuthal phase dependence is of the form $\exp(-jl\emptyset)(l=0, \pm1, \pm2, \ldots)$ and carries the OAM of $l\hbar$. Therefore, with each photon we can associate a photon angular momentum defined over computational basis states $|l, \sigma\rangle$. Because the OAM eigenstates are mutually orthogonal, an arbitrary number of bits per single photon can be transmitted. The possibility to generate/analyze states with different photon angular momentum, by using holographic method, allows the realization of quantum states in multidimensional Hilbert space. Because OAM states provide an infinite basis state, while SAM states are two-dimensional only, the OAM can also be used to simultaneously increase the security for QKD and improve the computational power for quantum computing applications. We introduce the following deterministic quantum qu-dit gates and modules based on photon angular momentum.

Qudit Gates

Figure 37B:
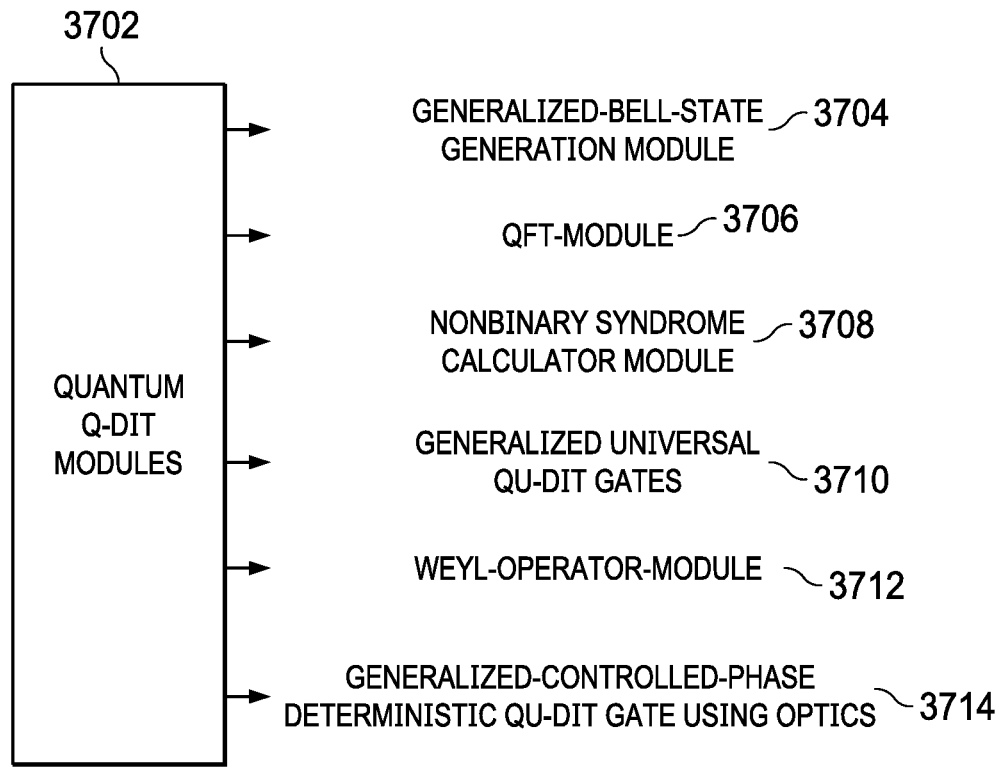
FIG. 37B illustrates basic quantum modules.

Referring now to FIG. 37B, the basic quantum modules 302 for quantum teleportation applications include the generalized-Bell-state generation module 304 and the QFT-module 306. The basic module for entanglement assisted QKD is either the generalized-Bell-state generation module 304 or the Weyl-operator-module 312. The photon angular momentum based universal quantum qudit gates, namely generalized-X, generalized-Z, generalized-CNOT qudit gates. A set of universal quantum gates is any set of gates to which any operation possible on a quantum computer can be reduced, that is, any other unitary operation can be expressed as a finite sequence of gates from the set. Technically this is impossible since the number of possible quantum gates is uncountable, whereas the number of finite sequences from a finite set is countable. To solve this problem, we only require that any quantum operation can be approximated by a sequence of gates from this finite set.

Moreover, for unitaries on a constant number of qubits, the Solovay-Kitaev theorem guarantees that this can be done efficiently.

Different quantum modules 302 of importance are introduced for different applications including (fault-tolerant) quantum computing, teleportation, QKD, and quantum error correction. Quantum Q-dit modules include generalized Bell State Generation Modules 304, QFT Modules 306, Non-Binary Syndrome Calculator Modules 308, Generalized Universal Q-dit gates 310, Weyl-Operator Modules 312 and Generalized Controlled Phase Deterministic Qudit Gate Using Optics 314, which is a key advantage compared to probabilistic SAM based CNOT gate. Also, by describing such gates and modules, we introduce their corresponding integrated optics implementation on digital light processing. We also introduce several entanglement assisted protocols by using the generalized-Bell-state generation module. The approach is to implement all these modules in integrated optics using multi-dimensional qudits on digital light processing Photon OAM Based Universal Qudit Gates and Quantum Modules An arbitrary photon angular momentum state $|\psi\rangle$ can be represented as a linear superposition of $|l, \sigma\rangle$-basekets as follows:

$$|\psi\rangle = \sum_{l=-L_-}^{L_+} \sum_{\sigma=\pm 1} C_{l,\sigma}|l, \sigma\rangle, \sum_{l=-L_-}^{L_+} \sum_{\sigma=\pm 1} |C_{l,\sigma}|^2$$

where the $|l, \sigma\rangle$-basekets are mutually orthogonal, namely $\langle m,\sigma|n,\sigma'\rangle = \delta_{mn}\delta_{\sigma\sigma'}; m,n, \in \{-L_-, \ldots, -1, 0, 1, \ldots, L_+\}; \sigma,\sigma' \in \{-1,1\}$ Therefore, the photon angular momentum kets live in $D=2(L_-+L_++1)$ dimensional Hilbert space $\mathcal{H}_2(L_-+L_++1)$. Kets are defined as a vector in Hilbert space, especially as representing the state of a quantum mechanical system. Notice that in the most general case, the number of states with negative OAM index, denoted as L does not need to be the same as the number of OAM states with positive OAM index. This photon angular momentum concept to describe the photon states is different from the total angular momentum of photon defined as $j\hbar=(l+a)$.

As an illustration, in total angular momentum-notation for $j=4$ we cannot distinguish between $|l=5, \sigma=-1\rangle$ and $|l=3, \sigma=1\rangle$ photon angular momentum states. Therefore, the use of $|l=\sigma\rangle$ notation is more general. The SAM (circularly polarized) states can be represented in computational base $\{|H\rangle, |V\rangle|H\rangle$—horizontal photon, $[V\rangle$-vertical photon) as follows:

$$|+1\rangle = \frac{1}{\sqrt{2}}\begin{bmatrix} 1 \\ j \end{bmatrix}, |+1\rangle = \frac{1}{\sqrt{2}}\begin{bmatrix} 1 \\ -j \end{bmatrix}$$

The SAM operator is represented by:

$$S = \begin{bmatrix} 0 & -j \\ j & 0 \end{bmatrix}$$

Clearly, right-circular ($|+1\rangle$) and left-circular ($|-1\rangle$) states are eigenkets of this operator since:

$S|+1\rangle = +|1\rangle, S|-1\rangle = -|-1\rangle$

The OAM states ($|+1\rangle$) and ($|-1\rangle$) generated using, for example, the process described previously, can be represented in reduced two-dimensional subspace, respectively, as follows:

$$|+1\rangle = \frac{1}{l}\begin{bmatrix} l \\ 0 \end{bmatrix}, |-1\rangle = \frac{1}{l}\begin{bmatrix} 0 \\ -l \end{bmatrix}$$

Figure 38:
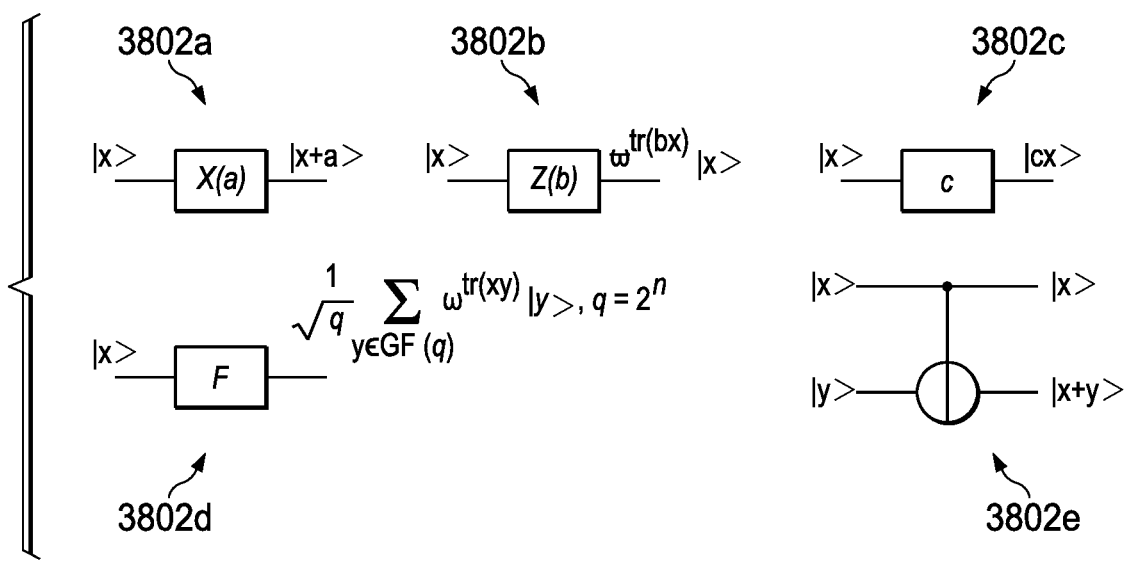
FIG. 38 illustrates examples of quantum gates.

Referring now to FIG. 38, there are illustrated a number of examples of quantum gates 3802 that generate outputs responsive to input qubits $|x\rangle$ applied to the input of quantum gates 3802a, 3802b, 3802c and 3802d and the input qubits $|x\rangle$ and $|y\rangle$ applied to the inputs of gate 3802e.

The outputs of the various quantum gates 3802 may be provided depending upon the type of processes implemented within the quantum gate. While the following examples are mad with respect to qubit gates having inputs and outputs based on spin angular momentum, by applying OAM processing as described herein to the inputs and outputs the gates can operate as qudit gates operable with a larger number of input states.

In this representation shown in FIG. 38, since the mode with $l=0$ has no OAM value, it can be denoted as:

$|0\rangle = [0\ 0]^T$

In this particular case, the photon angular momentum state reduces to the SAM state only. By assuming that the OAM-ket is aligned with the direction of propagation (z-axis), the OAM operator can be represented as:

$$L_z = \begin{bmatrix} 1 & 0 \\ 0 & -1 \end{bmatrix}$$

It is straightforward to verify that states $|l\rangle$ and $|-l\rangle$ are eigenkets of OAM operator $L_z$:

$L_z|\pm l\rangle = (\pm l)|\pm l\rangle$

The spin operator S and SAM operator $L_z$ satisfy the following properties:

$S^2 = I_2, L_z^2 = l^2 I_2$ where $I_2$ is the identity operator. The photon angular momentum operator can now be defined as $$J = (L_z \otimes I)(I \otimes S) = \begin{bmatrix} lS & 0 \\ 0 & -lS \end{bmatrix}$$

where the operator $\otimes$ denotes the tensor product. The corresponding eigenvalue equation is given by:

$J|\pm l, \pm 1\rangle = (\pm l)(\pm 1)|\pm l, \pm 1\rangle$

For convenience purpose, we can use a single indexing of photon angular momentum, and the computational bases related to photon angular momentum states are denoted as $\{|0\rangle, |1\rangle, \ldots, |D-1\rangle\}, D=2(L_-+L_+)$.

By properly selecting $L_-$ and $L_+$ to make sure that the dimensionality D is equal to some power of two, then the dimension D can be expressed as $D=q=2^p$, where $p \geq 1$ is a prime. If the addition operation is performed over Galois field $GF(2^p)$ instead "per mod D," the set of gates that can be used for arbitrary operation on qudits can be defined as illustrated in FIG. 38. The F-gate corresponds to the quantum Fourier transform (QFT) gate. Its action on ket |0> is the superposition of all basis kets with the same probability amplitude $$F|0\rangle = q^{-\frac{1}{2}} \sum |u\rangle.$$

Therefore, the F-gate on qudits has the same role as Hadamard gate on qu-bits. The action of generalized X- and Z-gates can be described as follows:

$$X(a)|x\rangle = |x\rangle = |x+a\rangle, \; Z(b)|x\rangle = \omega^{tr(bx)}|x\rangle; \; x,a,b \in GF(q)$$

Where x, a, b, ∈GF(q), tr(.) denotes the trace operation from GF(q) to GF(p) and co is a p-th root of unity, namely ω=exp(j2π/p). By omitting the SAM as a degree of freedom, since it represents a fragile source of quantum information, the corresponding space becomes $(L_-+L_+)$–dimensional $(D=L_-+L_+)$.

By selecting (L−+L+) to be a prime P, the corresponding addition operation represents "mod P addition," in other words right cyclic shift. The left cyclic shift can be defined as:

$$X(a)|x\rangle = x-a>$$

At the same time, the trace operation becomes trivial, and the action of generalized Z-gate becomes $$Z(b)|m\rangle = e^{j\left(\frac{2\pi}{p}\right)bm}|m\rangle.$$

The corresponding generalized-Hadamard gate in this formalism is the F-gate since:

$$F|n\rangle = D^{-1/2} \sum_{m=0}^{D-1} \omega^{-nm}|m\rangle$$

Figure 39:
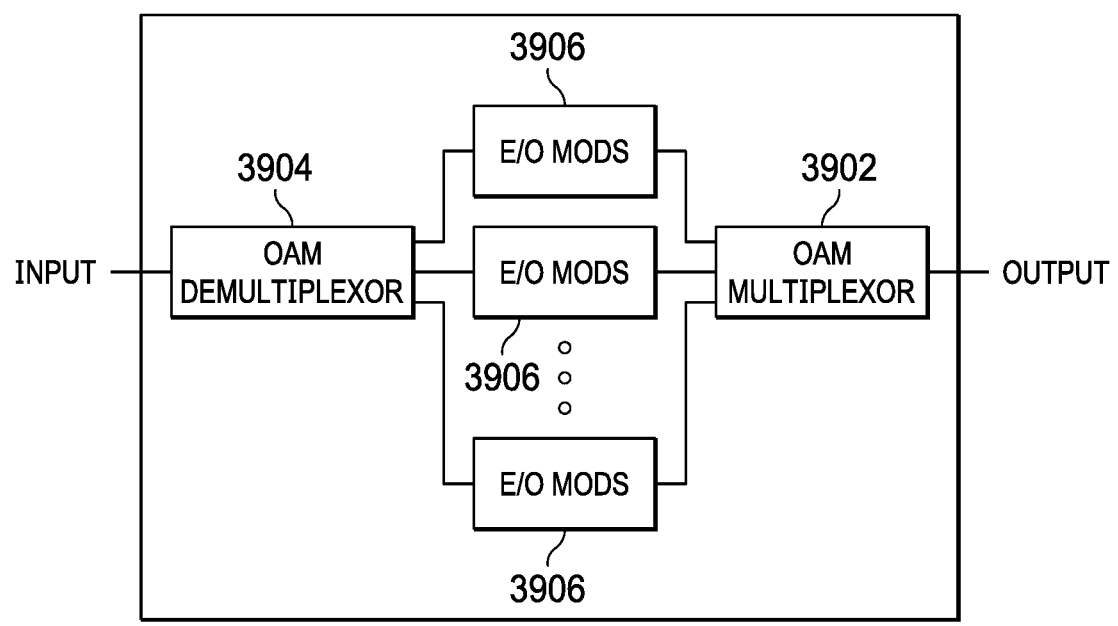
FIG. 39 illustrates a qudit gate implemented using OAM degrees of freedom.

Therefore, all these single-qudit gates can be implemented by using the OAM as a degree of freedom. One particularly suitable technology is based on spatial modes in few-mode fibers. As shown in FIG. 39, the basic building blocks for that purpose are OAM multiplexers 3902, OAM de-multiplexers 3904, few-mode fiber itself, and a series of electro-optical modulators 3906. Since few-mode fibers are not compatible with integrated optics, single-qudit OAM-based gate can be modified as described below.

Figure 40:
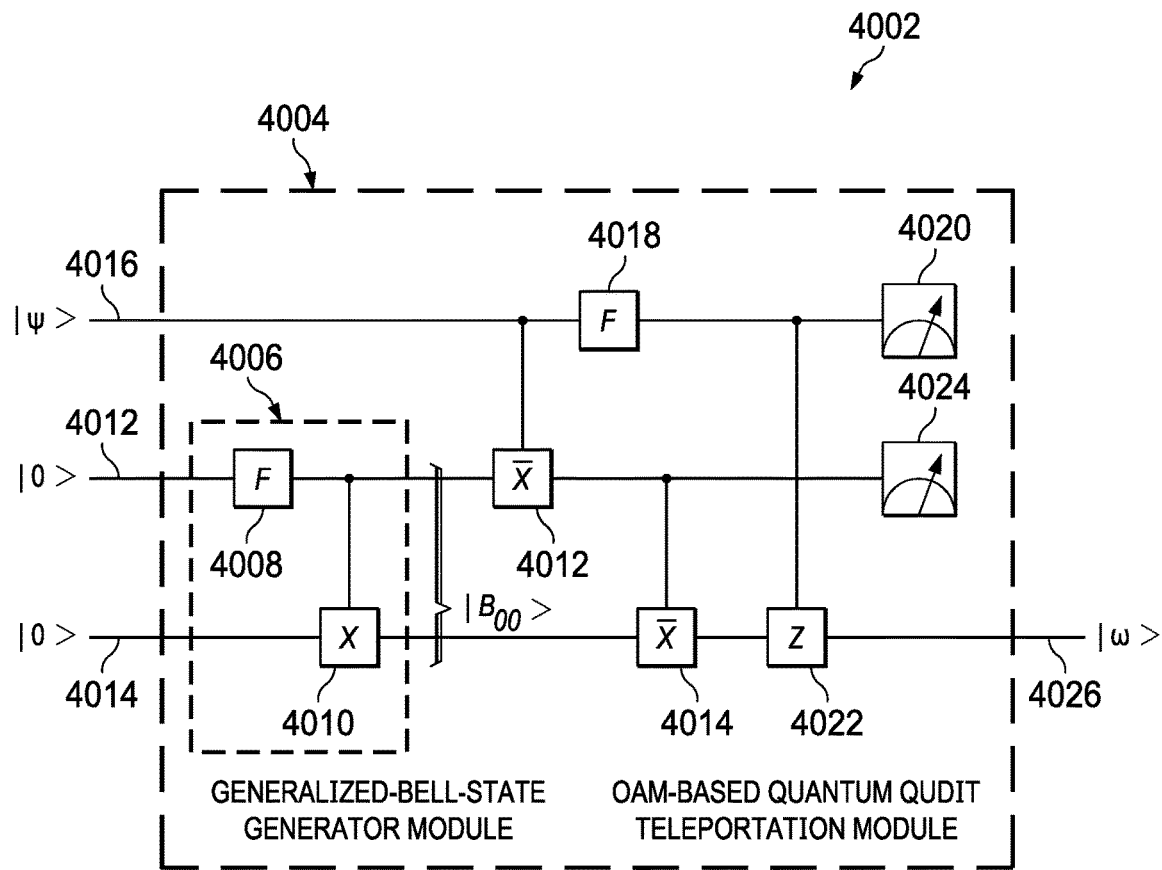
FIG. 40 illustrates an OAM based qudit teleportation module.

By using the basic qudit gates shown in FIG. 38, a more complicated quantum modules can be implemented as shown in FIG. 40. FIG. 40 illustrates an OAM-based qudit teleportation module 4002. The module 4002 comprises an OAM based quantum qudits teleportation module 4004 that includes a generalized bell state generator module 4006. The generalized bell state generator module 4006 comprises a generalized F-gate 4008 and a generalized X-gate 4010. Input 4012 is applied to the generalized F-gate 4008 and input 4014 is provided to generalized X-gate 4010. An output of the generalized F-gate 4008 is also provided as a second input to the generalized X-gate 4010. The OAM based quantum qudit teleportation module 4004 in addition to including the generalized bell state generator module 4006 provides the output from each of the F-gates 4008 to a generalized Xnot-gate 4012 and the output from general-ized X-gate 4010 to Xnot-gate 4014. A second input to generalized Xnot-gate 4012 is provided from input 4016. Input 4016 also is provided to generalized F-gate 4018. Xnot-gate 4012 also provides an input to measurement circuitry 4024 for preforming a measurement on the output of a gate. The output of generalized F-gate 4018 is provided as an input to measurement circuitry 4020 and as an input to generalized Z-gate 4022 that also has an input therein from Xnot-gate 4014. The output of the generalized Z-gate 4022 provides the output 4026 of the OAM-waste quantum qudit teleportation module 4002. |$B_{00}$> Can be used to denote simplest generalized Bell baseket as follows:

$$|B_{00}\rangle = CNOT(F \otimes I)|0\rangle|0\rangle = D^{-\frac{1}{2}} \sum_{m=0}^{D-1} |m\rangle|m\rangle$$

Figure 41:
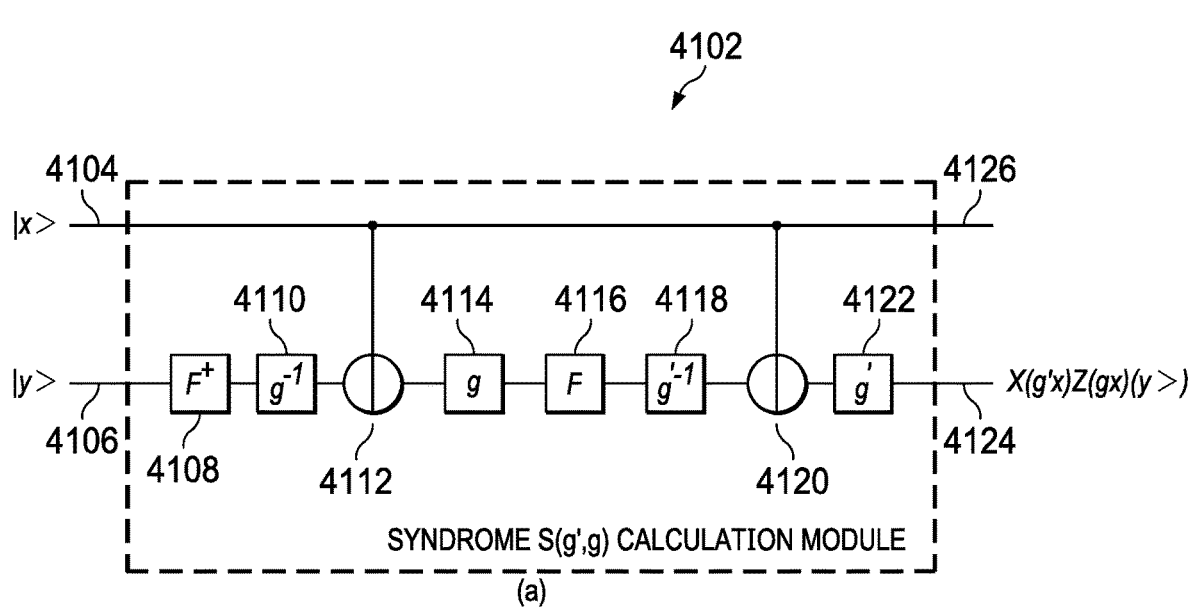
FIG. 41 illustrates a syndrome calculator module.

Another example as shown in FIG. 41 illustrates the syndrome calculator module 4102. The syndrome calculator module 4102 is important in fault-tolerant computing and quantum error correction. The syndrome calculator module 4102 includes an |x> input 4104 and an |y> input 4106. The |y> input 4106 is provided to a generalized F-gate 4108. The output of the generalized F-gate 4108 is provided to an inverse G-function gate 4110 having its output connected to adder circuit 4112 that adds the outputs of |x> input with the output of gate 4110. The adder circuit 4112 also receives an input from the |x> input 4104 and has its output connected to a generalized G-gate 4114. The output of the generalized G-gate is connected to the input of a generalized F-gate 4116. The output of the generalized F-gate 4116 is connected to the input of an inverse G-function gate 4118 whose output is connected to an adder circuit 4120 that adds the outputs of |x> input with the output of gate 4118. The adder circuit 4120 is also connect did to the |x> input 4104. The output of the adder circuit 4120 is connected to the input of and the generalized G-gate 4122 whose output is provided as an out node 4124. The output of the |x> input 4104 is also provided as an output 4126.

Figure 42:
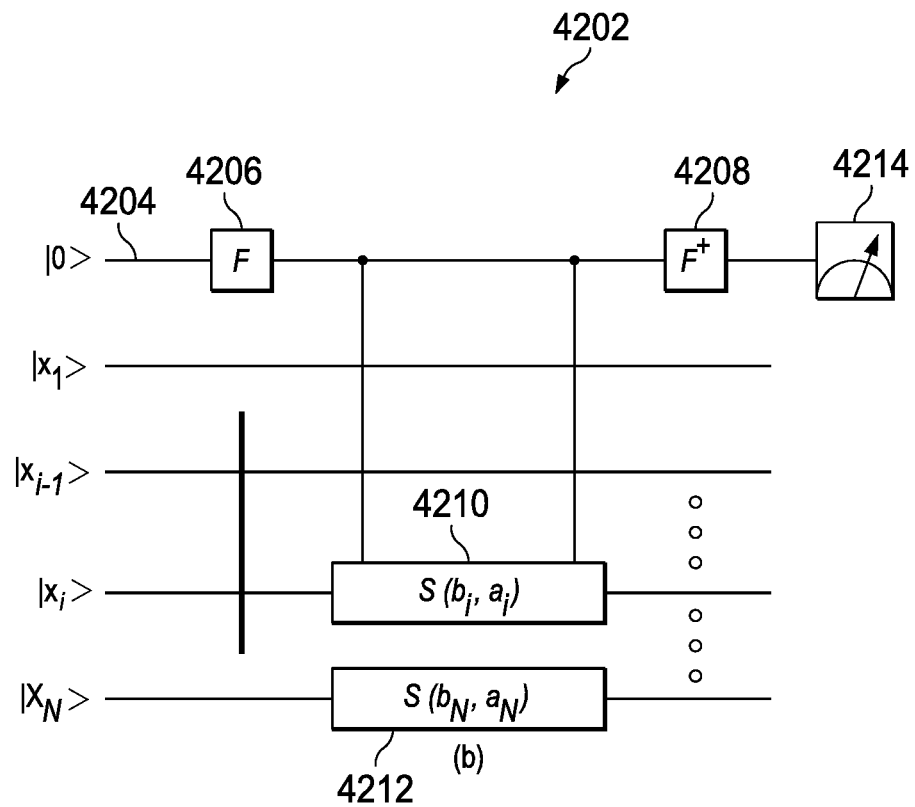
FIG. 42 illustrates a syndrome for identifying quantum error based on syndrome measurements.

In both applications, the syndrome can be determined to identify the quantum error based on syndrome measurements in accordance with the scheme illustrated by the module 4202 illustrated in FIG. 42. An |0> input 4204 is provided to the input of a generalized F-gate 4206. The output of the generalized F-gate 4206 is provided to the input of another generalized F-gate 4208 into the input of a syndrome calculator module 4210 function module 4210 provides a pair of outputs to a further function module 4212 function module 4212 also receives an |Xn> input 4214. The output of generalized F-gate 4208 provided to measurement circuitry 4214.

In this syndrome decoding module 4202, the syndrome calculator module 4210 $S(b_i, a_i)$ corresponds to the i-th generator $g_i=[a_i b_i]$ of a quantum-check matrix of a nonbinary quantum error correction code:

$$A = \begin{pmatrix} (A)_1 \\ \vdots \\ (A)_{N-K} \end{pmatrix}, (A)_1 = g_i = (ai \mid b_i) = [0 \ldots 0 a_i \ldots b_N]$$

$$\in GF(q)^{2N}; a_i, b_i, \in GF(q)$$

In the above equation, the parameter $a_i$ is used to denote the action of $X(a_i)$ qudit gate on the i-th qudit location, while with b; the action of $Z(b_i)$ qudit gate on the i-th qudit location is denoted. Arbitrary error belongs to the multiplicative Pauli group (error group) on qudits $G_N = \{\omega^c X(a) Z(b) | a,b \in GF(q)^N\}$. By representing the error operator as $e = (c|d)$, corresponding to $E = \omega^c X(c) Z(d)$, the syndrome can be calculated as $S(E) = S(c, d) = eA^T$.

The quantum circuit of FIG. 42 will provide non-zero measurement if a detectible error does not commute with a multiple of $g_i$. The correctable qudit error is mapping the code space to qK-dimensional sub space of qN-dimensional Hilbert space. Since there are N−K generators, or equivalently syndrome positions, there are $q^{N-K}$ different cosets. All qudit errors belonging to the same coset have the same syndrome. By selecting the most probable qudit error for the coset representative, which is typically the lowest weight error, The qudit error can be uniquely identified and consequently perform the error correction action. Alternatively, the maximum-likelihood decoding can be used. However, the decoding complexity would be significantly higher.

Figure 43:
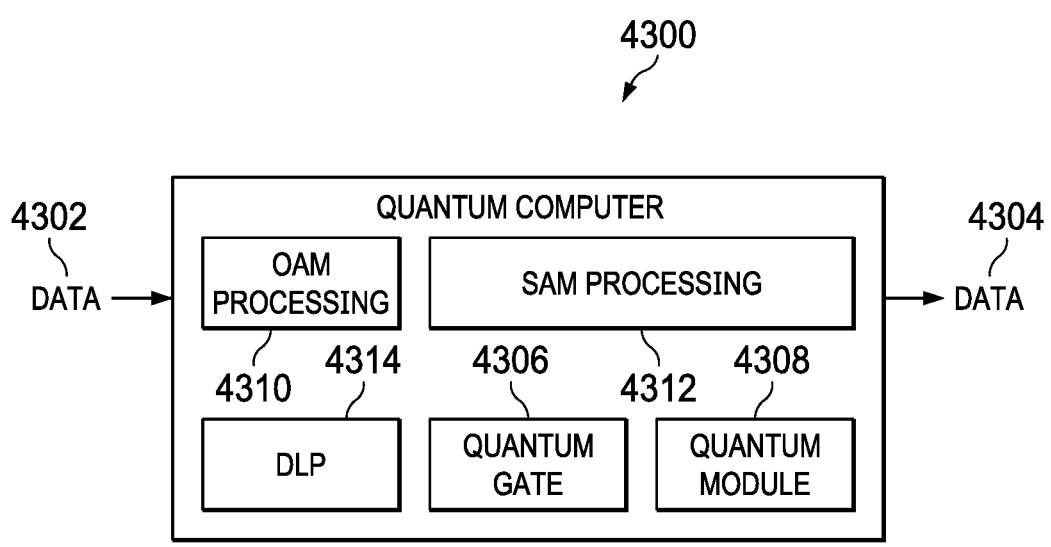
FIG. 43 illustrates a block diagram of a quantum computer.

The implementation of OAM-based single-qudit and generalized-CNOT gates will now be more fully described. The OAM-based single-qudit gate can be implemented in integrated optics, with the help of computer generated holograms implemented using digital light processor as described above. The quantum state represented by $|\psi\rangle = \Sigma_{I=0}^{D-1} C'_I |I\rangle$ arrives at the input of a single-qudit gate. Referring now to FIG. 43, there is illustrated a block diagram of a quantum computer implemented according to the present disclosure. The quantum computer 4300 receives input data 4302 and provides output data 4304 responsive thereto. The quantum computer utilizes a number of components in order to provide this processing functionality. The quantum computer 4300 includes a combination of quantum gates 4306 and quantum modules 4308 for carrying out the processing functionalities. The structural nature of the quantum gates 4306 and quantum modules 4308 are as described herein. Signals transmitted within the quantum computer 4300 may make a use of a combination of orbital angular momentum processing 130 and spin angular momentum processing 4302. The particular nature of the orbital angular momentum processing 4310 and spin angular momentum processing 4312 are as described herein. The OAM processing of signals is assisted utilizing a digital light processor or other light processing system 4314 as described herein below.

As shown previously in FIG. 39, in OAM demultiplexers 3904, the basekets are separated, before processing, by a set of electro-optical modulators 3606 (E/O MODs). The required phase shift and/or amplitude change are introduced by the electro-optical modulators 3606 to perform the desired single-qudit operation. The basekets are recombined into single-qudit in the OAM multiplexer 3902 to obtain the output quantum state $|\psi\rangle = \Sigma_{I=0}^{D-1} C'_I |I\rangle$. As an illustration, the F-gate is obtained by implementing the E/O modulator 3606 as a concatenation of an attenuator to introduce attenuation $D^{-1/2}$ and a phase modulator 3906 to introduce phase shift $-(2\pi/p)nm$ in the m-th branch. The generalized Z(6) gate is obtained by introducing the phase shift $(2\pi/p) bm$ in the m-th branch by corresponding phase modulator. The generalized X(a) gate is obtained by using the CGH (Computer Generated Hologram) in the m-th brunch to introduce azimuthal phase shift of the form $\exp(ja\phi)$.

Referring now to FIG. 44, by implementing an E/O modulator 3906 as a concatenation of an amplitude modulator 4402 and a phase modulator 4404 or a single I/Q modulator, the single-qudit gate is straightforward to initialize to arbitrary state by properly adjusting amplitude and phase changes in each branch. For instance, the superposition of all basis kets with the same probability amplitude is obtained by simply introducing the amplitude change $D^{-1/2}$ in each branch, while setting the phase shift to zero.

Referring now to FIG. 45, the generalized-CNOT gate 4502 in which the polarization qubit 4404 serves as a control qubit and OAM qudit 4406 as the target qudit is a quantum gate that is an essential component in the construction of a quantum computer. A generalized CNOT gate can be used to entangle or disentangle EPR states. Any quantum circuit can be simulated to an arbitrary degree of accuracy using a combination of CNOT and single qudit rotations. Here we are concerned instead with implementation in which both control 4404 and target 4406 qudit are OAM states. The holographic interaction between $OAM|l_C$ and $OAM|l_T$ states can be described by the following Hamiltonian:

$$H = g J_C J_T$$

Referring now to FIG. 46, there is illustrated the operations of the CNOT gate on a quantum register consisting of two qubits. The CNOT gate flips the second qubit (the target qubit) 4406 if and only if the first qubit (the control qubit) 4404 is $|1\rangle$.

The corresponding time-evolution operator is given by:

$$U(t) = \exp[-jtgJ_C J_T] = \exp[-jtgl_C l_T l_4]$$

By choosing $gt = 2\pi/(L_- + L_+)$, the following unitary operator is obtained:

$$C_{l_C}(Z(l_T)) = \exp\left[-j\frac{2\pi}{L_- + L_+} l_C l_T l_4\right]$$

which is clearly generalized-controlled-Z operator. A generalized-CNOT operator can be obtained by transforming the generalized-controlled-Z operator as follows:

$$CNOT_{l_C, l_T} = C_{l_C}(X(l_T)) = (I \otimes F^\dagger) C_{l_C}(Z(l_T))(I \otimes F)$$

Since this OAM interaction does not require the use of nonlinear crystals or highly nonlinear fibers, the OAM states represent an interesting qudit representation for quantum computing, quantum teleportation, and QKD applications. Given that generalized-X, generalized-Z, and generalized-CNOT gates represent the set of universal quantum gates, arbitrary quantum computation is possible by employing the OAM gates described. It has been shown that the following qudit set of gates including generalized-X, generalized-Z, and either generalized-CNOT or generalized controlled-phase is universal.

Bell State

It is also possible to generate the generalized Bell state $|B_{00}\rangle$. An arbitrary generalized-Bell state is generated in the following manner. By applying the same gates as in the figures, but now on kets $|n\rangle$ and $|m\rangle$, to obtain:

$$(F \otimes I)|n\rangle|m\rangle = D^{-\frac{1}{2}} \sum_{m=0}^{D-1} \omega^{-nk} |k\rangle|m\rangle$$

By applying now the generalized-CNOT gate, the desired generalized-Bell state $|B_{mn}\rangle$ is obtained:

$$CNOT(F \otimes I)|n\rangle|m\rangle = D^{-\frac{1}{2}} \sum_{m=0}^{D-1} \omega^{-nk} |k\rangle|m+k\rangle$$

Another approach to generate $|B_{mn}\rangle$ is to start with $|B_{00}\rangle$ and apply the Weyl-gate, defined as $W_{mn}=\Sigma_{d=0}^{D-1}\omega^{-dn}|d+m\rangle\langle d|$, on second qudit in entangled pair.

$$(I \otimes W_{mn})|B_{00}\rangle = D^{-\frac{1}{2}}\sum_{m=0}^{D-1}|k\rangle$$

$$\left(\sum_{d=0}^{D-1}\omega^{-dn}|d=m\rangle\langle d|\right)\langle k| = D^{-\frac{1}{2}}\sum_{k=0}^{D-1}\omega^{-kn}|k\rangle \,|\, k+m\rangle$$

The Weyl-gate can easily implemented by moving from d-th to (d+m) mod D branch and introducing the phase shift $-2\pi dk/D$ in that branch.

Now, all elements required to formulate entanglement assisted protocols based on OAM are available. The multi-dimensional QKD is described more fully below. The proposed qudit gates and modules can be employed to implement important quantum algorithms more efficiently. For example, the basic module to implement the Grover search algorithm, performing a search for an entry in unstructured database, is the Grover qudit operator, which can be represented as:

$$G=(2F^{\otimes n}|O\rangle\langle O|F^{\otimes n}-I)O$$

where F is the QFT qudit gate and O is the oracle operator, defined as:

$$O|x\rangle=(-1)^{f(x)}|x\rangle;\ x=(x_1 x_2 \ldots x_N),\ x_i \in GF(q)$$

with f(x) being the search function, generating 1 when the searched item is found, and zero otherwise. Shor factorization and Simon's algorithms are also straightforward to generalize.

The main problem related to OAM-based gates is the imperfect generation of OAM modes (especially using digital light processing). Currently existing CGHs still exhibit the measurable OAM crosstalk. On the other hand, the OAM is very stable degree of freedom, which does not change much unless the OAM modes are propagated over the atmospheric turbulence channels. Moreover, OAM states are preserved after kilometers-length-scale propagation in properly designed optical fibers. The noise affects the photons carrying OAM in the same fashion as the polarization states of photons are affected. The noise is more relevant in photon-number-sates-based optical quantum computing than in OAM-based quantum computing.

Quantum Key Distribution

Figure 47:
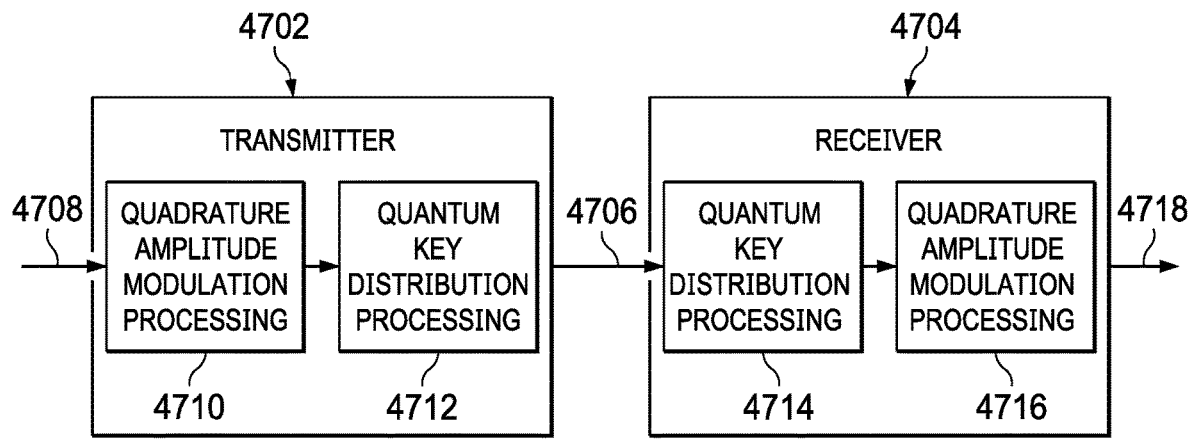
FIG. 47 illustrates a block diagram of an OAM processing system utilizing quantum key distribution.

As described above, one manner for using OAM based quantum computing involves the use in processes such as Quantum Key Distribution (QKD). In current QKD system, the systems are very slow. By implementing the above system of quantum gate computing using OAM, system can increase security and throughput communications while increasing the capacity of computing and processing of the system. The QKD operations would be implemented in a Quantum Module implementing the processes as described above. Referring now to FIG. 47, there is illustrated a further improvement of a system utilizing orbital angular momentum processing, Laguerre Gaussian processing, Hermite Gaussian processing or processing using any orthogonal functions. In the illustration of FIG. 47, a transmitter 4702 and receiver 4704 are interconnected over an optical link 4706. The optical link 4706 may comprise a fiber-optic link or a free-space optic link as described herein above. The transmitter receives a data stream 4708 that is processed via orbital angular momentum processing circuitry 4710. The orbital angular momentum processing circuitry 4710 provide orbital angular momentum twist to various signals on separate channels as described herein above. In some, embodiments, the orbital angular momentum processing circuitry may further provide multi-layer overlay modulation to the signal channels in order to further increase system bandwidth.

The OAM processed signals are provided to quantum key distribution processing circuitry 4712. The quantum key distribution processing circuitry 4712 utilizes the principals of quantum key distribution as will be more fully described herein below to enable encryption of the signal being transmitted over the optical link 4706 to the receiver 4704. The received signals are processed within the receiver 4704 using the quantum key distribution processing circuitry 4714. The quantum key distribution processing circuitry 4714 decrypts the received signals using the quantum key distribution processing as will be more fully described herein below. The decrypted signals are provided to orbital angular momentum processing circuitry 4716 which removes any orbital angular momentum twist from the signals to generate the plurality of output signals 4718. As mentioned previously, the orbital angular momentum processing circuitry 4716 may also demodulate the signals using multilayer overlay modulation included within the received signals.

Orbital angular momentum in combination with optical polarization is exploited within the circuit of FIG. 47 in order to encode information in rotation invariant photonic states, so as to guarantee full independence of the communication from the local reference frames of the transmitting unit 4702 and the receiving unit 4704. There are various ways to implement quantum key distribution (QKD), a protocol that exploits the features of quantum mechanics to guarantee unconditional security in cryptographic communications with error rate performances that are fully compatible with real world application environments.

Encrypted communication requires the exchange of keys in a protected manner. This key exchanged is often done through a trusted authority. Quantum key distribution is an alternative solution to the key establishment problem. In contrast to, for example, public key cryptography, quantum key distribution has been proven to be unconditionally secure, i.e., secure against any attack, even in the future, irrespective of the computing power or in any other resources that may be used. Quantum key distribution security relies on the laws of quantum mechanics, and more specifically on the fact that it is impossible to gain information about non-orthogonal quantum states without perturbing these states. This property can be used to establish random keys between a transmitter and receiver, and guarantee that the key is perfectly secret from any third party eavesdropping on the line.

Figure 48:
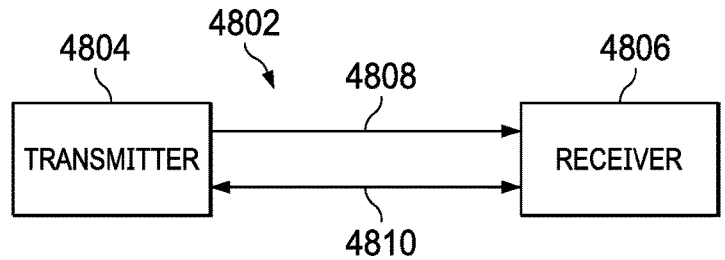
FIG. 48 illustrates a basic quantum key distribution system.

In parallel to the "full quantum proofs" mentioned above, the security of QKD systems has been put on stable information theoretic footing, thanks to the work on secret key agreements done in the framework of information theoretic cryptography and to its extensions, triggered by the new possibilities offered by quantum information. Referring now to FIG. 48, within a basic QKD system, a QKD link 4802 is a point to point connection between a transmitter 4804 and a receiver 4806 that want to share secret keys. The QKD link 4802 is constituted by the combination of a quantum channel 4808 and a classic channel 4810. The transmitter 4804 generates a random stream of classical bits and encodes them into a sequence of non-orthogonal states of light that are transmitted over the quantum channel 4808. Upon reception of these quantum states, the receiver 4806 performs some appropriate measurements leading the receiver to share some classical data over the classical link 4810 correlated with the transmitter bit stream. The classical channel 4810 is used to test these correlations.

If the correlations are high enough, this statistically implies that no significant eavesdropping has occurred on the quantum channel 4808 and thus, that has a very high probability, a perfectly secure, symmetric key can be distilled from the correlated data shared by the transmitter 4804 and the receiver 4806. In the opposite case, the key generation process has to be aborted and started again. The quantum key distribution is a symmetric key distribution technique. Quantum key distribution requires, for authentication purposes, that the transmitter 4804 and receiver 4806 share in advance a short key whose length scales only logarithmically in the length of the secret key generated by an OKD session.

Quantum key distribution on a regional scale has already been demonstrated in a number of countries. However, free-space optical links are required for long distance communication among areas which are not suitable for fiber installation or for moving terminals, including the important case of satellite based links. The present approach exploits spatial transverse modes of the optical beam, in particular of the OAM degree of freedom, in order to acquire a significant technical advantage that is the insensitivity of the communication to relevant alignment of the user's reference frames. This advantage may be very relevant for quantum key distribution implementation to be upgraded from the regional scale to a national or continental one, or for links crossing hostile ground, and even for envisioning a quantum key distribution on a global scale by exploiting orbiting terminals on a network of satellites. "$\pm l\hbar$"

The OAM Eigen modes are characterized by a twisted wavefront composed of "l" intertwined helices, where "l" is an integer, and by photons carrying "$\pm l\hbar$" of (orbital) angular momentum, in addition to the more usual spin angular momentum (SAM) associated with polarization. The potentially unlimited value of "l" opens the possibility to exploit OAM also for increasing the capacity of communication systems (although at the expense of increasing also the channel cross-section size), and terabit classical data transmission based on OAM multiplexing can be demonstrated both in free-space and optical fibers. Such a feature can also be exploited in the quantum domain, for example to expand the number of qubits per photon, or to achieve new functions, such as the rotational invariance of the qubits.

In a free-space QKD, two users (Alice and Bob) must establish a shared reference frame (SRF) in order to communicate with good fidelity. Indeed the lack of a SRF is equivalent to an unknown relative rotation which introduces noise into the quantum channel, disrupting the communication. When the information is encoded in photon polarization, such a reference frame can be defined by the orientations of Alice's and Bob's "horizontal" linear polarization directions. The alignment of these directions needs extra resources and can impose serious obstacles in long distance free space QKD and/or when the misalignment varies in time. As indicated, we can solve this by using rotation invariant states, which remove altogether the need for establishing a SRF. Such states are obtained as a particular combination of OAM and polarization modes (hybrid states), for which the transformation induced by the misalignment on polarization is exactly balanced by the effect of the same misalignment on spatial modes. These states exhibit a global symmetry under rotations of the beam around its axis and can be visualized as space-variant polarization states, generalizing the well-known azimuthal and radial vector beams, and forming a two-dimensional Hilbert space. Moreover, this rotation-invariant hybrid space can be also regarded as a decoherence-free subspace of the four-dimensional QAM-polarization product Hilbert space, insensitive to the noise associated with random rotations.

The hybrid states can be generated by a particular space-variant birefringent plate having topological charge "q" at its center, named "q-plate". In particular, a polarized Gaussian beam (having zero OAM) passing through a q-plate with q=½ will undergo the following transformation:

$$(\alpha|R\rangle + \beta|R\rangle)_\pi \otimes |0\rangle_o \rightarrow \alpha|L\rangle_\pi \otimes_o + \beta|R\rangle_\pi \otimes|l\rangle_o$$

$|L\rangle_{\pi\_}$ and $R\rangle_\pi$ denote the left and right circular polarization states (eigenstates of SAM with eigenvalues "$\pm\hbar$"), $|0\rangle o$ represents the transverse Gaussian mode with zero OAM and the $|L\rangle o\_$ and $|R\rangle o$ eigenstates of OAM with $|l|=1$ and with eigenvalues "$\pm l\hbar$"). The states appearing on the right hand side of equation are rotation-invariant states. The reverse operation to this can be realized by a second q-plate with the same q. In practice, the q-plate operates as an interface between the polarization space and the hybrid one, converting qubits from one space to the other and vice versa in a universal (qubit invariant) way. This in turn means that the initial encoding and final decoding of information in our QKD implementation protocol can be conveniently performed in the polarization space, while the transmission is done in the rotation-invariant hybrid space.

OAM is a conserved quantity for light propagation in vacuum, which is obviously important for communication applications. However, OAM is also highly sensitive to atmospheric turbulence, a feature which limits its potential usefulness in many practical cases unless new techniques are developed to deal with such issues.

Quantum cryptography describes the use of quantum mechanical effects (in particular quantum communication and quantum computation) to perform cryptographic tasks or to break cryptographic systems. Well-known examples of quantum cryptography are the use of quantum communication to exchange a key securely (quantum key distribution) and the hypothetical use of quantum computers that would allow the breaking of various popular public-key encryption and signature schemes (e.g., RSA).

The advantage of quantum cryptography lies in the fact that it allows the completion of various cryptographic tasks that are proven to be impossible using only classical (i.e. non-quantum) communication. For example, quantum mechanics guarantees that measuring quantum data disturbs that data; this can be used to detect eavesdropping in quantum key distribution.

Quantum key distribution (QKD) uses quantum mechanics to guarantee secure communication. It enables two parties to produce a shared random secret key known only to them, which can then be used to encrypt and decrypt messages.

An important and unique property of quantum distribution is the ability of the two communicating users to detect the presence of any third party trying to gain knowledge of the key. This results from a fundamental aspect of quantum mechanics: the process of measuring a quantum system in general disturbs the system. A third party trying to eavesdrop on the key must in some way measure it, thus introducing detectable anomalies. By using quantum superposition or quantum entanglement and transmitting information in quantum states, a communication system can be implemented which detects eavesdropping. If the level of eavesdropping is below a certain threshold, a key can be produced that is guaranteed to be secure (i.e. the eavesdropper has no information about it), otherwise no secure key is possible and communication is aborted.

The security of quantum key distribution relies on the foundations of quantum mechanics, in contrast to traditional key distribution protocol which relies on the computational difficulty of certain mathematical functions, and cannot provide any indication of eavesdropping or guarantee of key security.

Quantum key distribution is only used to reduce and distribute a key, not to transmit any message data. This key can then be used with any chosen encryption algorithm to encrypt (and decrypt) a message, which is transmitted over a standard communications channel. The algorithm most commonly associated with QKD is the one-time pad, as it is provably secure when used with a secret, random key.

Quantum communication involves encoding information in quantum states, or qubits, as opposed to classical communication's use of bits. Usually, photons are used for these quantum states and thus are applicable within quantum computing systems. Quantum key distribution exploits certain properties of these quantum states to ensure its security. There are several approaches to quantum key distribution, but they can be divided into two main categories, depending on which property they exploit. The first of these are prepare and measure protocol. In contrast to classical physics, the act of measurement is an integral part of quantum mechanics. In general, measuring an unknown quantum state changes that state in some way. This is known as quantum indeterminacy, and underlies results such as the Heisenberg uncertainty principle, information distribution theorem, and no cloning theorem. This can be exploited in order to detect any eavesdropping on communication (which necessarily involves measurement) and, more importantly, to calculate the amount of information that has been intercepted. Thus, by detecting the change within the signal, the amount of eavesdropping or information that has been intercepted may be determined by the receiving party.

The second category involves the use of entanglement based protocols. The quantum states of two or more separate objects can become linked together in such a way that they must be described by a combined quantum state, not as individual objects. This is known as entanglement, and means that, for example, performing a measurement on one object affects the other object. If an entanglement pair of objects is shared between two parties, anyone intercepting either object alters the overall system, revealing the presence of a third party (and the amount of information that they have gained). Thus, again, undesired reception of information may be determined by change in the entangled pair of objects that is shared between the parties when intercepted by an unauthorized third party.

One example of a quantum key distribution (QKD) protocol is the BB84 protocol. The BB84 protocol was originally described using photon polarization states to transmit information. However, any two pairs of conjugate states can be used for the protocol, and optical fiber-based implementations described as BB84 can use phase-encoded states. The transmitter (traditionally referred to as Alice) and the receiver (traditionally referred to as Bob) are connected by a quantum communication channel which allows quantum states to be transmitted. In the case of photons, this channel is generally either an optical fiber, or simply free-space, as described previously with respect to FIG. 47. In addition, the transmitter and receiver communicate via a public classical channel, for example using broadcast radio or the Internet. Neither of these channels needs to be secure. The protocol is designed with the assumption that an eavesdropper (referred to as Eve) can interfere in any way with both the transmitter and receiver.

Figure 49:
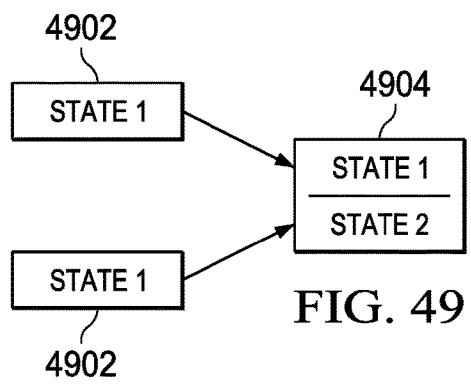
FIG. 49 illustrates the manner in which two separate states are combined into a single conjugate pair within quantum key distribution.
Figure 50:
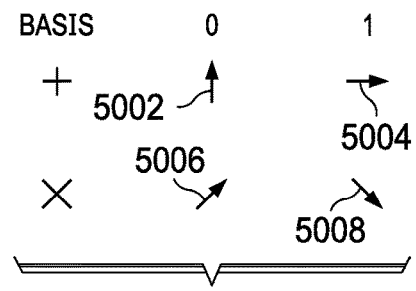
FIG. 50 illustrates one manner in which 0 and 1 bits may be transmitted using different basis within a quantum key distribution system.

Referring now to FIG. 49, the security of the protocol comes from encoding the information in non-orthogonal states. Quantum indeterminacy means that these states cannot generally be measured without disturbing the original state. BB84 uses two pair of states 4902, each pair conjugate to the other pair to form a conjugate pair 4904. The two states 4902 within a pair 4904 are orthogonal to each other. Pairs of orthogonal states are referred to as a basis. The usual polarization state pairs used are either the rectilinear basis of vertical (0 degrees) and horizontal (90 degrees), the diagonal basis of 45 degrees and 135 degrees, or the circular basis of left handedness and/or right handedness. Any two of these basis are conjugate to each other, and so any two can be used in the protocol. In the example of FIG. 50, rectilinear basis are used at 5002 and 5004, respectively, and diagonal basis are used at 5006 and 5008.

The first step in BB84 protocol is quantum transmission. Referring now to FIG. 51 wherein there is illustrated a flow diagram describing the process, wherein the transmitter creates a random bit (0 or 1) at step 5102, and randomly selects at 5104 one of the two basis, either rectilinear or diagonal, to transmit the random bit. The transmitter prepares at step 5106 a photon polarization state depending both on the bit value and the selected basis. So, for example, a 0 is encoded in the rectilinear basis (+) as a vertical polarization state and a 1 is encoded in a diagonal basis (X) as a 135 degree state. The transmitter transmits at step 5108 a single proton in the state specified to the receiver using the quantum channel. This process is repeated from the random bit stage at step 5102 with the transmitter recording the state, basis, and time of each photon that is sent over the optical link.

According to quantum mechanics, no possible measurement distinguishes between the four different polarization states 5002 through 5008 of FIG. 50, as they are not all orthogonal. The only possible measurement is between any two orthogonal states (and orthonormal basis). So, for example, measuring in the rectilinear basis gives a result of horizontal or vertical. If the photo was created as horizontal or vertical (as a rectilinear eigenstate), then this measures the correct state, but if it was created as 45 degrees or 135 degrees (diagonal eigenstate), the rectilinear measurement instead returns either horizontal or vertical at random. Furthermore, after this measurement, the proton is polarized in the state it was measured in (horizontal or vertical), with all of the information about its initial polarization lost.

Referring now to FIG. 52, as the receiver does not know the basis the photons were encoded in, the receiver can only select a basis at random to measure in, either rectilinear or diagonal. At step 5202, the transmitter does this for each received photon, recording the time measurement basis used and measurement result at step 5204. At step 5206, a determination is made if there are further protons present and, if so, control passes back to step 5202. Once inquiry step 5206 determines the receiver had measured all of the protons, the transceiver communicates at step 5208 with the transmitter over the public communications channel. The transmitter broadcast the basis for each photon that was sent at step 5210 and the receiver broadcasts the basis each photon was measured in at step 5212. Each of the transmitter and receiver discard photon measurements where the receiver used a different basis at step 5214 which, on average, is one-half, leaving half of the bits as a shared key, at step 5216. This process is more fully illustrated in FIG. 53.

The transmitter transmits the random bit 01101001. For each of these bits respectively, the transmitter selects the sending basis of rectilinear, rectilinear, diagonal, rectilinear, diagonal, diagonal, diagonal, and rectilinear. Thus, based upon the associated random bits selected and the random sending basis associated with the signal, the polarization indicated in line 5202 is provided. Upon receiving the photon, the receiver selects the random measuring basis as indicated in line 5304. The photon polarization measurements from these basis will then be as indicated in line 5306. A public discussion of the transmitted basis and the measurement basis are discussed at 5308 and the secret key is determined to be 0101 at 5310 based upon the matching bases for transmitted photons 1, 3, 6, and 8.

Figure 54:
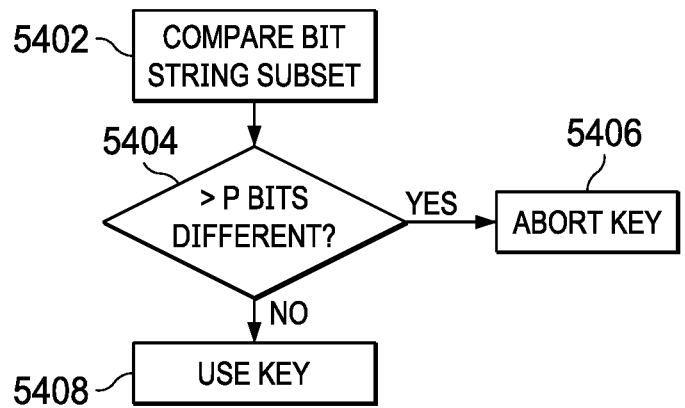
FIG. 54 is a flow diagram illustrating the process for determining whether to keep or abort a determined key.

Referring now to FIG. 54, there is illustrated the process for determining whether to keep or abort the determined key based upon errors detected within the determined bit string. To check for the presence of eavesdropping, the transmitter and receiver compare a certain subset of their remaining bit strings at step 5402. If a third party has gained any information about the photon's polarization, this introduces errors within the receiver's measurements. If more than P bits differ at inquiry step 5404, the key is aborted at step 5406, and the transmitter and receiver try again, possibly with a different quantum channel, as the security of the key cannot be guaranteed. P is chosen so that if the number of bits that is known to the eavesdropper is less than this, privacy amplification can be used to reduce the eavesdropper's knowledge of the key to an arbitrarily small amount by reducing the length of the key. If inquiry step 5404 determines that the number of bits is not greater than P, then the key may be used at step 5408.

The E91 protocol comprises another quantum key distribution scheme that uses entangled pairs of protons. This protocol may also be used with entangled pairs of protons using orbital angular momentum processing, Laguerre Gaussian processing, Hermite Gaussian processing or processing using any orthogonal functions for Q-bits. The entangled pairs can be created by the transmitter, by the receiver, or by some other source separate from both of the transmitter and receiver, including an eavesdropper. The photons are distributed so that the transmitter and receiver each end up with one photon from each pair. The scheme relies on two properties of entanglement. First, the entangled states are perfectly correlated in the sense that if the transmitter and receiver both measure whether their particles have vertical or horizontal polarizations, they always get the same answer with 100 percent probability. The same is true if they both measure any other pair of complementary (orthogonal) polarizations. However, the particular results are not completely random. It is impossible for the transmitter to predict if the transmitter, and thus the receiver, will get vertical polarizations or horizontal polarizations. Second, any attempt at eavesdropping by a third party destroys these correlations in a way that the transmitter and receiver can detect. The original Ekert protocol (E91) consists of three possible states and testing Bell inequality violation for detecting eavesdropping.

Presently, the highest bit rate systems currently using quantum key distribution demonstrate the exchange of secure keys at 1 Megabit per second over a 20 kilometer optical fiber and 10 Kilobits per second over a 100 kilometer fiber.

The longest distance over which quantum key distribution has been demonstrated using optical fiber is 148 kilometers. The distance is long enough for almost all of the spans found in today's fiber-optic networks. The distance record for free-space quantum key distribution is 134 kilometers using BB84 enhanced with decoy states.

Figure 55:
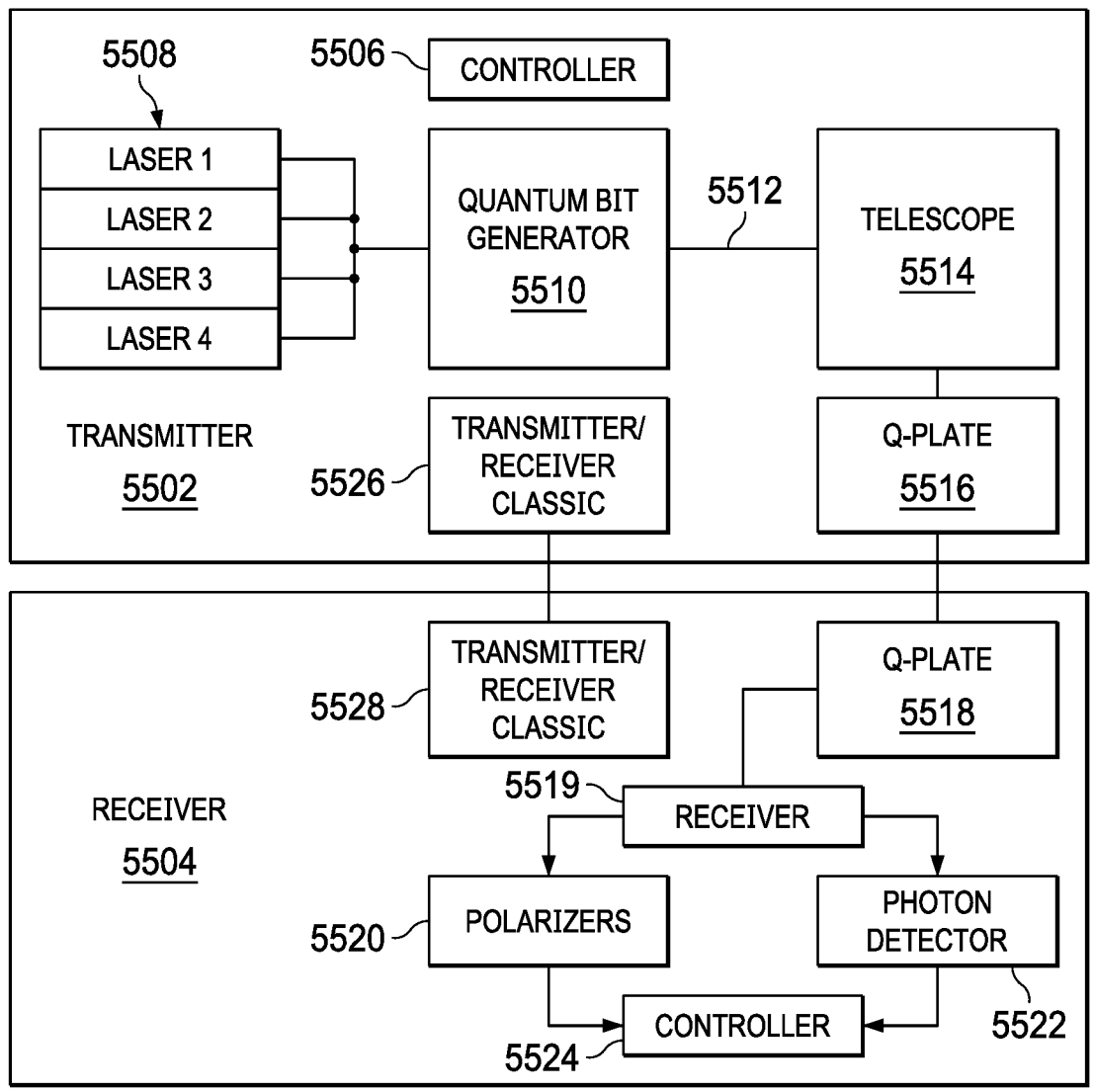
FIG. 55 illustrates a functional block diagram of a transmitter and receiver utilizing a free-space quantum key distribution system.

Referring now to FIG. 55, there is illustrated a functional block diagram of a transmitter 5502 and receiver 5504 that can implement alignment of free-space quantum key distribution. The system can implement the BB84 protocol with decoy states. The controller 5506 enables the bits to be encoded in two mutually unbiased bases $Z=\{|0\rangle, |1\rangle\}$ and $X=\{|+\rangle, |-\rangle\}$, where $|0\rangle$ and $|1\rangle$ are two orthogonal states spanning the qubit space and $|\pm\rangle=1/\sqrt{2}\,(|0\rangle\pm|1\rangle)$. The transmitter controller 5506 randomly chooses between the Z and X basis to send the classical bits 0 and 1. Within hybrid encoding, the Z basis corresponds to $\{|L\rangle_\pi \otimes |r\rangle o, |R\rangle_\pi \otimes |l\rangle o\}$ while the X basis states correspond to $1/\sqrt{2}\,(|L\rangle_\pi \otimes |r\rangle o \pm |R\rangle_\pi \otimes |l\rangle o)$. The transmitter 5502 uses four different polarized attenuated lasers 5508 to generate quantum bits through the quantum bit generator 5510. Photons from the quantum bit generator 5510 are delivered via a single mode fiber 5512 to a telescope 5514. Polarization states $|H\rangle$, $|V\rangle$, $|R\rangle$, $|L\rangle$ are transformed into rotation invariant hybrid states by means of a q-plate 5516 with $q=\frac{1}{2}$. The photons can then be transmitted to the receiving station 5504 where a second q-plate transform 5518 transforms the signals back into the original polarization states $H\rangle$, $V\rangle$, $R\rangle$, $L\rangle$, as defined by the receiver reference frame. Qubits can then be analyzed by polarizers 5520 and single photon detectors 5522. The information from the polarizers 5520 and photo detectors 5522 may then be provided to the receiver controller 5524 such that the shifted keys can be obtained by keeping only the bits corresponding to the same basis on the transmitter and receiver side as determined by communications over a classic channel between the transceivers 5526, 5528 in the transmitter 5502 and receiver 5504.

Figure 56:
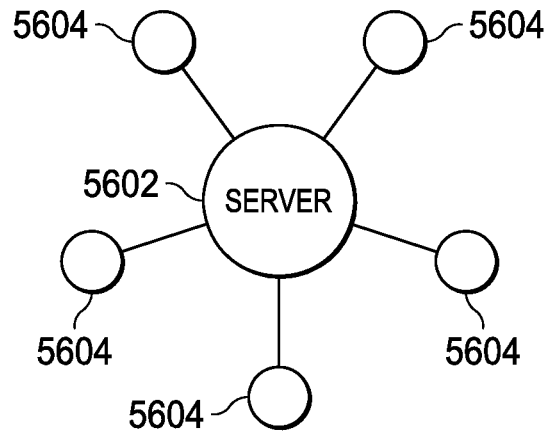
FIG. 56 illustrates a network cloud-based quantum key distribution system.

Referring now to FIG. 56, there is illustrated a network cloud based quantum key distribution system including a central server 5602 and various attached nodes 5604 in a hub and spoke configuration. Trends in networking are presenting new security concerns that are challenging to meet with conventional cryptography, owing to constrained computational resources or the difficulty of providing suitable key management. In principle, quantum cryptography, with its forward security and lightweight computational footprint, could meet these challenges, provided it could evolve from the current point to point architecture to a form compatible with multimode network architecture. Trusted quantum key distribution networks based on a mesh of point to point links lacks scalability, require dedicated optical fibers, are expensive and not amenable to mass production since they only provide one of the cryptographic functions, namely key distribution needed for secure communications. Thus, they have limited practical interest.

A new, scalable approach such as that illustrated in FIG. 56 provides quantum information assurance that is network based quantum communications which can solve new network security challenges. In this approach, a BB84 type quantum communication between each of N client nodes 5604 and a central sever 5602 at the physical layer support a quantum key management layer, which in turn enables secure communication functions (confidentiality, authentication, and nonrepudiation) at the application layer between approximately N2 client pairs. This network based communication "hub and spoke" topology can be implemented in a network setting, and permits a hierarchical trust architecture that allows the server 5602 to act as a trusted authority in cryptographic protocols for quantum authenticated key establishment. This avoids the poor scaling of previous approaches that required a pre-existing trust relationship between every pair of nodes. By making a server 5602, a single multiplex QC (quantum communications) receiver and the client nodes 5604 QC transmitters, this network can simplify complexity across multiple network nodes. In this way, the network based quantum key distribution architecture is scalable in terms of both quantum physical resources and trust. One can at time multiplex the server 5602 with three transmitters 5604 over a single mode fiber, larger number of clients could be accommodated with a combination of temporal and wavelength multiplexing as well as orbital angular momentum multiplexed with wave division multiplexing to support much higher clients.

Figure 57:
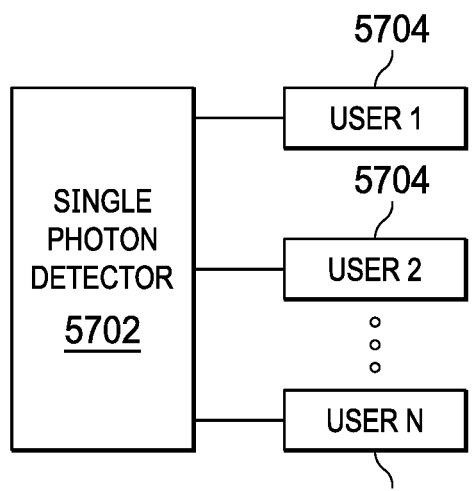
FIG. 57 illustrates a high-speed single photon detector in communication with a plurality of users.
Figure 58:
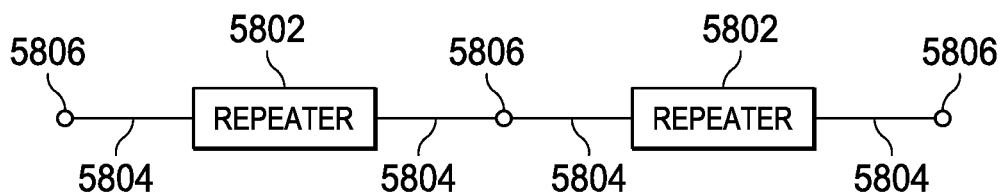
FIG. 58 illustrates a nodal quantum key distribution network.

Referring now to FIGS. 57 and 58, there are illustrated various components of multi-user orbital angular momentum based quantum key distribution multi-access network. FIG. 57 illustrates a high speed single photon detector 5702 positioned at a network node that can be shared between multiple users 5704 using conventional network architectures, thereby significantly reducing the hardware requirements for each user added to the network. In an embodiment, the single photon detector 5702 may share up to 64 users. This shared receiver architecture removes one of the main obstacles restricting the widespread application of quantum key distribution. The embodiment presents a viable method for realizing multi-user quantum key distribution networks with resource efficiency.

Referring now also to FIG. 58, in a nodal quantum key distribution network, multiple trusted repeaters 5802 are connected via point to point links 5804 between node 5806. The repeaters are connected via point to point links between a quantum transmitter and a quantum receiver. These point to point links 5804 can be realized using long distance optical fiber lengths and may even utilize ground to satellite quantum key distribution communication. While point to point connections 5804 are suitable to form a backbone quantum core network, they are less suitable to provide the last-mile service needed to give a multitude of users access to the quantum key distribution infrastructure. Reconfigurable optical networks based on optical switches or wavelength division multiplexing may achieve more flexible network structures, however, they also require the installation of a full quantum key distribution system per user which is prohibitively expensive for many applications.

The quantum key signals used in quantum key distribution need only travel in one direction along a fiber to establish a secure key between the transmitter and the receiver. Single photon quantum key distribution with the sender positioned at the network node 5806 and the receiver at the user premises therefore lends itself to a passive multi-user network approach. However, this downstream implementation has two major shortcomings. Firstly, every user in the network requires a single photon detector, which is often expensive and difficult to operate. Additionally, it is not possible to deterministically address a user. All detectors, therefore, have to operate at the same speed as a transmitter in order not to miss photons, which means that most of the detector bandwidth is unused.

Most systems associated with a downstream implementation can be overcome. The most valuable resource should be shared by all users and should operate at full capacity. One can build an upstream quantum access network in which the transmitters are placed at the end user location and a common receiver is placed at the network node. This way, an operation with up to 64 users is feasible, which can be done with multi-user quantum key distribution over a 1×64 passive optical splitter.

The above described QKD scheme is applicable to twisted pair, coaxial cable, fiber optic, RF satellite, RF broadcast, RF point-to point, RF point-to-multipoint, RF point-to-point (backhaul), RF point-to-point (fronthaul to provide higher throughput CPRI interface for cloudification and virtualization of RAN and cloudified HetNet), free-space optics (FSO), Internet of Things (IOT), Wifi, Bluetooth, as a personal device cable replacement, RF and FSO hybrid system, Radar, electromagnetic tags and all types of wireless access. The method and system are compatible with many current and future multiple access systems, including EV-DO, UMB, WIMAX, WCDMA (with or without), multimedia broadcast multicast service (MBMS)/multiple input multiple output (MIMO), HSPA evolution, and LTE. The techniques would be useful for combating denial of service attacks by routing communications via alternate links in case of disruption, as a technique to combat Trojan Horse attacks which does not require physical access to the endpoints and as a technique to combat faked-state attacks, phase remapping attacks and time-shift attacks.

Thus, using various configurations of the above described orbital angular momentum processing, multi-layer overlay modulation, and quantum key distribution within various types of communication networks and more particularly optical fiber networks and free-space optic communication network, a variety of benefits and improvements in system bandwidth and capacity maybe achieved.

It will be appreciated by those skilled in the art having the benefit of this disclosure that this universal quantum computer, communications and QKD security using OAM qubits with digital light processing provides a manner for better implementing quantum computing. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A quantum computing system, comprising:
   an input port for receiving a data stream comprising a plurality of bits;
   multiple level overlay modulation circuitry for receiving the data stream and applying multiple level overlay modulation to the received data stream to provide a modulated data stream;
   orbital angular momentum processing circuitry for receiving the modulated data stream and applying at least one of a plurality of orbital angular momentum function modes to each of the plurality of bits of the modulated data stream, wherein each of the plurality of orbital angular momentum function modes comprise separate orbital angular momentum states that are orthogonal to each other;
   MicroElectroMechanical system (MEMs) circuitry associated with the orbital angular momentum processing circuitry for generating a hologram for applying the at least one of the plurality of orbital angular momentum function modes to each of the plurality of bits of the modulated data stream;

at least one quantum gate for receiving each of the of the plurality of bits of the modulated data stream having at least one of the plurality of orbital angular momentum function modes applied thereto via at least one gate input and generating a quantum circuit output via at least one gate output responsive thereto; and an output port for outputting the generated quantum circuit output.

2. The quantum computing system of claim 1, wherein the MEMs circuitry further comprises:

a light source for generating a plane wave light beam;

a MEMs including an array of micro-mirrors for generating the hologram for applying the plurality of orbital angular momentum function modes to each of the plurality of bits of the modulated data stream responsive to the plane wave light beam and control signals for controlling the array of micro-mirrors;

a controller for generating the control signals to dynamically control a position of each of a plurality of micro-mirrors of the array of micro-mirrors, the controller further generating the control signals to cause the array of micro-mirrors to switch between differing modes of the plurality of orbital angular momentum function modes; and wherein the controller controls the position of the plurality of micro-mirrors to dynamically generate a plurality of holograms for dynamically applying the plurality of orbital angular momentum function modes to the plane wave light beam.

3. The quantum computing system of claim 2, wherein the controller switches the array of micro-mirrors between different holograms to dynamically control the plurality of orbital angular momentum function modes applied to dynamically encode the orbital angular momentum function modes to each of the plurality of bits of the modulated data stream.

4. The quantum computing system of claim 2, wherein the controller controls the array of micro-mirrors to produce the holograms having a radius substantially in a range of 100-200 micro-mirrors and a period substantially in a range of 50-100.

5. The quantum computing system of claim 1, wherein the data stream comprises a light beam in frequencies ranges from infra-red to ultra-violet.

6. The quantum computing system of claim 2, wherein the controller configures the array of micro-mirrors to present a plurality of holograms at a same time.

7. The quantum computing system of claim 1, wherein the at least one quantum gate further comprises at least one of a generalized F-gate, a generalized G-gate, a generalized Cnot-gate, a quantum Fourier transform gate, a generalized Z-gate and a generalized X-gate.

8. The quantum computing system of claim 1, wherein the at least one quantum gate comprises a quantum qudit module, the quantum qudit module comprising at least one of a generalized Bell-State generation module, a quantum Fourier transform module, a non-binary syndrome calculator module, a generalized universal qudit gate, a Weyl Operator Module and a generalized controlled phase deterministic qudit gate using optics.

9. The quantum computing system of claim 1 further including quantum key processing circuitry connected to the at least one gate output of the quantum circuit output for generating a secret key for transmission to second quantum key processing circuitry using a quantum key generation process and for encoding the transmissions on a link between the quantum key processing circuitry and the second quantum key processing circuitry using the generated secret key, wherein the quantum key processing circuitry generates the secret key by:

selecting a series of random bits;

assigning a random basis to each of the selected random bits;

generating a first photon polarization state for each of the selected random bits responsive to the selected random bits and the assigned random basis for the selected random bits;

transmitting the generated first photon polarization states to a remote location;

receiving a second photon polarization state for each of the selected random bits from the remote location; and determining the secret key responsive to matching portions of the first photon polarization state and the second photon polarization state.

10. The quantum computing system of claim 9, wherein the second quantum key processing circuitry determines the generated secret key by:

selecting a random basis for each random bit of a received first sequence of photon polarizations states;

determining a value of each of the photon polarization states responsive to the first sequence of photon polarization states and the selected random basis for each of the random bits of the received first sequence of photon polarization states to generate a second sequence of photon polarization states; and determining the secret key responsive to matching portions of the first sequence of photon polarization states and the second sequence of photon polarization states.

11. The quantum computing system of claim 1, wherein the at least one quantum gate further comprises:

an orbital angular momentum demultiplexor for receiving the plurality of bits of the data stream having at least one of the plurality of orbital angular momentum function modes applied thereto;

a plurality of electro-optical modulators connected to an output of the orbital angular momentum demultiplexor; and an orbital angular momentum multiplexor for multiplexing outputs of the plurality of electro-optical modulators together to provide the quantum circuit output.

12. A method for processing an input data stream using a quantum computing system, comprising:

receiving at an input port a data stream comprising a plurality of bits;

applying multiple level overlay modulation to the received data stream to provide a modulated data stream using the multiple level overlay modulation, generating a hologram for applying at least one of a plurality of orbital angular momentum function modes to each of the plurality of bits of the modulated data stream using MicroElectroMechanical system (MEMs) circuitry;

applying the at least one of a plurality of orbital angular momentum function modes to each of the plurality of bits of the modulated data stream using orbital angular momentum processing circuitry, wherein each of the plurality of orbital angular momentum function modes comprise separate orbital angular momentum states that are orthogonal to each other;

receiving each of the of the plurality of bits of the modulated data stream having at least one of the plurality of orbital angular momentum function modes applied thereto at a quantum gate via at least one gate input;

generating a quantum circuit output via at least one quantum gate output responsive thereto; and outputting the generated quantum circuit output.

13. The method of claim 12, wherein the step of generating further comprises:

generating a plane wave light beam using a light source;

generating control signals to dynamically control a position of each of a plurality of micro-mirrors of array of micro-mirrors using a controller;

controlling the position of the plurality of micro-mirrors to dynamically generate a plurality of holograms for dynamically applying the plurality of orbital angular momentum function modes to the plane wave light beam, generating the hologram for applying the plurality of orbital angular momentum function modes to each of the plurality of bits of the modulated data stream using a MEMs including an array of micro-mirrors responsive to the plane wave light beam and control signals for controlling the array of micro-mirrors; and switching between differing modes of the plurality of orbital angular momentum function modes.

14. The method of claim 13, wherein the step of controlling further comprises switching the array of micro-mirrors between different holograms to dynamically control the plurality of orbital angular momentum function modes applied to dynamically encode the orbital angular momentum function modes to each of the plurality of bits of the modulated data stream.

15. The method of claim 13, wherein the step of generating further comprise controlling the array of micro-mirrors to produce the holograms having a radius substantially in a range of 100-200 micro-mirrors and a period substantially in a range of 50-100.

16. The method of claim 13, wherein the step of controlling further comprises configuring the array of micro-mirrors to present a plurality of holograms at a same time.

17. The method of claim 12, wherein the data stream comprises a light beam in frequencies ranges from infra-red to ultra-violet.

18. The method of claim 12, wherein at least one quantum gate associated with the quantum gate output comprises at least one of a generalized F-gate, a generalized G-gate, a generalized Cnot-gate, a quantum Fourier transform gate, a generalized Z-gate and a generalized X-gate.

19. The method of claim 12, wherein at least one quantum gate associated with the quantum gate output comprises a quantum qudit module, the quantum qudit module comprising at least one of a generalized Bell-State generation module, a quantum Fourier transform module, a non-binary syndrome calculator module, a generalized universal qudit gate, a Weyl Operator Module and a generalized controlled phase deterministic qudit gate using optics.

20. The method of claim 12 further including:

generating a secret key for transmission from quantum key processing circuitry to second quantum key processing circuitry using a quantum key generation process; and encoding the transmissions on a link between the quantum key processing circuitry and the second quantum key processing circuitry using the generated secret key.

21. The method of claim 20, wherein the step of generating further comprises:

selecting a series of random bits at the quantum key processing circuitry;

assigning a random basis to each of the selected random bits at the quantum key processing circuitry;

generating a first photon polarization state for each of the selected random bits responsive to the selected random bits and the assigned random basis for the selected random bits at the quantum key processing circuitry;

transmitting the generated first photon polarization states from the quantum key processing circuitry the second quantum key processing circuitry;

receiving a second photon polarization state for each of the selected random bits at the quantum key processing circuitry from the second quantum key processing circuitry; and determining the secret key responsive to matching portions of the first photon polarization state and the second photon polarization state.

22. The method of claim 21 further including determining the generated secret key at the second quantum key processing circuitry, wherein the second quantum key processing circuitry determines the generated secret key by:

selecting a random basis for each random bit of a received first sequence of photon polarizations states;

determining a value of each of the photon polarization states responsive to the first sequence of photon polarization states and the selected random basis for each of the random bits of the received first sequence of photon polarization states to generate a second sequence of photon polarization states; and determining the secret key responsive to matching portions of the first sequence of photon polarization states and the second sequence of photon polarization states.

23. The method of claim 12, wherein the step of generating the quantum circuit output further comprises:

receiving the plurality of bits of the data stream having at least one of the plurality of orbital angular momentum function modes applied thereto at an orbital angular momentum demultiplexor;

optically processing an output of the orbital angular momentum demultiplexor using a plurality of electro-optical modulators; and multiplexing outputs of the plurality of electro-optical modulators together to provide the quantum circuit output using an orbital angular momentum multiplexor.

* * * * *